United States Patent
Mukae

(10) Patent No.: US 12,338,001 B2
(45) Date of Patent: Jun. 24, 2025

(54) SPACE SITUATIONAL AWARENESS BUSINESS DEVICE, SPACE TRAFFIC BUSINESS DEVICE, AND SPACE TRAFFIC MANAGEMENT SYSTEM

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 274 days.

(21) Appl. No.: 17/918,114

(22) PCT Filed: Apr. 27, 2021

(86) PCT No.: PCT/JP2021/016713
§ 371 (c)(1),
(2) Date: Oct. 11, 2022

(87) PCT Pub. No.: WO2021/221035
PCT Pub. Date: Nov. 4, 2021

(65) Prior Publication Data
US 2023/0137711 A1    May 4, 2023

(30) Foreign Application Priority Data

Apr. 27, 2020    (JP) .................................. 2020-078629

(51) Int. Cl.
*B64G 1/10*    (2006.01)
*H04B 7/185*    (2006.01)

(52) U.S. Cl.
CPC .......... *B64G 1/1007* (2013.01); *B64G 1/1021* (2013.01); *H04B 7/18545* (2013.01)

(58) Field of Classification Search
CPC ...... B64G 1/1007; B64G 1/1021; B64G 1/66; B64G 3/00; B64G 1/10; B64G 1/1028;
(Continued)

(56) References Cited

U.S. PATENT DOCUMENTS 11,780,612 B1 * 10/2023 Kopardekar ............ H04W 4/46
701/13
2018/0370658 A1    12/2018 Amimoto et al.
(Continued)

FOREIGN PATENT DOCUMENTS

JP    2011-218834 A    11/2011
JP    2017-114159 A    6/2017

OTHER PUBLICATIONS

"SSA Monitoring Space", [online], Mar. 31, Reiwa 2 (2020), National Research and Development Agency Japan Aerospace Exploration Agency, [search on Jul. 17, Reiwa 6 (2024)], Internet <URL: https://track.sfo.jaxa.jp/business_overview_ex/busi_over08.html> (20 pages; with English translation).
(Continued)

*Primary Examiner* — Abby Y Lin
*Assistant Examiner* — Esvinder Singh
(74) *Attorney, Agent, or Firm* — XSENSUS LLP

(57) ABSTRACT

An SSA business device is a business device with which an SSA business operator manages space object information. The SSA business device includes a space traffic management device that is compatible with space traffic management devices respectively included in business devices that manage space objects. The SSA business device is connected, through the space traffic management device, to a space traffic management system in which the space traffic management devices respectively included in the business devices are mutually connected with a communication line.

14 Claims, 62 Drawing Sheets

(58) Field of Classification Search
CPC .. B64G 1/1078; B64G 1/1081; B64G 1/1085; H04B 7/18545; H04B 7/024; H04B 7/18521; H04B 7/18532; H04B 7/18558; H04B 7/18563; H04B 10/118; G06Q 50/10

See application file for complete search history.

(56) References Cited

U.S. PATENT DOCUMENTS

| | | | |
|---|---|---|---|
| 2021/0036772 A1* | 2/2021 | Miranda | H04B 7/18513 |
| 2022/0127018 A1* | 4/2022 | Fukushima | B64G 1/242 |
| 2023/0079285 A1* | 3/2023 | Umeda | H04N 23/632 |
| | | | 348/207.99 |

OTHER PUBLICATIONS

Japan Office Action dated Aug. 6, 2024 for Japanese Application No. JP2022-518070 (22 pages; with English translation).
International Search Report and Written Opinion mailed on Jul. 20, 2021, received for PCT Application PCT/JP2021/016713, filed on Apr. 27, 2021, 10 pages including English Translation.

* cited by examiner

IMPLEMENTATION EXAMPLE 1 (3)

IMPLEMENTATION EXAMPLE 1 (5)

IMPLEMENTATION EXAMPLE 2 (2)

Fig. 62

EXAMPLE OF SPACE INFORMATION RECORDER 101 OF MEGA-CONSTELLATION BUSINESS DEVICE

| SPACE INFORMATION RECORDER 101 | | | | | | |
|---|---|---|---|---|---|---|
| SATELLITE GROUP ID | PUBLIC ORBIT INFORMATION 61 | | | | | |
| | INFORMATION ON CONSTITUENT SATELLITES (TOTAL NUMBER, ID) | ORBITAL ALTITUDE UPPER/LOWER LIMITS | ORBITAL INCLINATION UPPER/LOWER LIMITS | | | |
| SATELLITE ID | REAL-TIME HIGH-PRECISION ORBIT INFORMATION 63 | | | | | |
| | FORECAST ORBIT INFORMATION | | | | | |
| | EPOCH | ORBITAL ELEMENTS | PREDICTED ERROR | INFORMATION PROVIDER BUSINESS DEVICE ID | INFORMATION UPDATE DATE | |
| | TIME ERROR | ORBIT RADIUS ERROR | LATITUDE ANGLE ERROR | LONGITUDE ANGLE ERROR | VERIFICATION RECORD | |
| | RECORD ORBIT INFORMATION | | | | | |
| | UTS TIME | LOCATION COORDINATES | MEASUREMENT ERROR | INFORMATION PROVIDER BUSINESS DEVICE ID | INFORMATION UPDATE DATE | |
| | TIME ERROR | ORBIT RADIUS ERROR | LATITUDE ANGLE ERROR | LONGITUDE ANGLE ERROR | MEASUREMENT MEANS | |

SPACE SITUATIONAL AWARENESS BUSINESS DEVICE, SPACE TRAFFIC BUSINESS DEVICE, AND SPACE TRAFFIC MANAGEMENT SYSTEM

CROSS-REFERENCE TO RELATED APPLICATIONS

The present application is based on PCT filing PCT/JP2021/016713, filed Apr. 27, 2021, which claims priority to JP 2020-078629, filed Apr. 27, 2020, the entire contents of each are incorporated herein by reference.

TECHNICAL FIELD

The present disclosure relates to a space situational awareness business device, a ground facility, a space traffic business device, a space traffic management system, and an observation satellite.

BACKGROUND ART

In recent years, a large-scale satellite constellation including several hundred to several thousand satellites has been proposed. In space traffic management (STM), there is an increasing need to create international rules for avoiding a risk of collision due to coexistence of a plurality of satellite constellations.

Patent Literature 1 discloses a technology for forming a satellite constellation composed of a plurality of satellites in the same circular orbit.

CITATION LIST

Patent Literature

Patent Literature 1: JP 2017-114159 A

SUMMARY OF INVENTION

Technical Problem

In a satellite constellation, it is generally arranged that different orbital planes all have the same orbital altitude. Therefore, there is a risk that satellites flying at the same orbital altitude in different orbital planes may collide with each other. A problem is that collision risks increase as the number of orbital planes and the number of satellites in an orbital plane increase.

An object of the present disclosure is to avoid a collision risk in a satellite constellation.

Solution to Problem

A space situational awareness business device according to the present disclosure is a business device with which a space situational awareness business operator manages space object information, and includes
  a space traffic management device that is compatible with space traffic management devices respectively included in business devices that manage space objects, wherein the space situational awareness business device is connected, through the space traffic management device, to a space traffic management system in which the space traffic management devices respectively included in the business devices are mutually connected with a communication line.

Advantageous Effects of Invention

A space situational awareness business device according to the present disclosure includes a space traffic management device that is compatible with space traffic management devices respectively included in business devices that manage space objects, and is connected, through the space traffic management device, to a space traffic management system in which the space traffic management devices respectively included in the business devices are mutually connected with a communication line. Therefore, with the space situational awareness business device according to the present disclosure, there is an effect that a collision risk can be avoided efficiently and accurately for satellites in a satellite constellation.

BRIEF DESCRIPTION OF DRAWINGS

FIG. 62 is an example of a space information recorder of a mega-constellation business device according to Embodiment 12.

DESCRIPTION OF EMBODIMENTS

Figure 1:
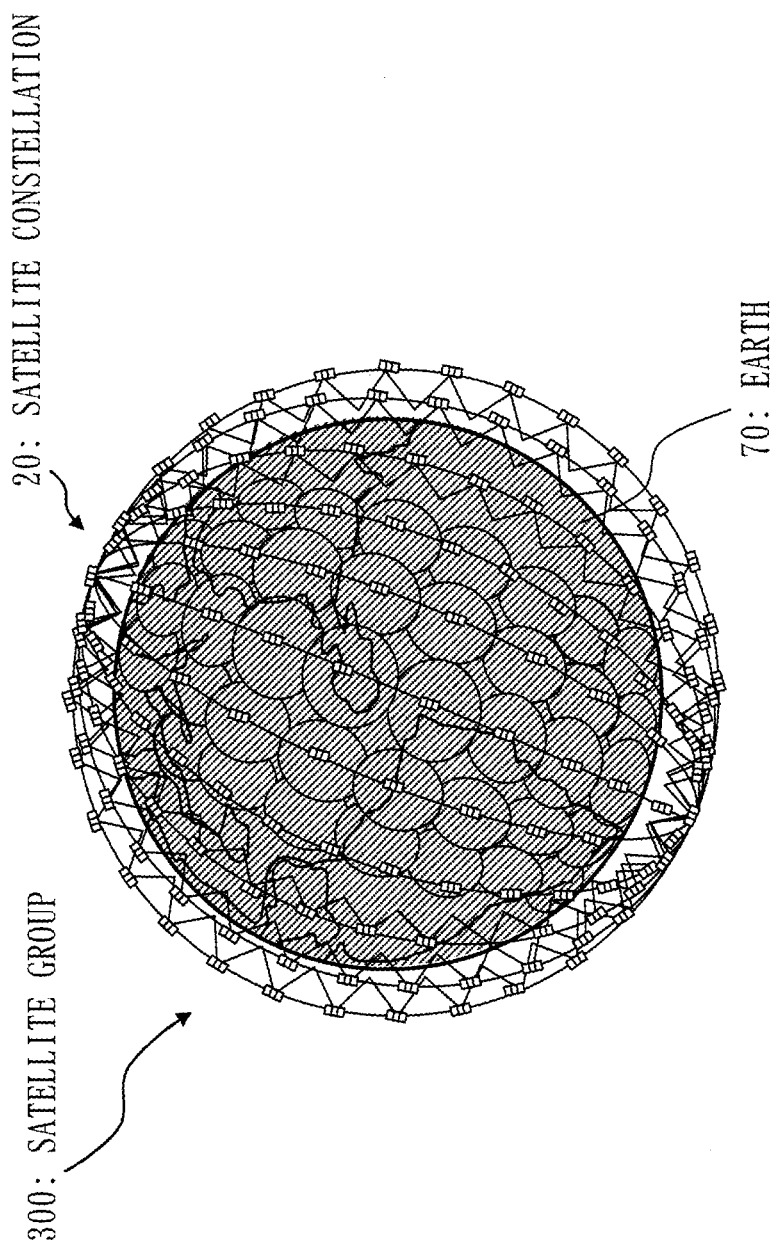
FIG. 1 is an example in which a plurality of satellites realize a communication service to the ground over the entire globe of Earth.

Embodiments of the present disclosure will be described hereinafter with reference to the drawings. Throughout the drawings, the same or corresponding parts are denoted by the same reference signs. In the description of the embodiments, description of the same or corresponding parts will be suitably omitted or simplified. In the drawings hereinafter, the relative sizes of components may be different from actual ones. In the description of the embodiments, directions or positions such as "up", "down", "left", "right", "front", "rear", "top side", and "back side" may be indicated. These terms are used only for convenience of description, and are not intended to limit the placement and orientation of components such as devices, equipment, or parts.

Embodiment 1

FIG. 1 is a diagram illustrating an example in which a plurality of satellites cooperatively realize a communication service to the ground over the entire globe of Earth 70.

FIG. 1 illustrates a satellite constellation 20 that realizes a communication service over the entire globe.

The ground communication service range of each satellite of a plurality of satellites flying at the same altitude in the same orbital plane overlaps the communication service range of a following satellite. Therefore, with such satellites, the satellites in the same orbital plane can provide a communication service to a specific point on the ground in turn in a time-division manner.

However, a communication service can be provided with a single orbital plane only to an area directly below the orbit of satellites. Thus, another orbital plane rotated in the east-west direction with respect to Earth is placed adjacently, and a communication service is concurrently provided by a plurality of satellites in this orbital plane. By providing adjacent orbital planes in this way, communication services can be provided to the ground with widespread coverage across the adjacent orbits. Similarly, by placing a large number of orbital planes at approximately equal intervals around Earth, a communication service to the ground can be provided over the entire globe. When seen from a specific point on the ground, each satellite flies away in a short period of time. However, if satellites in orbit provide a communication service in turn in a time-division manner, a communication service can be provided continuously to any point on the ground. In this case, in order to share the communication service with a following satellite, each satellite provides and accepts necessary signals and information, using an inter-satellite communication method.

When a communication service is realized by a satellite constellation orbiting in low Earth orbit, the service areas of all satellites cover the entire globe, and a communication service for any given ground user is shared and continued by satellites flying above the user in turn while passing on signals and information. As a result, the communication service can be provided continuously to the ground user. By providing each satellite with the communication function between the satellite and the ground and also the inter-satellite communication function, signals and information can be transferred between satellites orbiting in proximity to each other. The transfer of signals and information that contributes to cooperation in a communication service mission will hereinafter be referred to as handover.

In a satellite constellation, it is generally arranged that different orbital planes all have the same orbital altitude. Since the ground speeds of satellites flying at the same orbital altitude are similar, the ground service ranges move according to the ground speeds of the satellites with the relative positional relationship of the service ranges of the individual satellites being maintained. If the service ranges of successive satellites in the same orbital plane or the service ranges of satellites in adjacent orbital planes exhaustively cover the ground surface, the service range will always be maintained when seen from any given point on the ground.

Figure 2:
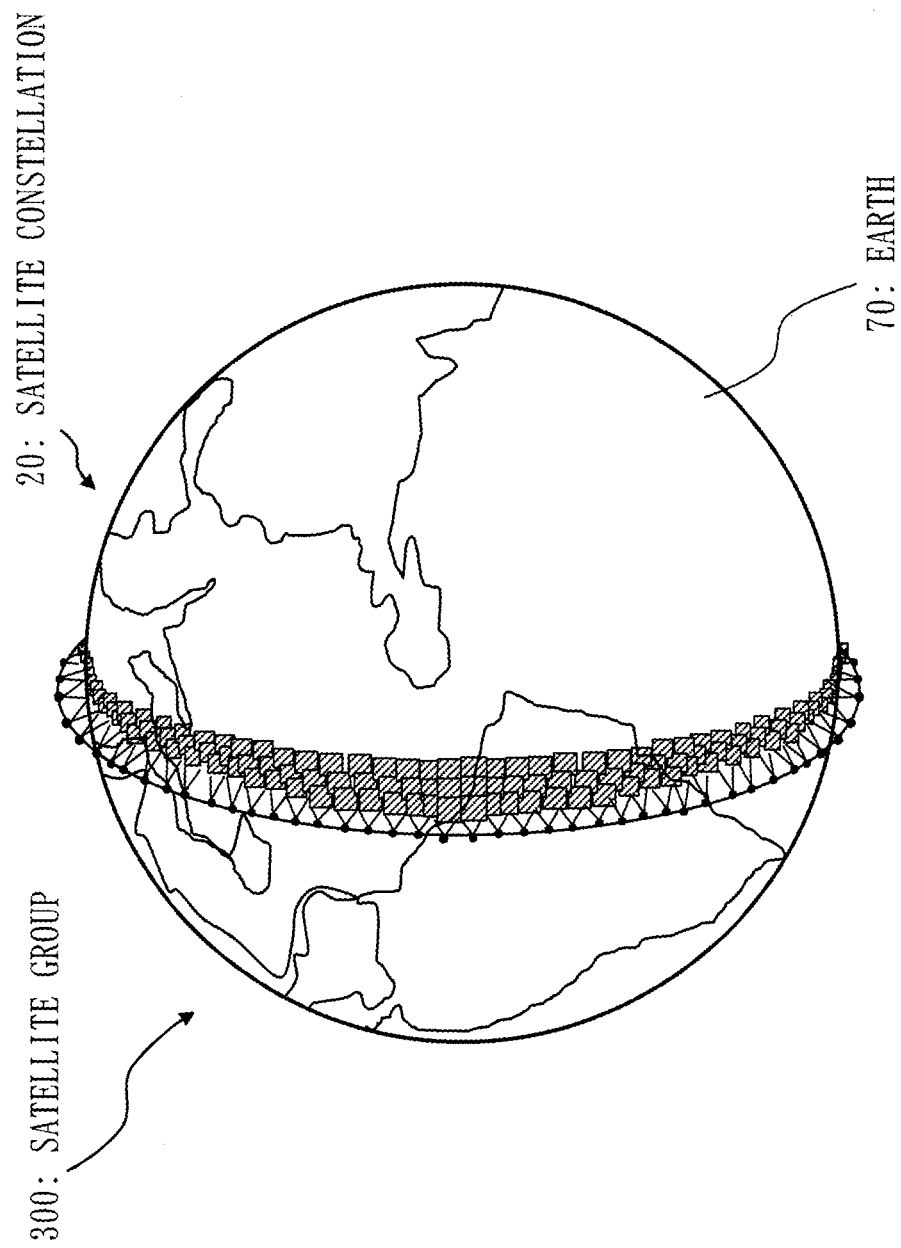
FIG. 2 is an example in which a plurality of satellites in a single orbital plane realize an Earth observation service.

FIG. 2 is a diagram illustrating an example in which an Earth observation service is realized by a plurality of satellites in a single orbital plane.

FIG. 2 illustrates a satellite constellation 20 that realizes an Earth observation service. In the satellite constellation of FIG. 2, satellites each equipped with an Earth observation device, which is an optical sensor or a radio sensor such as synthetic-aperture radar, fly at the same altitude in the same orbital plane. In this way, in a satellite group in which the ground imaging ranges of successive satellites overlap in a time-delay manner, a plurality of satellites in orbit provide an Earth observation service by capturing ground images in turn in a time-division manner. However, with the single orbital plane, a service can be provided only to the vicinity of an area directly below the orbit of the satellites. In contrast to this, if another orbital plane rotated in the east-west direction with respect to Earth is placed adjacently and a service by a plurality of satellites is similarly conducted concurrently, a ground service with widespread coverage between the adjacent orbits is possible. Similarly, by placing a large number of orbital planes at approximately equal intervals around Earth, an Earth observation service can be provided exhaustively over the entire globe. When seen from a specific point on the ground, each satellite flies away in a short period of time. However, if a plurality of satellites in orbit provide a service in turn in a time-division manner, an Earth observation service can always be provided to any given point on the ground.

Description of Configurations

A satellite constellation forming system 100 according to this embodiment forms a satellite constellation 20 having a plurality of orbital planes 21. In each orbital plane 21 of the plurality of orbital planes 21, a plurality of satellites 30 fly at the same orbital altitude.

The satellite constellation 20 formed by the satellite constellation forming system 100 according to this embodiment will be briefly described.

The satellite constellation 20 according to this embodiment is composed of a satellite group 300 made up of a plurality of satellites 30 in each orbital plane 21. In the satellite constellation 20 according to this embodiment, the satellite group 300 provides a service cooperatively. Specifically, the satellite constellation 20 refers to a satellite constellation composed of one satellite group provided by a communications business service company as illustrated in FIG. 1. Specifically, the satellite constellation 20 refers to a satellite constellation composed of one satellite group provided by an observation business service company as illustrated in FIG. 2.

Figure 3:
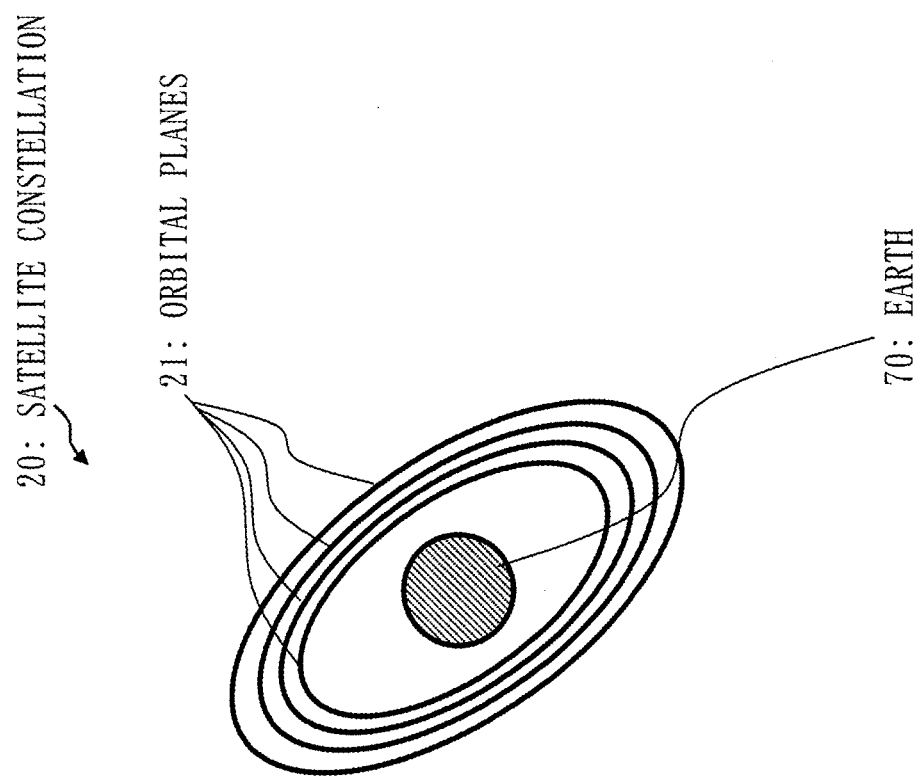
FIG. 3 is a schematic diagram illustrating an example of a plurality of orbital planes of a satellite constellation according to Embodiment 1.

FIG. 3 is a schematic diagram illustrating an example of the orbital planes 21 of the satellite constellation 20 according to this embodiment.

In FIG. 3, the orbital planes 21 in the satellite constellation 20 exist on approximately the same plane. As an example, 20 or more satellites may fly as a plurality of satellites in each of the orbital planes 21.

Figure 4:
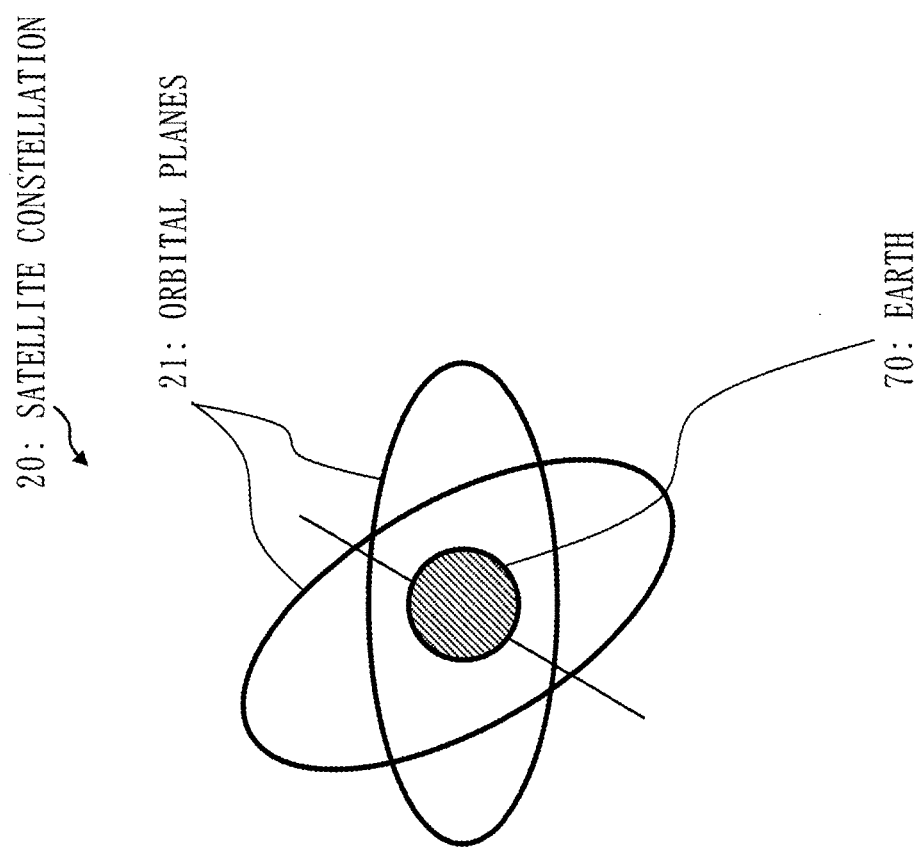
FIG. 4 is a schematic diagram illustrating another example of a plurality of orbital planes of a satellite constellation according to Embodiment 1.

FIG. 4 is a diagram illustrating another example of the orbital planes 21 of the satellite constellation 20 according to this embodiment.

In FIG. 4, the orbital planes 21 in the satellite constellation 20 exist on mutually different planes. In FIG. 4, the orbital inclination of each of the orbital planes 21 is approximately 90 degrees, but the orbital planes do not coincide with each other. That is, the orbital planes 21 intersect with each other. As an example, 20 or more satellites may fly as a plurality of satellites in each of the orbital planes 21. As an example, the satellite constellation 20 of FIG. 4 may have 20 or more orbital planes 21.

Figure 5:
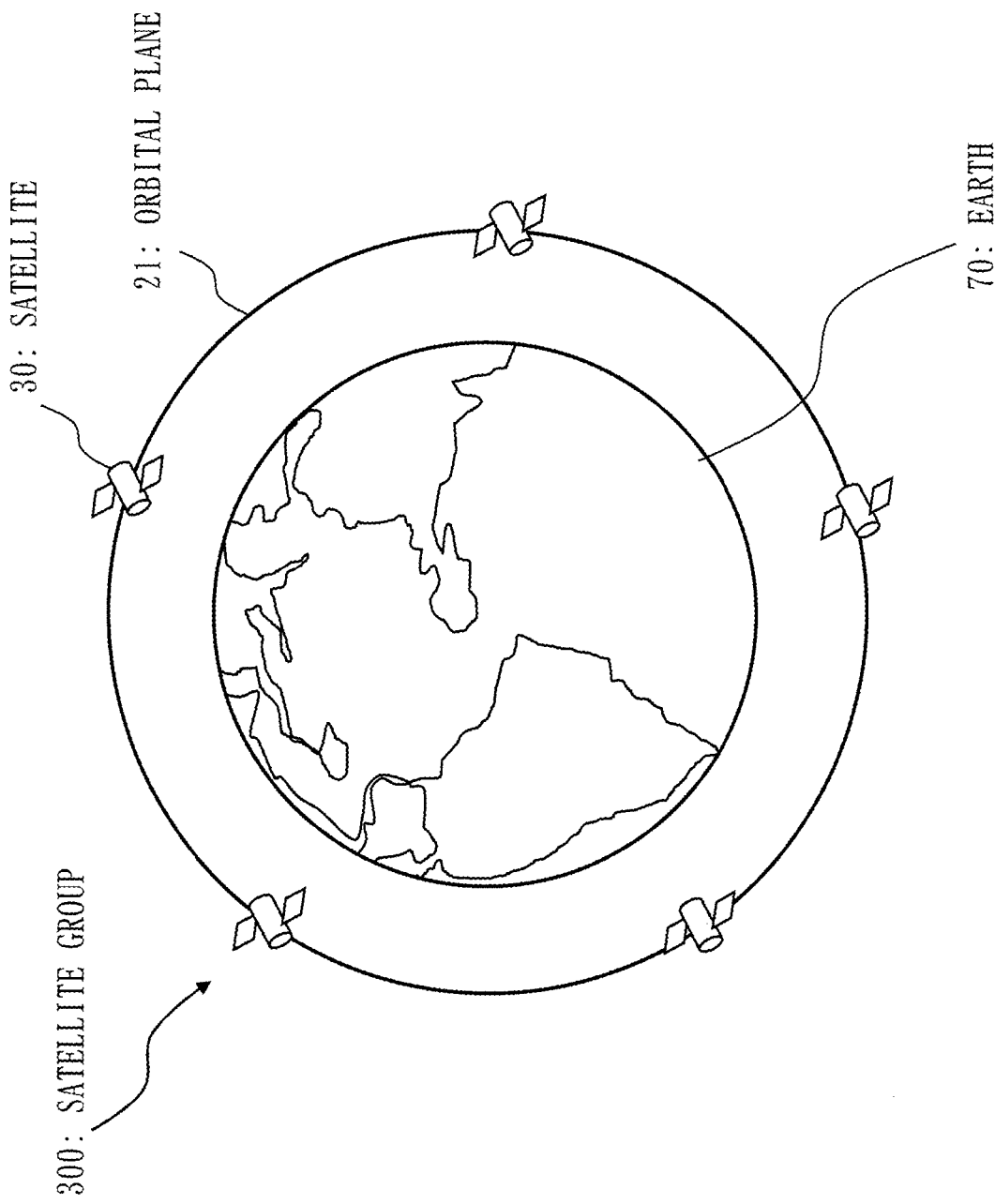
FIG. 5 is an example of a plurality of satellites flying in an orbital plane of a satellite constellation according to Embodiment 1.

FIG. 5 is an example of the satellites 30 flying in one of the orbital planes 21 of the satellite constellation 20 according to this embodiment.

The satellites 30 flying at the same altitude in the same orbital plane fly at relatively the same speeds while maintaining the relative phases in the orbital plane. Therefore, the satellites 30 flying at the same altitude in the same orbital plane will not collide with each other.

Figure 6:
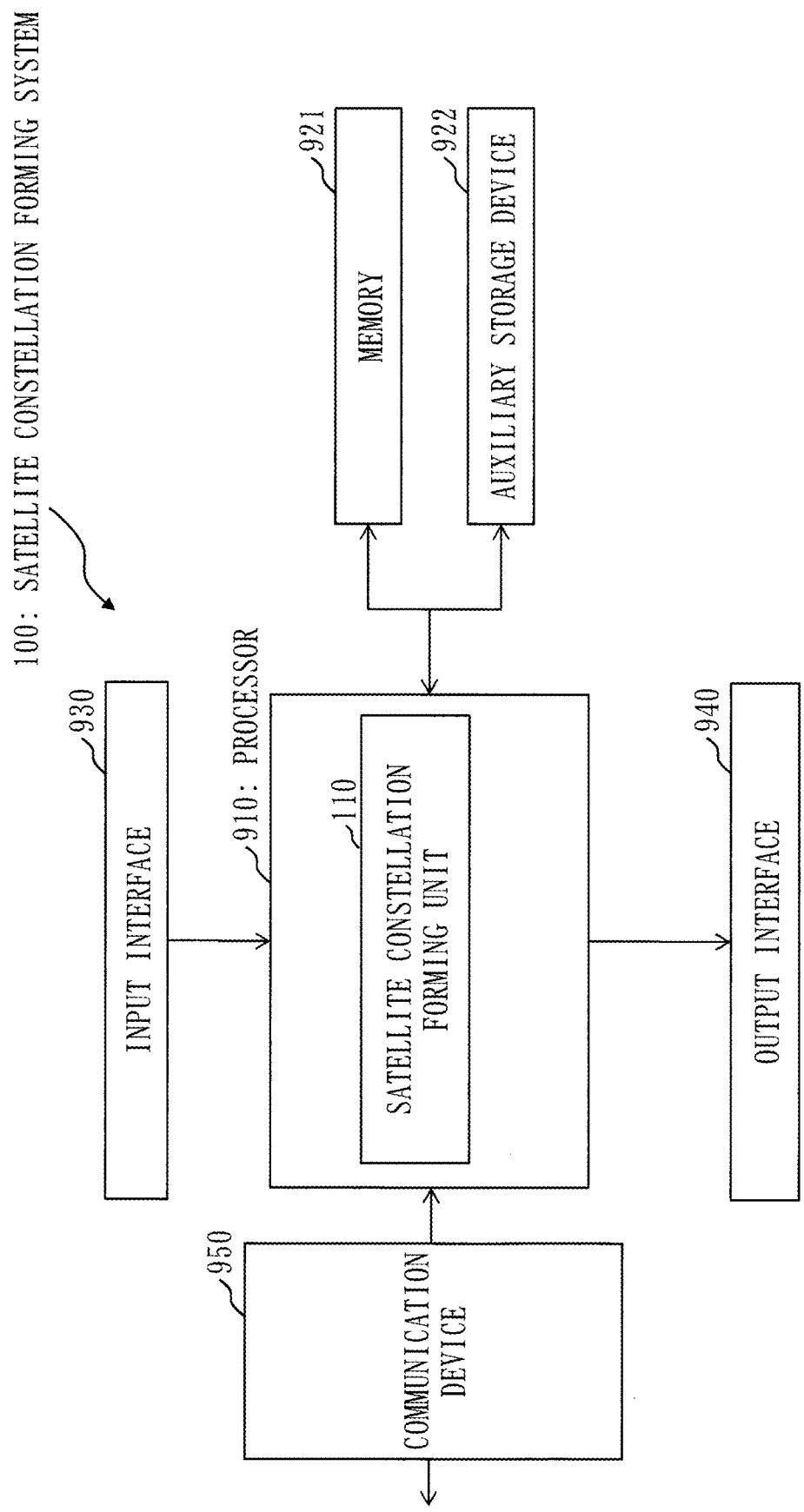
FIG. 6 is a configuration diagram of a satellite constellation forming system according to Embodiment 1.

With reference to FIG. 6, a configuration of the satellite constellation forming system 100 according to this embodiment will be described.

The satellite constellation forming system 100 includes a computer. FIG. 6 illustrates the configuration with one computer. In practice, a computer is included in each of the satellites 30 constituting the satellite constellation 20 and a ground facility that communicates with the satellites 30. The computers provided in each of the satellites 30 and the ground facility that communicates with the satellites 30 cooperatively realize the functions of the satellite constellation forming system 100 according to this embodiment. An example of a configuration of the computer that realizes the functions of the satellite constellation forming system 100 will be described below.

The satellite constellation forming system 100 includes a processor 910, and also includes other hardware components such as a memory 921, an auxiliary storage device 922, an input interface 930, an output interface 940, and a communication device 950. The processor 910 is connected with other hardware components via signal lines and controls these other hardware components.

The satellite constellation forming system 100 includes a satellite constellation forming unit 110 as a functional element. The functions of the satellite constellation forming unit 110 are realized by hardware or software.

The processor 910 is a device that executes a satellite constellation forming program. The satellite constellation forming program is a program that realizes the functions of the satellite constellation forming unit 110.

The processor 910 is an integrated circuit (IC) that performs operational processing. Specific examples of the processor 910 are a CPU, a digital signal processor (DSP), and a graphics processing unit (GPU).

The memory 921 is a storage device to temporarily store data. Specific examples of the memory 921 are a static random access memory (SRAM) and a dynamic random access memory (DRAM).

The auxiliary storage device 922 is a storage device to store data. A specific example of the auxiliary storage device 922 is an HDD. Alternatively, the auxiliary storage device 922 may be a portable storage medium, such as an SD (registered trademark) memory card, CF, a NAND flash, a flexible disk, an optical disc, a compact disc, a Blu-ray (registered trademark) disc, or a DVD. HDD is an abbreviation for Hard Disk Drive. SD (registered trademark) is an abbreviation for Secure Digital. CF is an abbreviation for CompactFlash (registered trademark). DVD is an abbreviation for Digital Versatile Disk.

The input interface 930 is a port to be connected with an input device, such as a mouse, a keyboard, or a touch panel. Specifically, the input interface 930 is a Universal Serial Bus (USB) terminal. The input interface 930 may be a port to be connected with a local area network (LAN).

The output interface 940 is a port to which a cable of an output device, such as a display, is to be connected. Specifically, the output interface 940 is a USB terminal or a High Definition Multimedia Interface (HDMI, registered trademark) terminal. Specifically, the display is a liquid crystal display (LCD).

The communication device 950 has a receiver and a transmitter. Specifically, the communication device 950 is a communication chip or a network interface card (NIC). In the satellite constellation forming system 100, communication between the ground facility and a satellite or inter-satellite communication is performed via the communication device 950.

The satellite constellation forming program is read into the processor 910 and executed by the processor 910. The memory 921 stores not only the satellite constellation forming program but also an operating system (OS). The processor 910 executes the satellite constellation forming program while executing the OS. The satellite constellation forming program and the OS may be stored in the auxiliary storage device. The satellite constellation forming program and the OS that are stored in the auxiliary storage device are loaded into the memory 921 and executed by the processor 910. Part or the entirety of the satellite constellation forming program may be embedded in the OS.

The satellite constellation forming system 100 may include a plurality of processors as an alternative to the processor 910. These processors share the execution of the satellite constellation forming program. Each of the processors is, like the processor 910, a device that executes the satellite constellation forming program.

Data, information, signal values, and variable values that are used, processed, or output by the satellite constellation forming program are stored in the memory 921 or the auxiliary storage device 922, or stored in a register or a cache memory in the processor 910.

"Unit" of the satellite constellation forming unit 110 may be interpreted as "process", "procedure", or "step". "Process" of the satellite constellation formation process may be interpreted as "program", "program product", or "computer readable storage medium recording a program".

The satellite constellation forming program causes a computer to execute each process, each procedure, or each step, where "unit" of the above satellite constellation forming unit is interpreted as "process", "procedure", or "step". A satellite constellation forming method is a method performed by execution of the satellite constellation forming program by the satellite constellation forming system 100.

The satellite constellation forming program may be stored and provided in a computer readable recording medium or storage medium. Alternatively, the satellite constellation forming program may be provided as a program product.

Description of Operation

Figure 7:
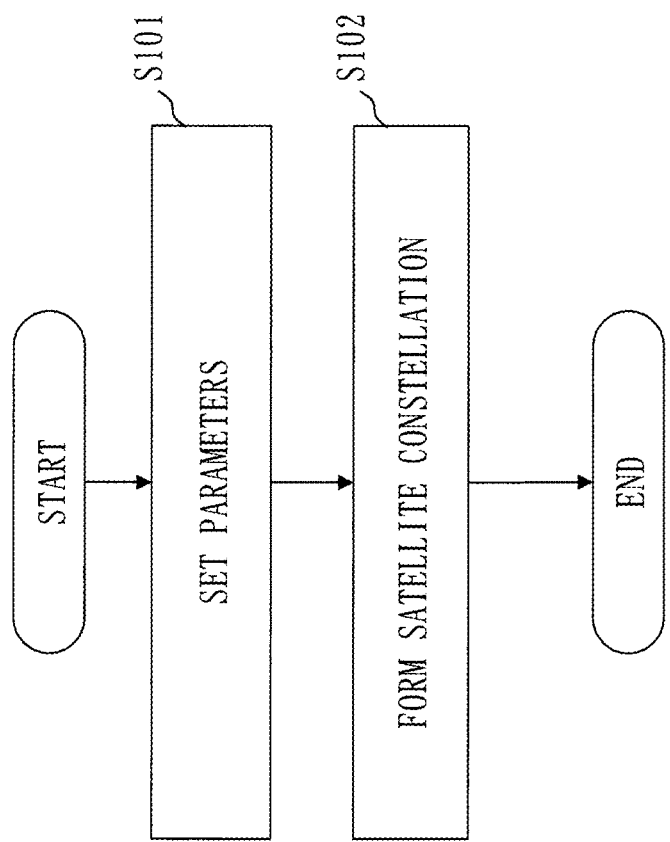
FIG. 7 is a diagram illustrating operation of the satellite constellation forming system according to Embodiment 1.

With reference to FIG. 7, operation of the satellite constellation forming system 100 according to this embodiment will be described.

In step S101, parameters are set in the satellite constellation forming system 100 so that the orbital planes 21 in the satellite constellation 20 have mutually different orbital altitudes.

In step S102, the satellite constellation forming unit 110 forms the satellite constellation 20 in which the orbital planes 21 have mutually different orbital altitudes. Using the preset parameters, the satellite constellation forming unit 110 forms the satellite constellation 20 in which the orbital planes 21 have mutually different orbital altitudes. As an example, 20 or more satellites may fly as a plurality of satellites in each of the orbital planes 21. As an example, the satellite constellation 20 of FIG. 4 may have 20 or more orbital planes 21.

The case in which the satellite constellation forming unit 110 forms the satellite constellation 20 in which the orbital planes 21 exist on mutually different planes (see FIG. 4) will be described in more detail. As described above, the satellites 30 of the satellite constellation 20 of FIG. 4 provide a service to a point on the ground in turn in a time-division manner.

In order to prevent a collision by making two objects fly at different orbital altitudes, consideration needs to be given to the sizes and shapes of the two objects and also to the positioning accuracy when tracking control is performed on the ground. For example, when the sizes of the objects are about 1 m, if their accurate positions are known, a collision can be avoided by maintaining an altitude difference of 3 m or more. However, if errors are included in four elements, position coordinates and time (x, y, z, t), a possibility of collision remains.

A satellite constellation business operator is considered to be capable of maintaining a positioning accuracy of about 100 m at any time point for its own satellites. Therefore, by setting the altitude difference between different orbital planes to 200 m or more, it is possible to form the satellite constellation 20 having the orbital planes 21 with mutually different orbital altitudes according to this embodiment. Alternatively, the satellite constellation 20 having the orbital planes 21 with mutually different orbital altitudes according to this embodiment may be formed by setting the altitude difference between different orbital planes to 300 m or more with a margin. If the number of orbital planes in the satellite constellation 20 is about 20 planes, the satellite constellation forming unit 110 can construct the satellite constellation 20 in the range of an altitude difference of about 6 km.

When a satellite business operator not having means for improving satellite positioning is to prevent a collision based on public information, the positioning accuracy at any time point is expected to deteriorate to about 500 m to 1 km. Therefore, the satellite constellation 20 having the orbital planes 21 with mutually different orbital altitudes according to this embodiment can be formed by setting the altitude difference between different orbital planes to 2 km or more. Alternatively, the satellite constellation 20 having the orbital planes 21 with mutually different orbital altitudes according to this embodiment may be formed by setting the altitude difference between different orbital planes to 3 km or more with a margin. If the number of orbital planes in the satellite constellation 20 is about 20 planes, the satellite constellation forming unit 110 can construct the satellite constellation 20 in the range of an altitude difference of about 60 km.

In recent years, an orbital object surveillance technology called space situational awareness (SSA) has been attracting attention. If surveillance accuracy improvement called a space fence concept is realized by this, even a satellite business operator not having a satellite positioning improvement technique can realize a satellite constellation with a reduced altitude difference.

Next, the case in which the satellite constellation forming unit 110 forms the satellite constellation 20 in which the orbital planes 21 exist on the same plane (see FIG. 3) will be described in more detail. As described above, the satellites 30 of the satellite constellation 20 of FIG. 3 provide a service to a point on the ground in turn in a time-division manner.

In an Earth observation service realized by the satellite constellation 20 of FIG. 3, it is not always necessary to continue the service constantly, unlike a communication service. On the other hand, an Earth observation service is required to "allow any point to be imaged whenever the need arises". For this reason, it is desirable to form the satellite constellation 20 with satellites each provided with an Earth observation device equipped with a device to change the line of sight to at least a cross-track direction perpendicular to a traveling direction of the satellite. By providing the satellites with the function of changing the line of sight so as to cover the distance between adjacent orbits above the equator, any point in the entire globe can be imaged at any time anywhere. This has the effect of allowing the satellite constellation to be constructed with a smaller number of orbital planes when compared with a satellite constellation using Earth observation devices having individually fixed lines of sight, so that system construction costs can be reduced.

In addition, with respect to the traveling direction of the satellite, it is also not always necessary to exhaustively cover the range of the line of sight in which imaging is possible, and if a succeeding satellite or a satellite in an adjacent orbital plane can capture images by changing the line of sight, the number of satellites in the same orbital plane can be reduced. If the range in which the line of sight can be changed is about 2000 km in terms of the ground surface, the entire globe may be covered using only two or three satellites per orbital plane.

Other Configurations

In this embodiment, the functions of the satellite constellation forming unit 110 are realized by software. As a variation, the functions of the satellite constellation forming unit 110 may be realized by hardware.

The satellite constellation forming system 100 includes an electronic circuit in place of the processor 910.

The electronic circuit is a dedicated electronic circuit that realizes the functions of the satellite constellation forming unit 110.

Specifically, the electronic circuit is a single circuit, a composite circuit, a programmed processor, a parallel-programmed processor, a logic IC, a GA, an ASIC, or an FPGA. GA is an abbreviation for Gate Array. ASIC is an abbreviation for Application Specific Integrated Circuit. FPGA is an abbreviation for Field-Programmable Gate Array.

The functions of the satellite constellation forming unit 110 may be realized by one electronic circuit, or may be distributed among and realized by a plurality of electronic circuits.

As another variation, some of the functions of the satellite constellation forming unit 110 may be realized by the electronic circuit, and the rest of the functions may be realized by software.

Each of the processor and the electronic circuit is also called processing circuitry. That is, in the satellite constellation forming system 100, the functions of the satellite constellation forming unit 110 are realized by the processing circuitry.

Description of Effects of this Embodiment

In the satellite constellation forming system according to this embodiment, a plurality of satellites in orbit provide a service in a specific point on the ground in turn in a time-division manner. On any given orbital plane, a plurality of satellites flying at the same altitude fly at approximately equal intervals. In addition, a satellite constellation composed of a plurality of orbital planes with mutually different orbital altitudes is formed.

In the satellite constellation forming system according to this embodiment, satellites flying in the same orbital plane at the same altitude fly at relatively the same speeds while maintaining the relative phases in the orbital plane, so they will not collide with each other. In different orbital planes, although a collision may occur on an intersection line between two planes, satellites flying at mutually different orbital altitudes will not collide with each other. In this way, when different orbital planes have mutually different orbital altitudes, there is an effect that a collision risk can be avoided for all satellites in the satellite constellation.

That satellites flying in the same orbital plane at different orbital altitudes will not collide with each other, as in the satellite constellation according to this embodiment, also holds between satellite constellations. Therefore, the basic concept according to this embodiment is also effective for avoiding a collision in a plurality of satellite constellations. In STM, where the need to create international rules in congested outer space has been emphasized in recent years, this has the effect of being able to provide a scheme for allowing satellites to coexist while avoiding a collision. That is, according to the satellite constellation forming system of this embodiment, there is an effect that a collision between satellites can be avoided even when a vast number of satellites, such as several thousand satellites, are congested at altitudes in proximity to each other.

Embodiment 2

In this embodiment, differences from or additions to Embodiment 1 will be mainly described. Components that are substantially the same as those in Embodiment 1 are denoted by the same reference signs, and description thereof may be omitted.

In this embodiment, an aspect in which the satellite constellation forming unit 110 forms a satellite constellation 20 in which relative altitude differences between adjacent orbital planes in a plurality of orbital planes are arranged to be sinusoidal will be described.

Figure 8:
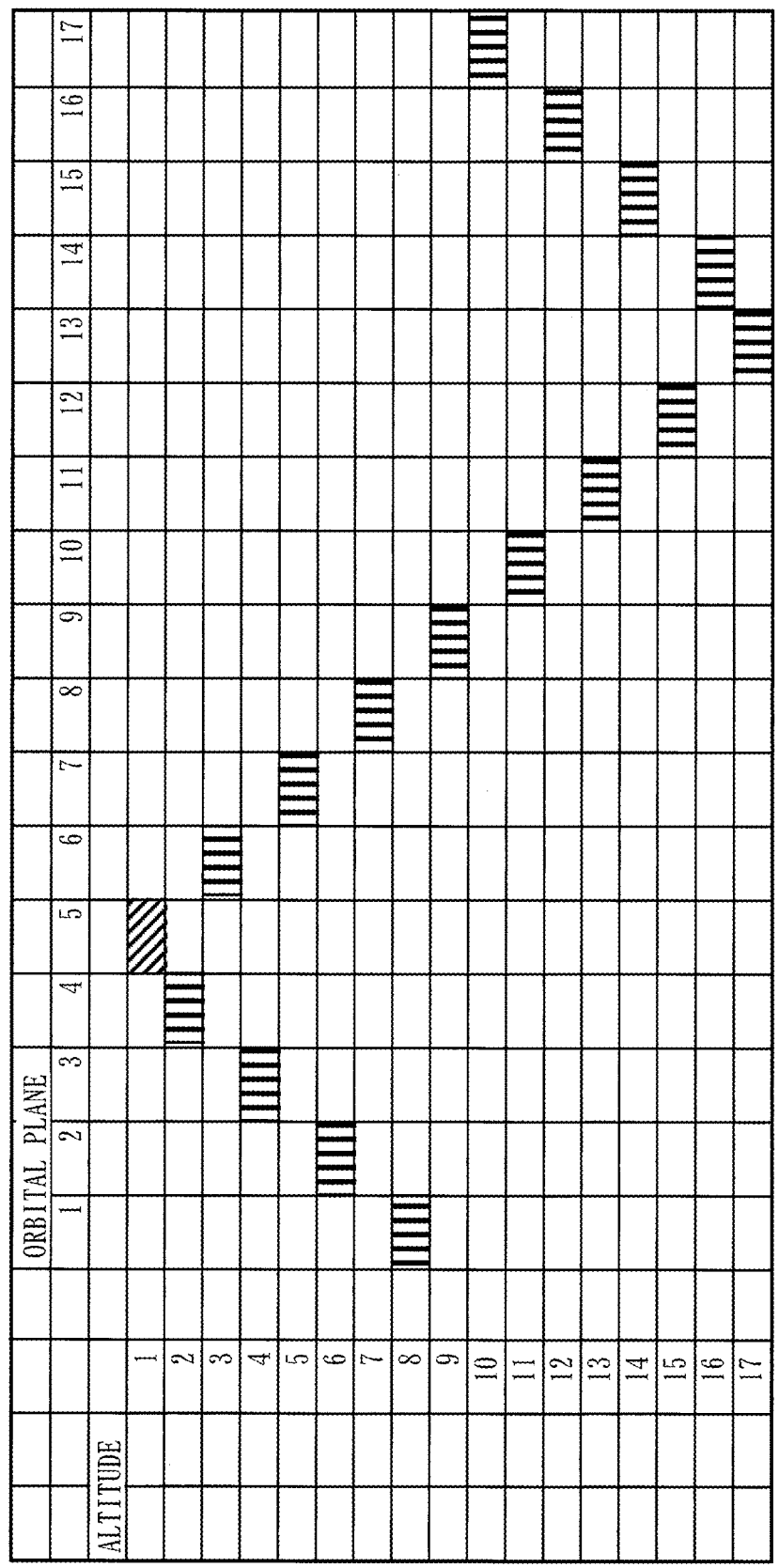
FIG. 8 is a diagram illustrating relative altitude differences in a plurality of orbital planes according to Embodiment 2.

FIG. 8 is a diagram illustrating relative altitude differences in a plurality of orbital planes according to this embodiment.

FIG. 8 illustrates relative altitude differences in orbital planes in a satellite constellation 20 having 17 orbital planes. The vertical axis indicates that the altitude of orbital plane 1 is highest, and the altitude becomes lower in descending order, and does not indicate the distance. FIG. 8 indicates that when orbital plane 1 is used as a reference plane and differences between adjacent planes are plotted, such as a difference in orbital altitude between orbital plane 1 and orbital plane 2 and a difference in orbital altitude between orbital plane 2 and orbital plane 3, this results in a sinusoidal shape.

If the altitudes of adjacent orbital planes are significantly different, the distance of handover by inter-satellite communication will be long and the drive angle range for mutually matching communication antennas will be wide, which are disadvantages. In contrast to this, in the satellite constellation 20 according to this embodiment, the altitude differences between adjacent orbits are constrained, so that the relative differences change gradually. Therefore, handover that contributes to mission cooperation with a nearby satellite is facilitated.

In an Earth observation satellite, the image quality of an optical sensor, for example, depends on the satellite altitude. Thus, by arranging the altitude difference between adjacent orbits to be small, there is an effect that high-quality images with no inconsistency between image scenes can be obtained.

With a satellite constellation equipped with optical sensors that capture images of the ground surface and are capable of imaging in an area wider than the distance between adjacent orbits above the equator, images of the entire globe can be captured exhaustively. Since the resolution and observation width of an optical sensor depend on the orbital altitude, in the case of a satellite constellation employing optical sensors of the same specifications, the resolution is highest and the observation width is smallest when images are captured under the lowest orbital altitude condition. Therefore, if the observation width of an optical sensor under the lowest orbital altitude condition is greater than the distance between adjacent orbits above the equator, images of the ground surface can be captured exhaustively, including above the equator.

If the altitudes of adjacent orbits are significantly different, discontinuities involving different resolutions are likely to appear at joints of images. However, in the satellite constellation forming system according to this embodiment, the altitude differences between adjacent orbits are constrained, so that there is an effect that image data of the entire globe with good image quality without noticeable joints of images can be obtained. Also note that the greater the difference in satellite altitude, the faster the relative movement speeds of the ground service ranges. Thus, in the satellite constellation forming system according to this embodiment, the relative movement amounts of adjacent service areas can be minimized, so that there is an effect that the transfer of data to a following satellite, called handover, in communication is facilitated and errors can be readily reduced.

Embodiment 3

In this embodiment, differences from or additions to Embodiments 1 and 2 will be mainly described. Components that are substantially the same as those in Embodiments 1 and 2 are denoted by the same reference signs, and description thereof may be omitted.

In this embodiment, the satellite constellation forming unit 110 forms a satellite constellation 20 in which the radius of the ground service range per satellite is approximately $\sqrt{2}/2$ or more of the distance between adjacent orbits above the equator. Specifically, in this satellite constellation 20, the radius of the ground service range per satellite in an orbital plane with the lowest orbital altitude secures coverage of approximately $\sqrt{2}/2$ or more of the distance between adjacent orbits above the equator.

Figure 9:
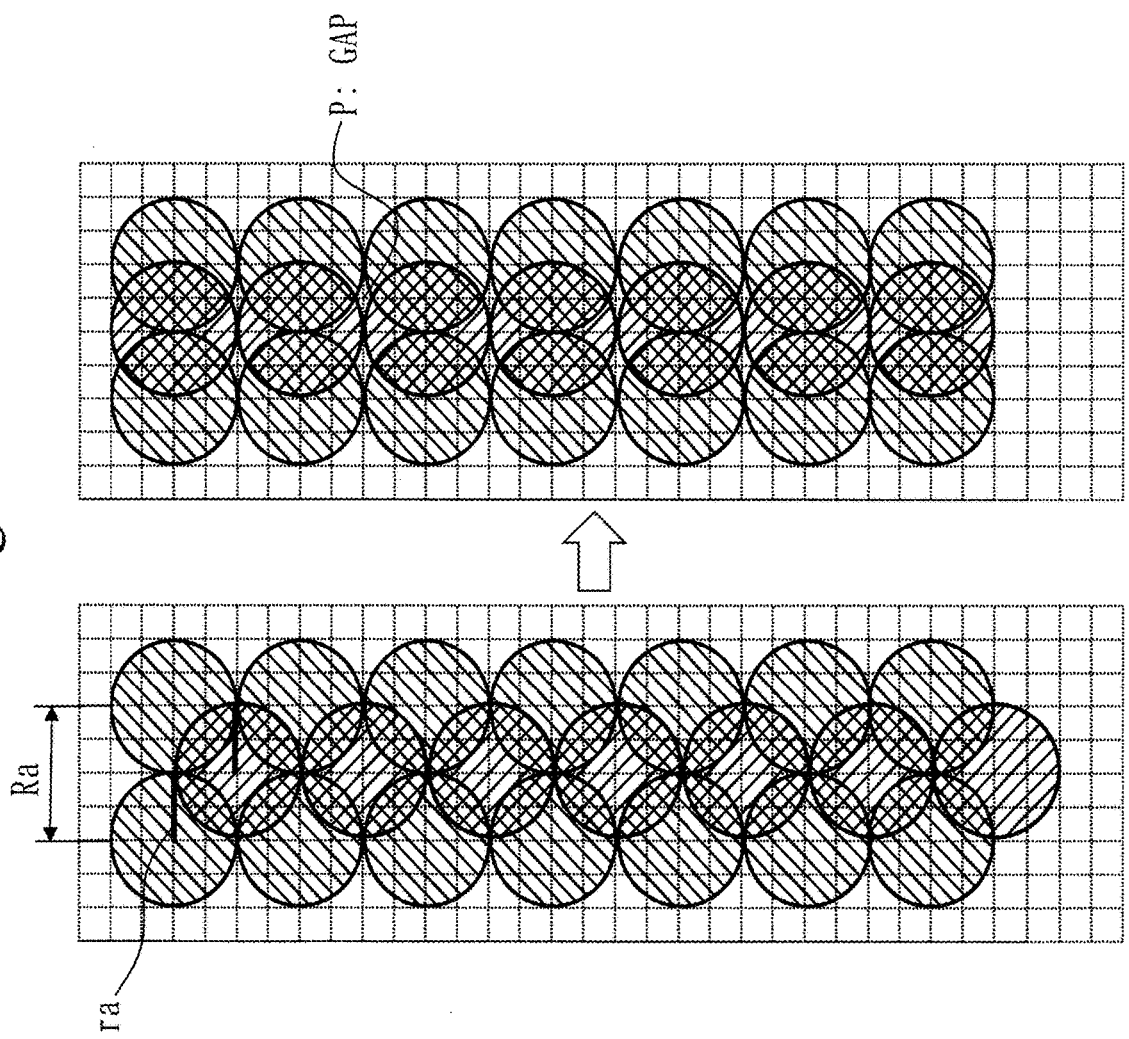
FIG. 9 is a diagram illustrating ground service ranges of a comparison example.

FIG. 9 is a diagram illustrating the ground service ranges of a comparison example.

When the relative positions of satellites are in an optimum state, the service ranges can cover the entire globe if the radius of each ground service range is secured comparably to the distance between adjacent orbits above the equator. If the altitudes of satellites are the same in all orbital planes, the relative relationship of service areas is maintained, so that a service can always be continuously provided covering the entire globe. However, in orbital planes with different orbital altitudes, the traveling speeds of satellites vary depending on the altitudes of the satellites. Thus, if the service areas secured exhaustively when the relative positions of the satellites are in the optimum state move relatively, gaps P, that is, areas that cannot be serviced may occur.

FIG. 9 illustrates the ground service ranges of three orbital planes. The radius ra of the ground service range is one-half of the distance Ra between adjacent orbits above the equator. In this case, as indicated in FIG. 9, if the ground service range of the middle orbital plane shifts forward by 45 degrees, areas that cannot be serviced (gaps) will occur.

Figure 10:
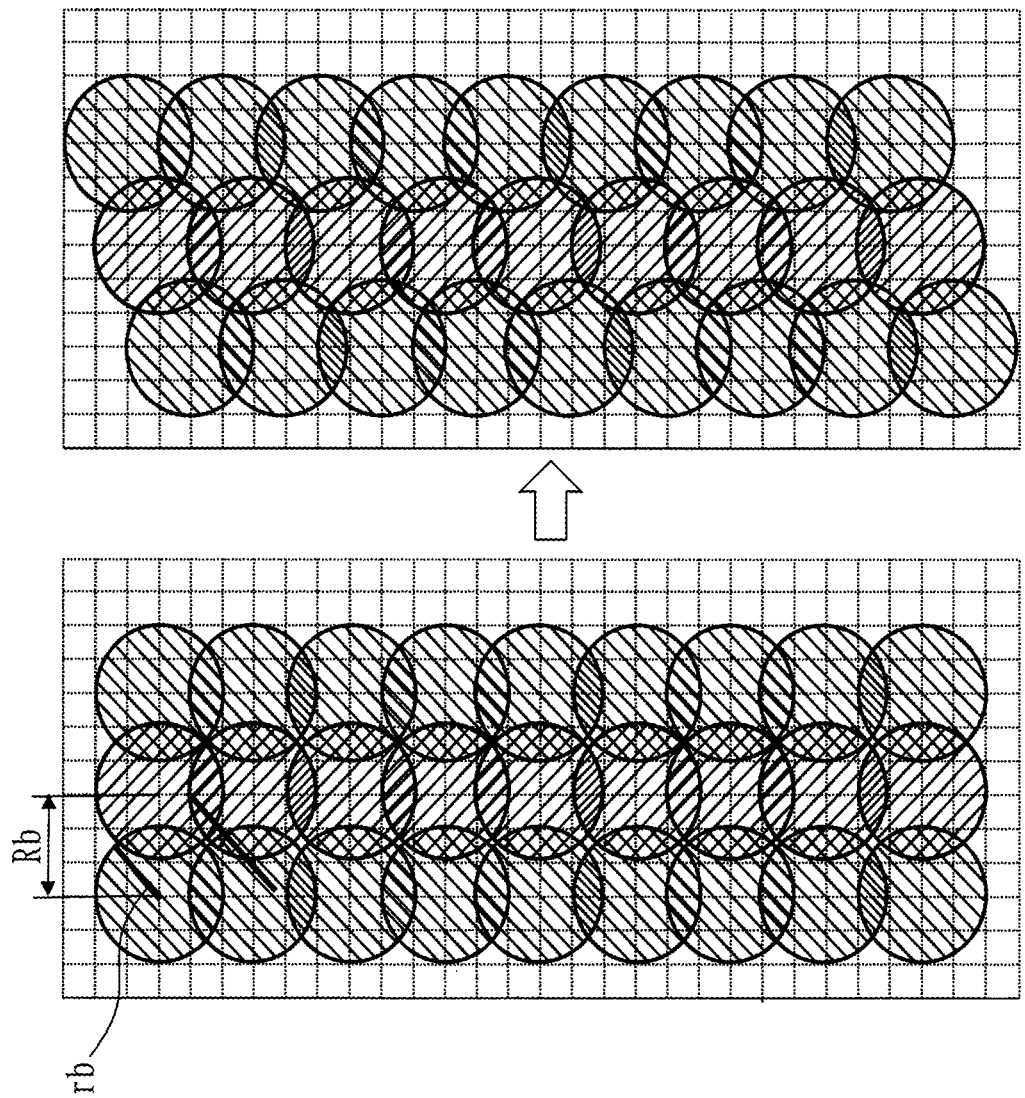
FIG. 10 is a diagram illustrating ground service ranges according to Embodiment 3.

FIG. 10 is a diagram illustrating the ground service ranges according to this embodiment.

In FIG. 10, the radius rb of the ground service range is $\sqrt{2}/2$ of the distance Rb between adjacent orbits above the equator. In this case, as indicated in FIG. 10, even if the ground service range of each orbital plane shifts by 45 degrees, areas in which service is not available (gaps) will not occur.

As described above, with the satellite constellation forming system according to this embodiment, even when the relative positions of satellites are in the worst state, that is, the service area of an adjacent orbit is located approximately 45 degrees forward, no gaps occur in the service areas. Therefore, with the satellite constellation forming system according to this embodiment, there is an effect that a service can be continued exhaustively over the entire globe without interruption even if the service area of an adjacent orbit moves relatively in the satellite traveling direction.

Embodiment 4

In this embodiment, differences from and additions to Embodiments 1 to 3 will be mainly described. Components that are substantially the same as those in Embodiments 1 to 3 are denoted by the same reference signs, and description thereof may be omitted.

In this embodiment, an aspect in which the satellite constellation forming unit 110 forms a satellite constellation 20 in which the orbital altitude of each of a plurality of orbital planes satisfies conditions for a sun-synchronous orbit will be described. In addition, an aspect in which the satellite constellation forming unit 110 forms a satellite constellation 20 in which the orbital altitudes of a plurality of orbital planes consist of only sun-synchronous sub-recurrent orbits will be described.

Figure 11:
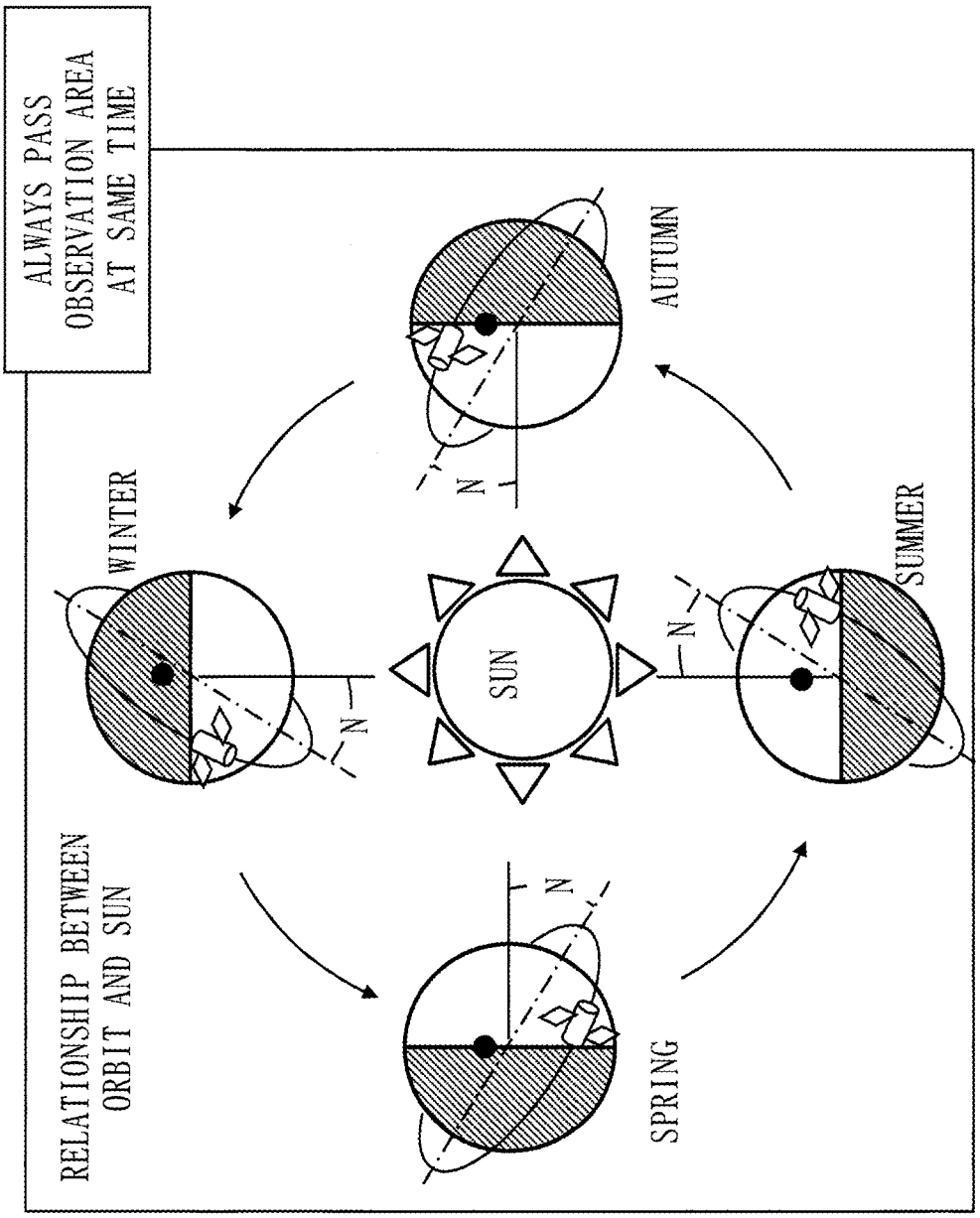
FIG. 11 is a diagram illustrating an orbital plane that satisfies conditions for a sun-synchronous orbit according to Embodiment 4.

FIG. 11 is a diagram illustrating an orbital plane that satisfies conditions for a sun-synchronous orbit.

In an optical satellite of an Earth observation satellite, it is desirable to continue observation under approximately the same sunlight incidence angle condition. For this reason, an orbit of a satellite called a sun-synchronous satellite is often used. The orbit of a sun-synchronous satellite is such that the angle between the normal to the orbital plane, around which the orbital plane makes one revolution each year in synchronization with the revolution of Earth, and the direction of the sun is generally constant. The orbit of a sun-synchronous satellite is an orbit in which the local sun time (LST) of Earth is the same throughout the year.

Orbital altitudes that satisfy the conditions for a sun-synchronous orbit exist intermittently. In this embodiment, a satellite constellation 20 in which orbital planes have only orbital altitudes that satisfy the conditions for a sun-synchronous orbit is formed. With the satellite constellation 20 like this, it is possible to realize the satellite constellation in which each orbital plane continues a service with desired LST and there is no collision risk.

With an optical sensor, the brightness and S/N characteristic of an image change depending on the sunlight incidence angle. For this reason, in many cases, an Earth observation service is provided continuously using a sun-synchronous orbit under the condition that the sunlight incidence angle with respect to the orbital plane is constant. Furthermore, orbital planes of LST 10:00 to 11:00 are often used because a sufficient amount of light can be secured and there is no direct sea surface reflection. However, imaging is not possible "anytime, anywhere" with only a satellite group of LST 10:30 or thereabout. Therefore, it is effective to improve the imaging frequency by combining satellite groups having orbital planes of different LSTs.

For example, orbital planes of LST 9:00 and LST 12:00 are added in addition to LST 10:30. In this case, it may be possible to capture images roughly every 90 minutes, and if the time required for a low Earth orbit satellite to complete one orbit around Earth is about 90 to 100 minutes, there is an effect that the imaging frequency at any point can be improved, including imaging opportunities in the next round. Furthermore, if the number of satellites in the same orbital plane increases, widespread coverage is also possible. If LSTs are arranged at equal intervals similarly, imaging is possible "anytime, anywhere" in principle.

An optical sensor that can capture only visible images cannot capture images at night, but an infrared sensor or a radio sensor can capture images at any time including at night.

With a satellite constellation equipped with optical sensors that capture images of the ground surface and are capable of capturing images in a wider area than the distance between adjacent orbits above the equator, images of the entire globe can be captured exhaustively. Since the resolution and observation width of an optical sensor depend on the orbital altitude, in the case of a satellite constellation using optical sensors with the same specifications, the resolution is highest and the observation width is smallest when images are captured under the lowest orbital altitude condition. Therefore, if the observation width of an optical sensor under the lowest orbital altitude condition is greater than the distance between adjacent orbits above the equator, images of the ground surface can be captured exhaustively, including above the equator. If the altitudes of adjacent orbits are significantly different, discontinuities involving different resolutions are likely to appear at joints of images. However, also in this embodiment, when the satellite constellation according to Embodiment 2 is adopted, there is an effect that the altitude differences between adjacent orbits are constrained and image data of the entire globe with good image quality without noticeable joints of images can be obtained.

Variation of this Embodiment

As a variation of this embodiment, an aspect in which the satellite constellation forming unit 110 forms a satellite constellation 20 in which the orbital altitudes of a plurality of orbital planes consist of only sun-synchronous sub-recurrent orbits will be described.

A sun-synchronous sub-recurrent orbit is an orbit such that the ground projection line of a satellite's orbit is retraced after making several orbits, and is often used by an Earth observation satellite. Orbital altitudes that conform to the conditions for a sun-synchronous sub-recurrent orbit is a subset of orbital altitudes that conform to a sun-synchronous orbit.

The satellite constellation 20 in which the orbital altitudes of a plurality of orbital planes consist of only sun-synchronous sub-recurrent orbits facilitates operation planning, imaging planning, and data processing for performing steady-state observation of the same ground point by an Earth observation satellite repeatedly over a long period of time. Moreover, there is an effect that a satellite constellation without collision risks can be realized.

If there is no particular requirement for the recurrence period, the orbital altitudes of sun-synchronous sub-recurrent orbits can be composed of, for example, orbital altitudes of about 540 km (recurrence in 15 days), about 539 km (recurrence in 14 days), about 537 km (recurrence in 13 days), about 535 km (recurrence in 12 days), about 533 km (recurrence in 11 days), and about 530 km (recurrence in 10 days). With these six orbital planes, the satellite constellation 20 can be realized with altitude differences within about 10 km maximum.

For example, in a case in which only orbits with the recurrence period of 13 days are to be used, if about 537 km, about 514 km, about 491 km, about 467 km, about 445 km, and about 422 km are used, the satellite constellation 20 can be realized with six orbital planes with altitude differences within about 115 km maximum.

Embodiment 5

In this embodiment, differences from or additions to Embodiment 1 will be mainly described. Components that are substantially the same as those in Embodiment 1 are denoted by the same reference signs, and description thereof may be omitted.

Figure 12:
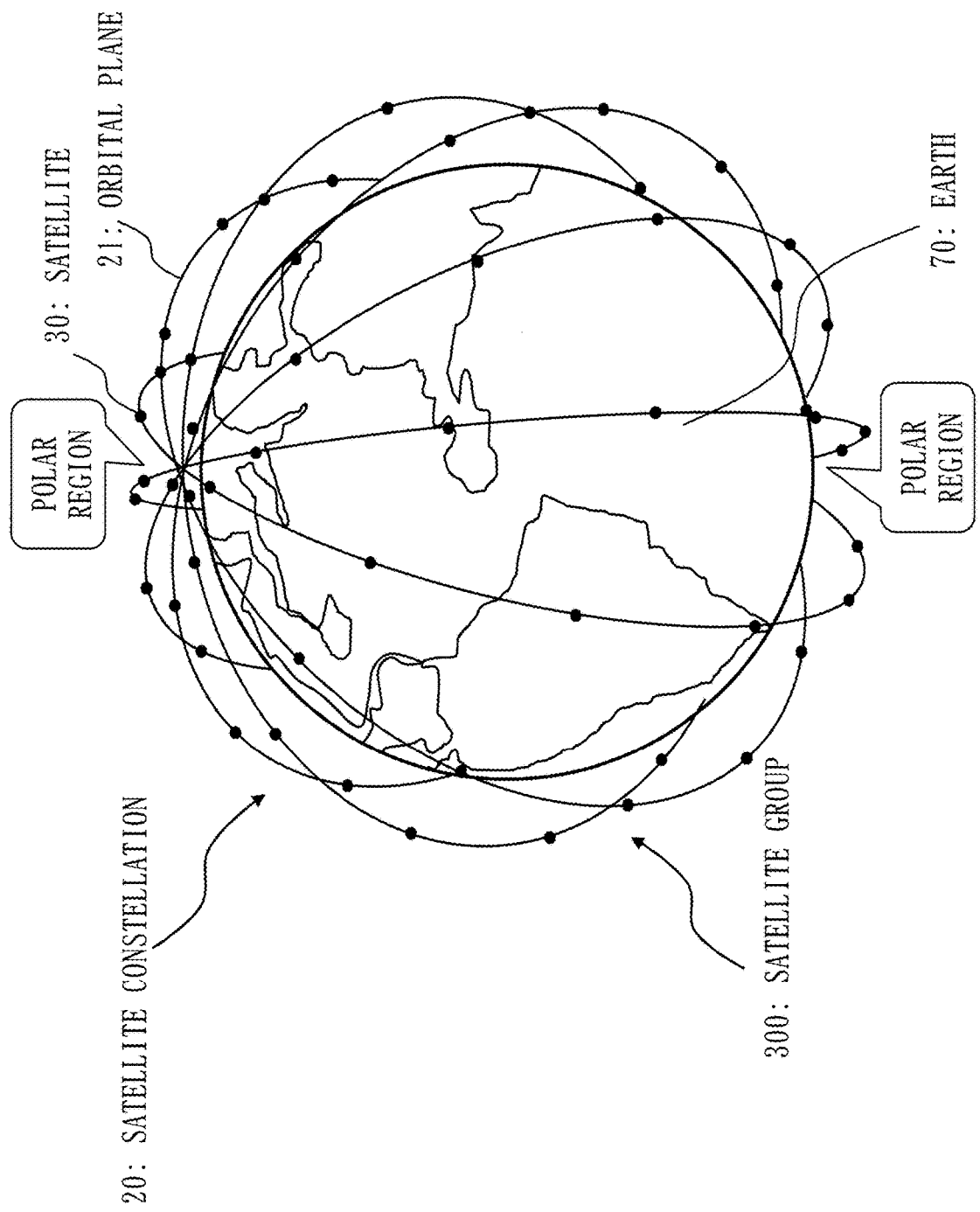
FIG. 12 is an example of a satellite constellation formed by the satellite constellation forming system according to Embodiment 5.

FIG. 12 is a diagram illustrating an example of a satellite constellation 20 formed by the satellite constellation forming system 100 according to this embodiment.

The satellite constellation 20 according to this embodiment is composed of a satellite group 300. In the satellite constellation 20, the satellite group 300 provides a service cooperatively. The satellite constellation 20 has a plurality of orbital planes 21 in which a plurality of satellites 30 fly at the same orbital altitude in each orbital plane 21.

In the satellite constellation 20 according to this embodiment, the orbital altitudes of the orbital planes 21 are the same and the orbital planes 21 exist on mutually different planes.

In the satellite constellation 20 illustrated in FIG. 12, the orbital inclination of each of the orbital planes 21 is about 90 degrees, and the orbital planes 21 exist on mutually different planes. Therefore, in the satellite constellation 20 illustrated in FIG. 12, the orbital planes 21 intersect in the polar regions.

Figure 13:
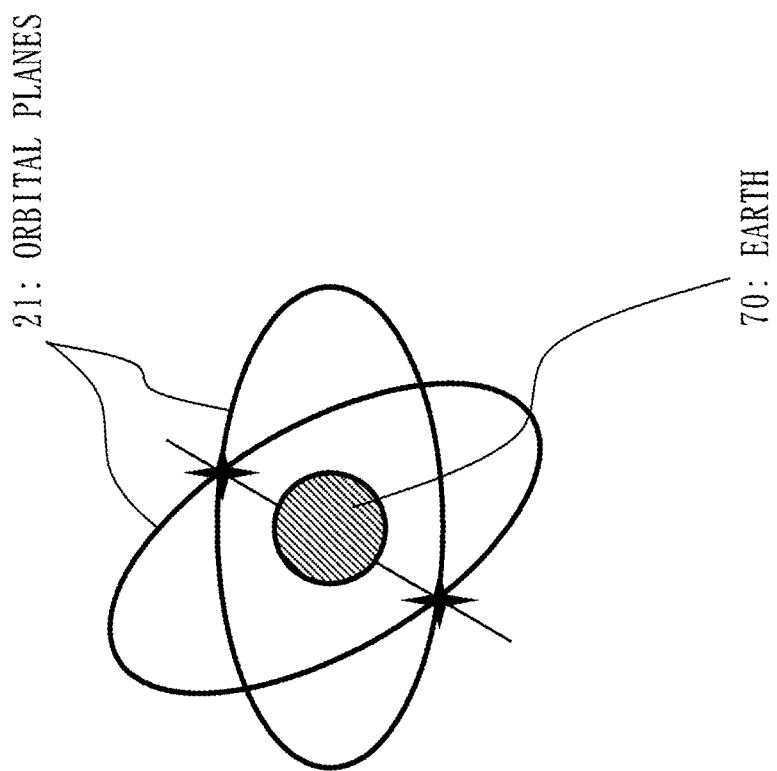
FIG. 13 is a schematic diagram illustrating an example of conditions for collisions in a satellite constellation.
Figure 14:
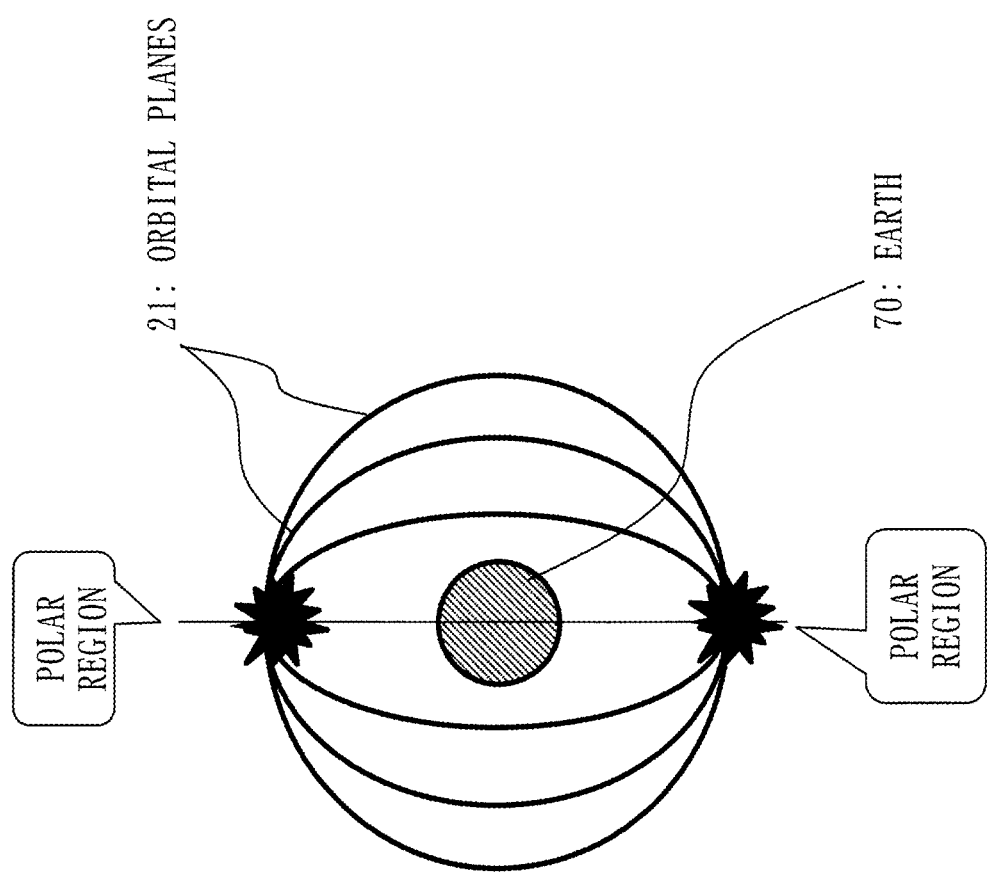
FIG. 14 is a schematic diagram illustrating an example of conditions for collisions in a satellite constellation.

FIGS. 13 and 14 are schematic diagrams illustrating examples of conditions for collisions in a satellite constellation.

Satellites flying at the same altitude in the same orbital plane fly at relatively the same speeds while maintaining the relative phases in the orbital plane, so that they will not collide with each other. However, satellites flying at the same orbital altitude in different orbital planes may collide with each other at an intersection point at which the orbital altitudes coincide on an intersection line between the orbital planes, as indicated in FIGS. 13 and 14. In particular, as indicated in FIG. 14, with low Earth orbiting satellites flying at altitudes of about 100 km to 2000 km and having an orbital inclination of about 90 degrees, intersection points exist around the polar regions, so that there are collision risks around the polar regions of the North and South Poles.

However, if satellites always pass an intersection point at mutually different timings, two objects will never collide. The satellite constellation forming unit 110 forms a satellite constellation 20 in which two objects will never collide. Specifically, the satellite constellation 20 is formed such that a time point at which a satellite flying in each of mutually different orbital planes passes an intersection point between these orbital planes is a multiple of "wait time T1 until arrival of a next satellite/the number of orbital planes" in the same orbital plane, and no coincidence of satellite passage time points occurs at any intersection point between any two orbital planes.

The satellite constellation 20 illustrated in FIG. 12 has a plurality of mutually different orbital planes having an orbital inclination of about 90 degrees. In this satellite constellation 20, all satellites in all the orbital planes pass the vicinity of the pole regions. Therefore, the satellite constellation forming unit 110 causes the satellites to fly such that the time point at which each satellite passes the polar region occurs at intervals of "wait time T1 until arrival of a next satellite/the number of orbital planes", so as to separate the time points at which the satellites pass the polar regions in the orbital planes.

Specifically, assuming that the time required for a low Earth orbiting satellite to complete one orbit is about 100 minutes, if 20 satellites fly per orbital plane, it takes about five minutes after a satellite passes a specific point for a following satellite to arrive at the specific point. Assuming that there are 20 orbital planes, the satellite constellation 20 according to this embodiment can be realized by shifting by 15 seconds, which is calculated by dividing 300 seconds into approximately equal intervals.

In the satellite constellation 20 formed by the satellite constellation forming system 100 according to this embodiment, satellites in the same orbital plane fly in synchronization at the same altitude, and satellites in different orbital planes also fly at a matching orbital altitude while maintaining the same satellite speeds. Therefore, by making initial settings such that the satellites in each orbital plane pass intersection points at mutually different timings in all the orbital planes, the relative timings are always maintained, so that there is an effect that a collision risk between any two satellites can be avoided in all the orbital planes.

In this embodiment, the example in which the timings are determined by equally dividing the wait time until arrival of a following satellite by the number of orbital planes has been indicated. However, there are various methods for selecting the intervals for separating the polar region passage timings and various methods for selecting the order of orbital planes.

Embodiment 6

In this embodiment, differences from or additions to Embodiment 5 will be mainly described. Components that are substantially the same as those in Embodiment 5 are denoted by the same reference signs, and description thereof may be omitted.

Figure 15:
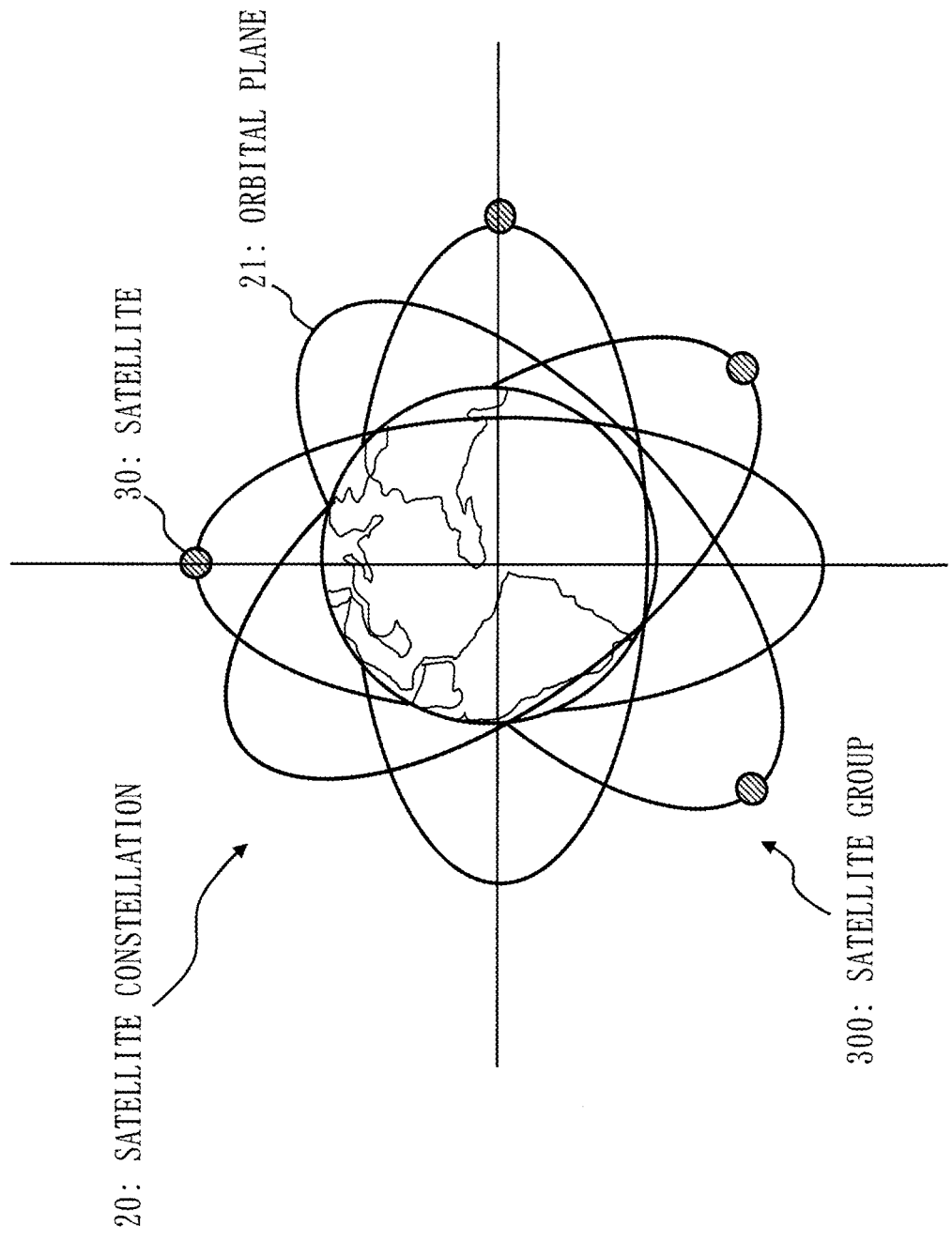
FIG. 15 is an example of a satellite constellation formed by the satellite constellation forming system according to Embodiment 6.
Figure 24:
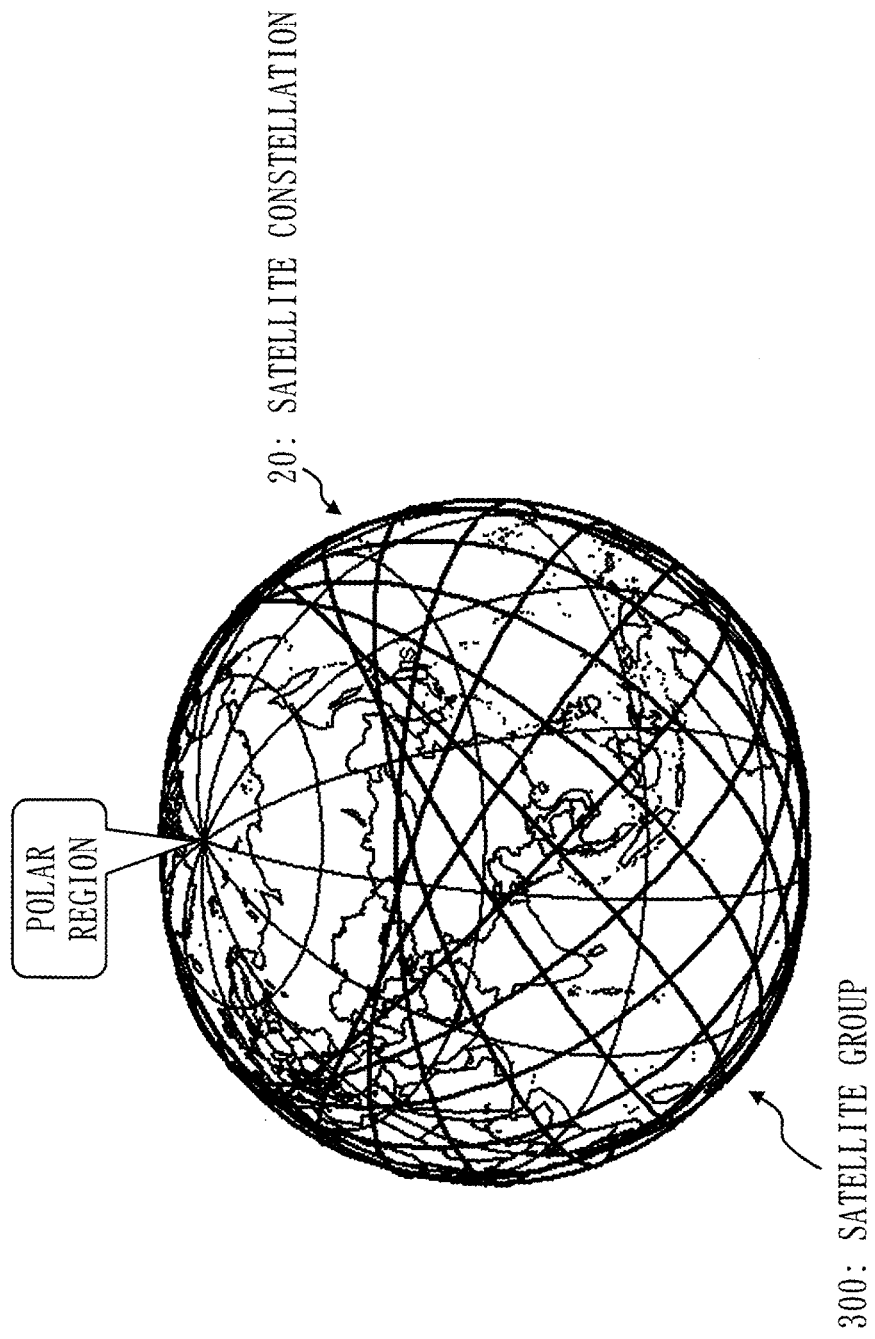
FIG. 24 is an example of a satellite constellation formed by the satellite constellation forming system according to Embodiment 6.

FIGS. 15 and 24 are diagrams illustrating examples of a satellite constellation 20 formed by the satellite constellation forming system 100 according to this embodiment.

In each satellite constellation 20 illustrated in FIGS. 15 and 24, the orbital inclination of each of orbital planes 21 is not about 90 degrees and the orbital planes 21 exist on mutually different planes. In this satellite constellation 20, any two orbital planes intersect at a point that is not in the polar region. Thus, the satellite constellation forming unit 110 forms the satellite constellation 20 such that a time point at which a satellite flying in each of mutually different orbital planes passes an intersection point between these orbital planes is a multiple of "wait time T1 until arrival of a next satellite/the number of orbital planes" in the same orbital plane, and no coincidence of satellite passage time points occurs at any intersection point between any two orbital planes.

As indicated in FIGS. 15 and 24, the intersection points of orbital planes with an orbital inclination greater than 90 degrees move away from the polar region commensurately with the orbital inclination. Depending on combinations of orbital planes, intersection points may occur at various locations including the vicinity of the equator. For this reason, places where collisions may occur are varied in comparison with the satellite constellation of Embodiment 5. However, this does not mean that the number of intersection points increases, so that the probability of a collision does not increase with diversification of places. When a large number of satellites fly in synchronization in the same orbital plane, if it is arranged that timings at which satellites in two specific orbital planes pass a specific intersection point do not coincide with each other in order to avoid a collision between the two specific orbital planes, no collision will occur between satellites in these two orbits. However, it should be noted that there remains a risk that a following satellite may collide with a satellite in another orbital plane. It is necessary to confirm that no coincidence of intersection point passage timings occurs for all possible combinations of orbital planes. If the timings cannot be adjusted successfully, it is necessary to change either the orbital planes or the number of satellites per orbital plane. If it can be confirmed that no collision will occur at all the intersection points, then the satellites operate in synchronization within and between all the orbital planes, so that there is an effect that a collision risk can be avoided.

In this embodiment, the example in which the timings are determined by equally dividing the wait time until arrival of a following satellite by the number of orbital planes has been indicated. However, there are various methods for selecting the intervals for separating the polar region passage timings and various methods for selecting the order of orbital planes.

As a specific example, an example of an Earth observation satellite using a sun-synchronous sub-recurrent orbit of an orbital inclination of about 98 degrees and an orbital period of about 98 minutes will be described. When a satellite constellation with a large number of satellites is constructed using this orbit, since the orbital inclination is about 98 degrees and thus is slanted, all orbital planes will not meet at the polar regions. However, there is always an intersection line between two different orbital planes and there is an intersection point at the same altitude, so that there is still a collision risk. In addition, there is a collision risk between every combination of two different orbital planes. Therefore, in this embodiment, a collision is avoided by separating satellite passage timings at an intersection point between any two planes.

Furthermore, there are also Earth observation satellites that fly with an orbital inclination of about 45 degrees, and the satellites are not sun-synchronous in this orbit. In the case of a low orbital inclination, an intersection point between two different orbital planes exists at a low latitude, and intersection points may occur at a plurality of latitudes. Depending on the combination of the number of orbital planes and the number of satellites flying in one orbital plane, it may not always be possible to avoid a collision. Thus, in the satellite constellation 20 according to this embodiment, the combination of the number of orbital planes and the number of satellites per orbital plane with which no collision will occur at all intersection points of two orbital planes is found out, and then the passage timings at each intersection point are maintained so as to avoid a collision.

If the number of satellites increases drastically, calculations for avoiding collisions in all possible combinations will become complex, so that Embodiment 1 using different orbital planes may be adopted.

Embodiment 7

In this embodiment, differences from or additions to Embodiment 5 will be mainly described. Components that are substantially the same as those in Embodiment 5 are denoted by the same reference signs, and description thereof may be omitted.

In this embodiment, an aspect of a method for shifting the wait time of satellites in the case of the satellite constellation 20 of FIG. 14, in which a plurality of orbital planes intersect in the polar regions, will be described. In this embodiment, when a plurality of orbital planes are numbered sequentially in order of placement, the wait time until arrival of a following satellite, which is a polar passage timing, is shifted by a duration of approximately half the wait time between odd-numbered orbital planes and even-numbered orbital planes. By forming the satellite constellation 20 in this way, the ground service ranges are arranged alternately between adjacent odd-numbered and even-numbered planes, so that there is an effect that the ground surface service ranges can be rationally covered.

Figure 16:
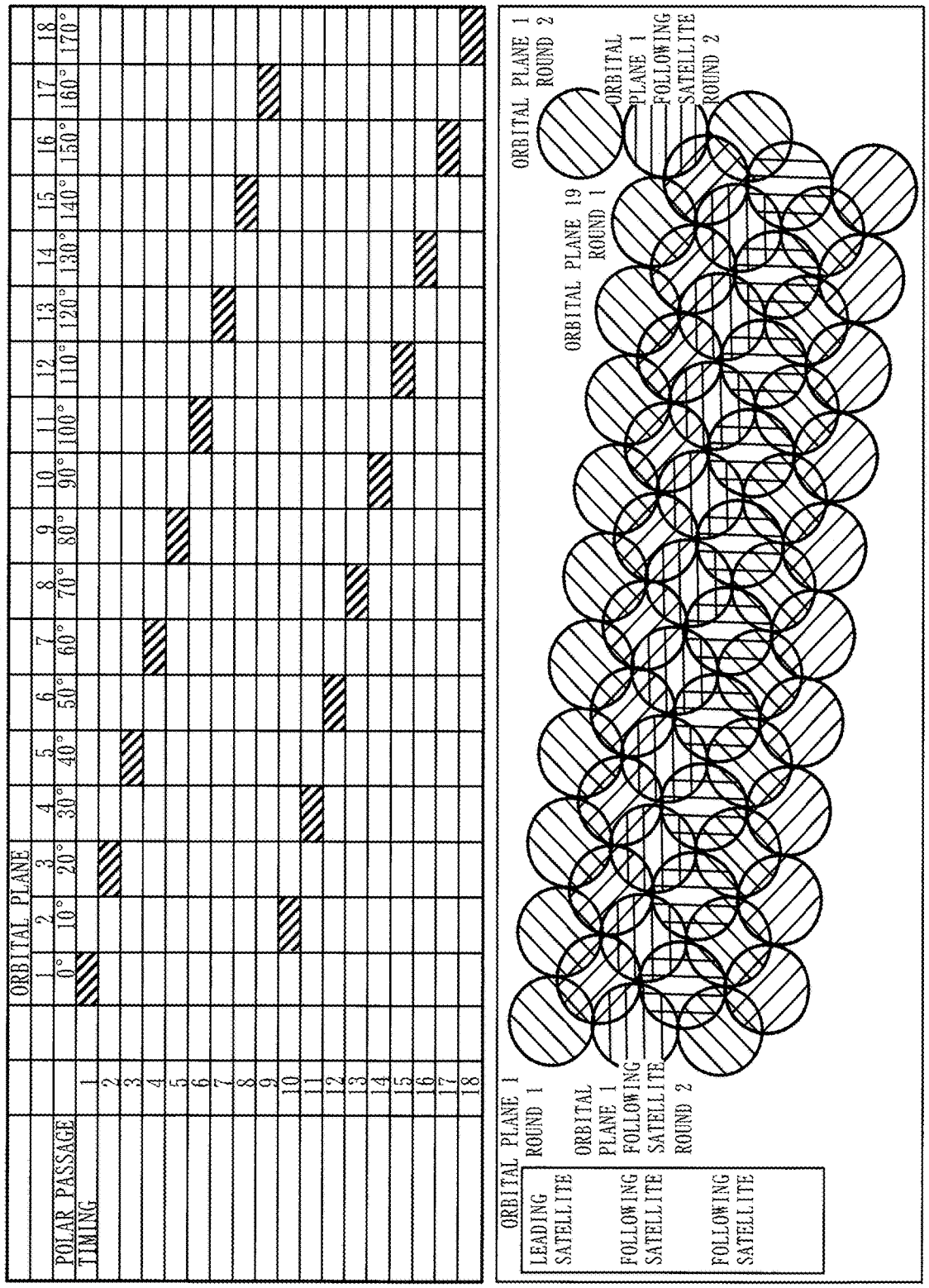
FIG. 16 is a diagram illustrating ground service ranges by a satellite constellation according to Embodiment 7.

FIG. 16 is a diagram illustrating the ground surface service ranges by the satellite constellation 20 according to this embodiment.

FIG. 16 indicates an example in which there are 18 orbital planes and the angel of each orbital plane changes relatively by 10 degrees. As polar passage timings, the wait time until arrival of a following satellite is equally divided by 18, and the passage timings are shifted sequentially from timing 1 on odd-numbered planes and from timing 10 on even-numbered planes. As a result, the ground service ranges are covered alternately by the even-numbered planes and the odd-numbered planes, so that there is an effect that the ground surface can be exhaustively covered.

Figure 17:
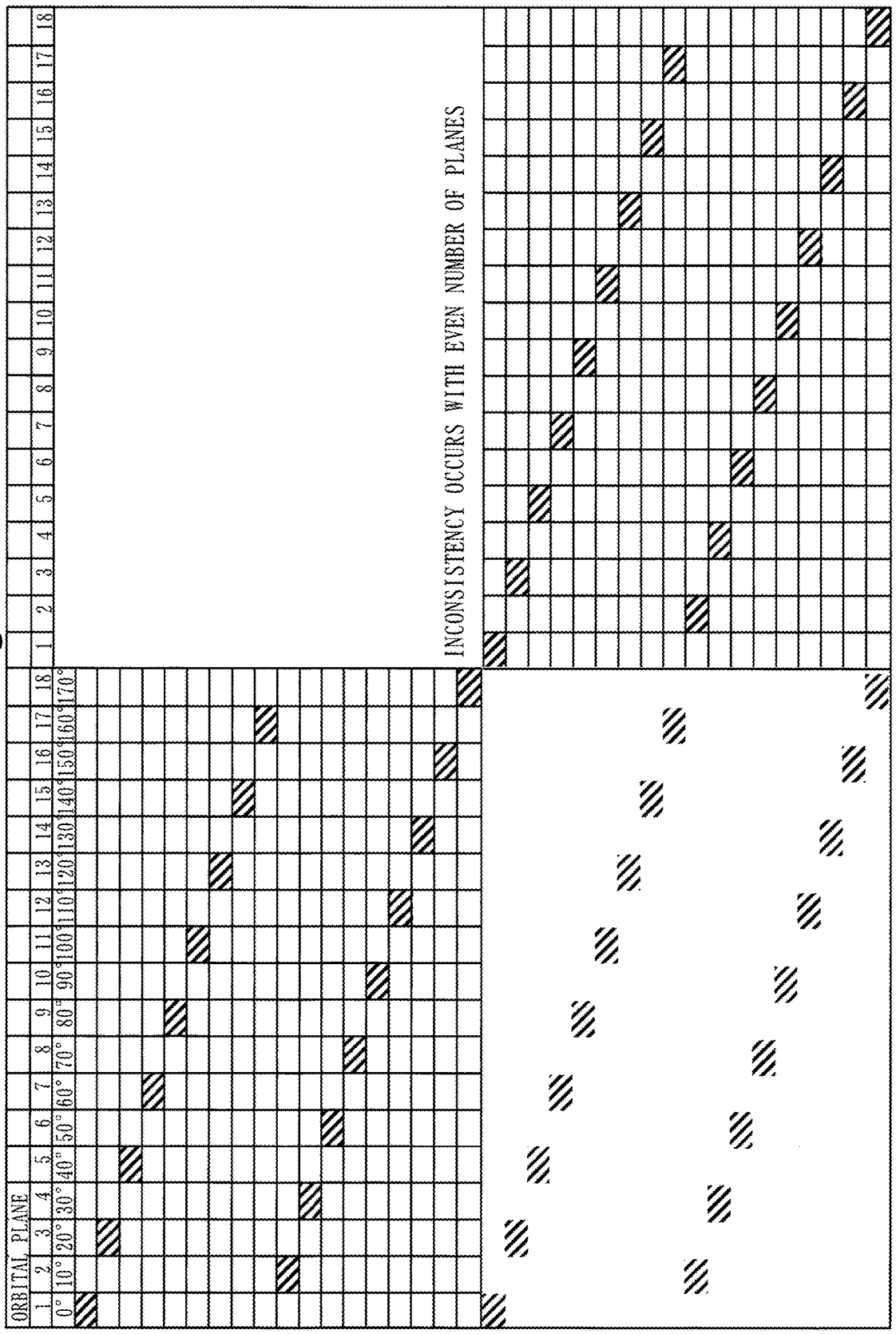
FIG. 17 is a diagram illustrating polar passage timings when there is an even number of orbital planes in a satellite constellation according to Embodiment 7.

FIG. 17 is a diagram illustrating polar passage timings when there is an even number of orbital planes in the satellite constellation 20 according to this embodiment.

Figure 18:
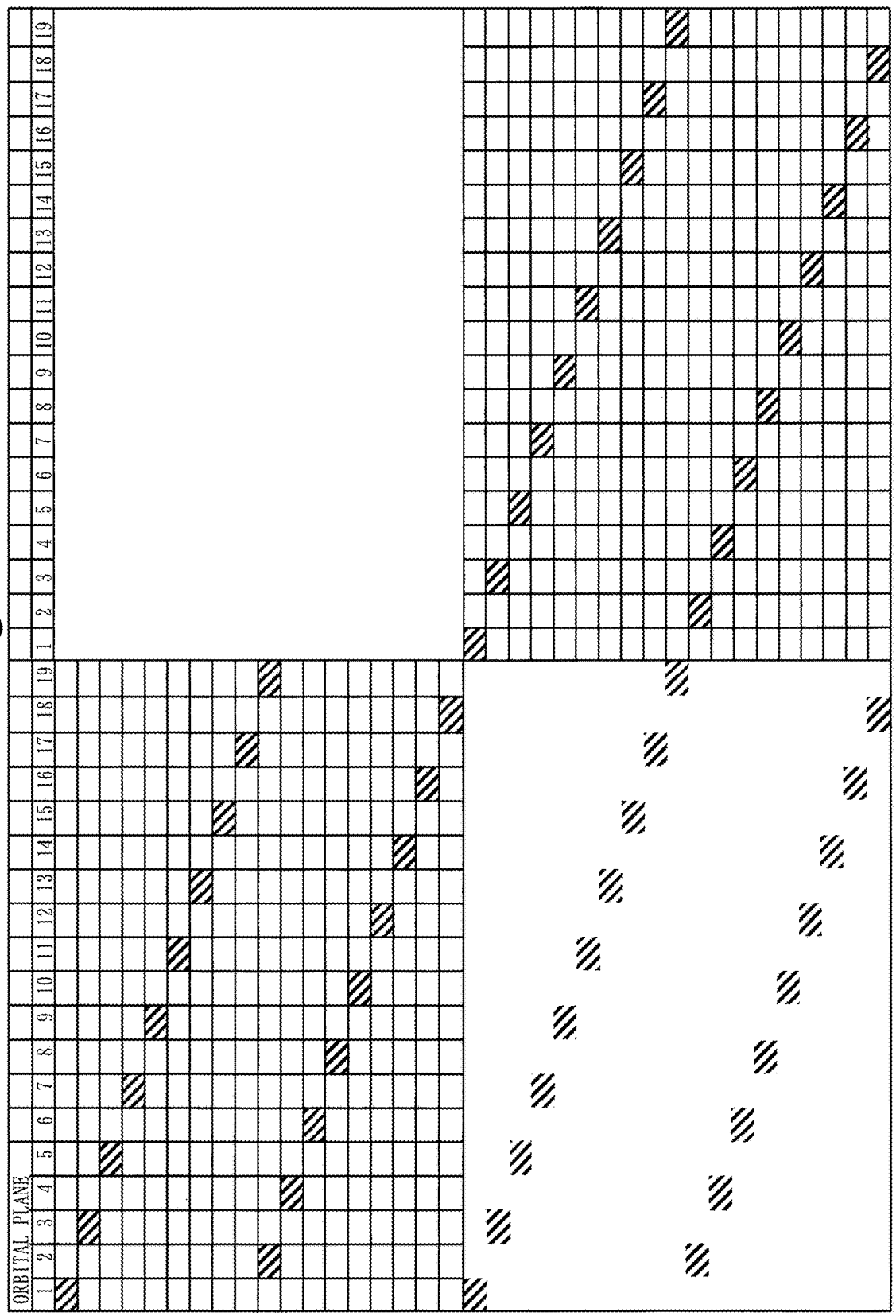
FIG. 18 is a diagram illustrating polar passage timings when there is an odd number of orbital planes in a satellite constellation according to Embodiment 7.

FIG. 18 is a diagram illustrating polar passage timings when there is an odd number of orbital planes in the satellite constellation 20 according to this embodiment.

As indicated in FIGS. 17 and 18, it is desirable in the satellite constellation 20 according to this embodiment that there are an odd number of orbital planes. In the example in FIG. 17, the service area of plane 18 and the service area of its next plane, plane 1, adjoin with each other, and this may cause inconsistency in coverage of the entire globe. Thus, by using an odd number of orbital planes as in FIG. 18, the ground service ranges of the final plane and plane 1 are placed alternately like the others, so that there is an effect that the entire globe can be rationally covered.

Embodiment 8

In this embodiment, additions to Embodiments 1 to 7 will be mainly described. Components that are substantially the same as those in Embodiments 1 to 7 are denoted by the same reference signs, and description thereof may be omitted.

In this embodiment, variations of a debris removal scheme that allows a satellite to deorbit (leave the orbit) while avoiding a collision will be described.

Figure 19:
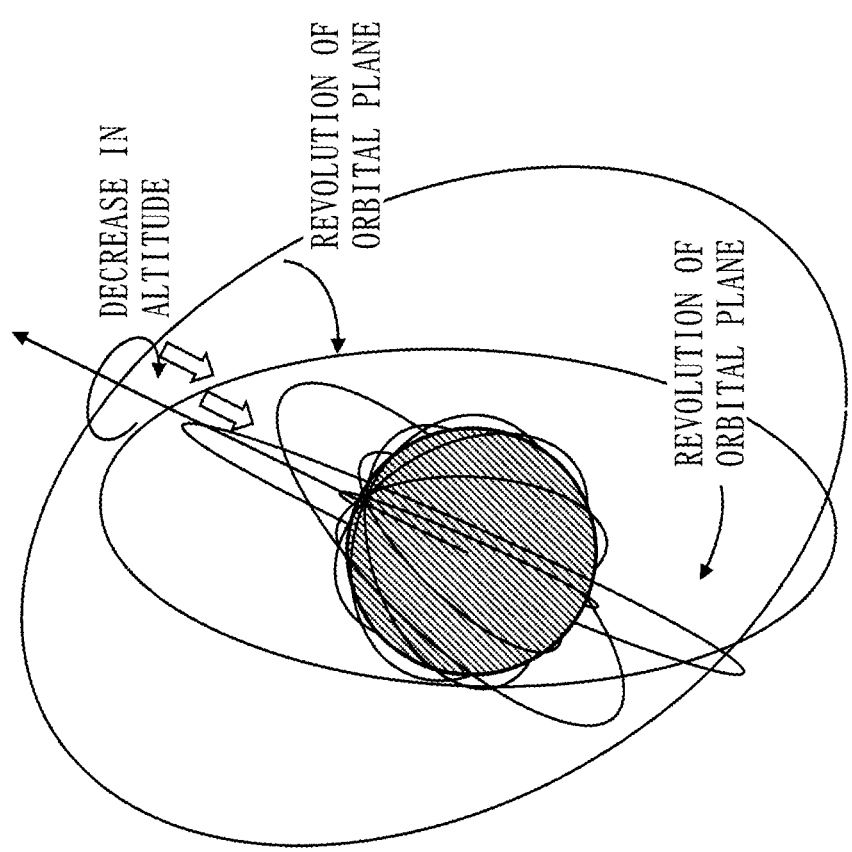
FIG. 19 is a diagram illustrating a concept of deorbit by free fall.

FIG. 19 is a diagram illustrating the concept of deorbit by free fall.

Figure 20:
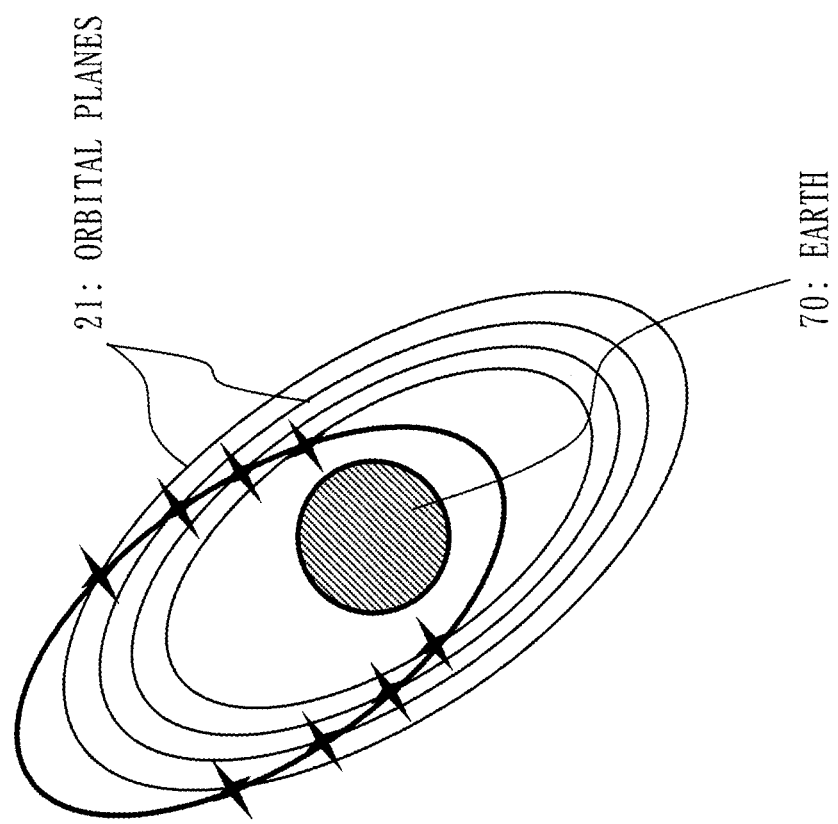
FIG. 20 is a diagram illustrating collision risks when satellites located above a satellite constellation deorbit.

FIG. 20 is a diagram illustrating collision risks when a satellite located above the satellite constellation 20 deorbits.

Example 1 of the Debris Removal Scheme

The debris removal scheme of Example 1 according to this embodiment is provided with a capture device or an external force applying device and a propulsion device for changing the orbital plane of a failed satellite before the failed satellite, which has become uncontrollable due to a failure or the like, descends and passes an orbital plane congested with satellites. The propulsion device propels the failed satellite.

In a sun-synchronous sub-recurrent orbit of about LST 10:00 to LST 11:00, the relationship of the sunlight incidence angle and the orbital plane is suitable for imaging by an Earth observation optical sensor, and is a congested orbital plane in which a large number of Earth observation optical satellites fly. Orbital altitudes of about 500 km and 1000 km, which are suitable for high-resolution imaging and have low atmospheric drag, are congested. However, there is an example in which an ultra-low altitude satellite flies at an orbital altitude of about 200 km.

A satellite included in one of the satellite constellations 20 described in Embodiments 1 to 7 may fail and become uncontrollable. In this case, this failed satellite passes a congested orbital plane while changing the orbital altitude in the process of falling freely from a high altitude such as an orbital altitude between 1000 km and 2000 km, encountering the atmosphere, and disappearing, as indicted in FIG. 19. At that time, as illustrated in FIG. 20, there is a high risk of collision because the failed satellite may encounter satellite groups at a plurality of orbital altitudes. Thus, if the orbital plane is changed in advance by the debris removal scheme according to this embodiment so as to avoid passing a congested orbit, there is an effect that a collision in the congested orbit can be avoided.

Figure 21:
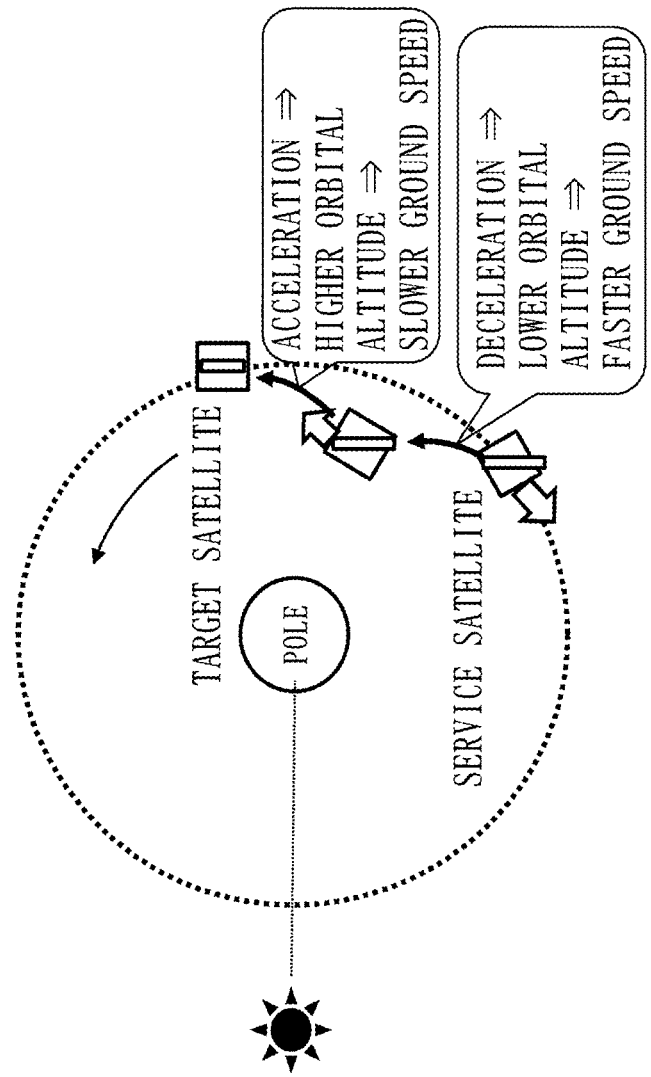
FIG. 21 is a diagram illustrating changes in orbital altitude by acceleration and deceleration of a satellite.

FIG. 21 is a diagram illustrating changes in orbital altitude by acceleration and deceleration of a satellite.

Figure 22:
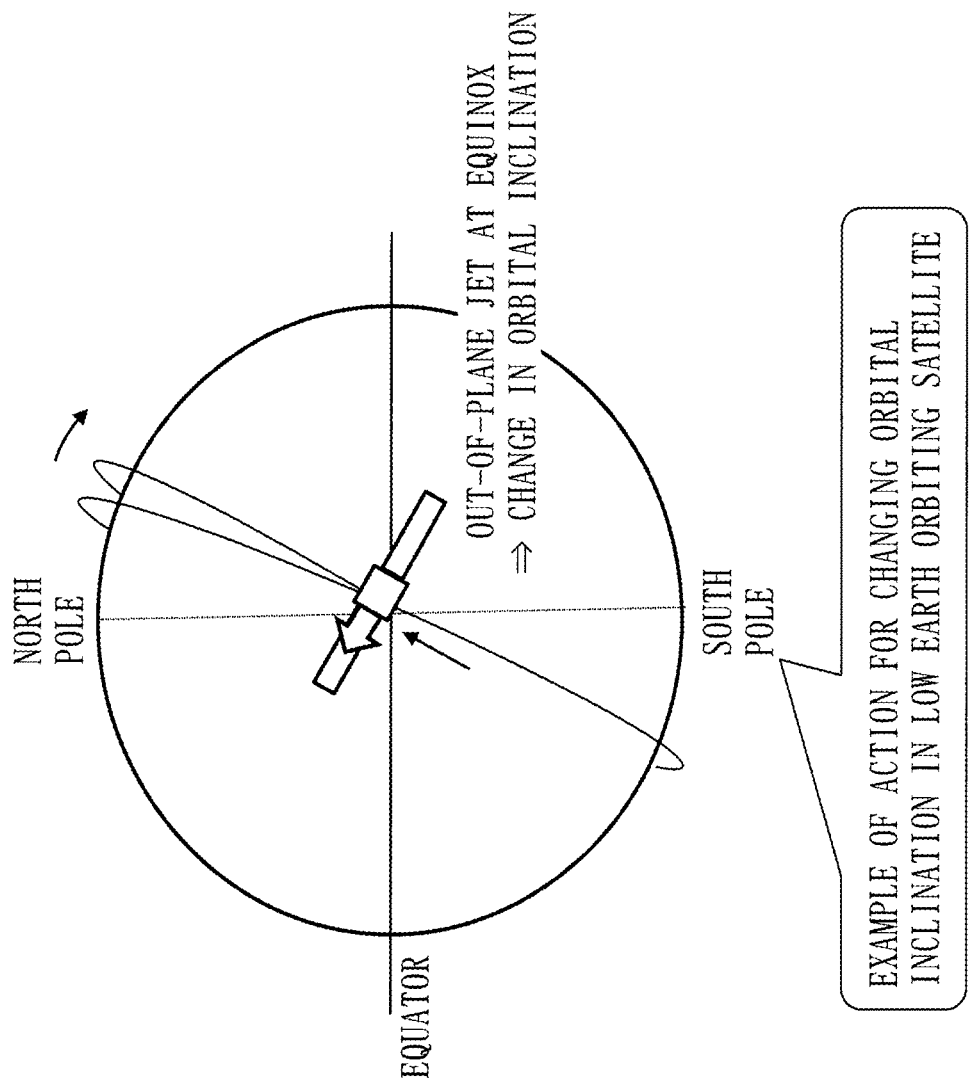
FIG. 22 is a diagram illustrating a change of an orbital inclination by a jet from a propulsion device.

FIG. 22 is a diagram illustrating a change of orbital inclination by a jet from a propulsion device.

A specific example of the debris removal scheme that is effective is a scheme in which a failed satellite is captured by a debris retrieval satellite provided with a capture device to capture another satellite and a propulsion device to apply thrust to another satellite, and the orbit is artificially changed by the propulsion device.

Acceleration in the satellite traveling direction causes the orbital altitude to rise temporarily, causing the orbital plane to rotate approximately around the axis of Earth due to perturbation with a different period from that of the congested orbit, so that the congested orbital plane can be avoided. Deceleration in the satellite traveling direction causes the orbital altitude to drop temporarily, causing the orbital plane to rotate approximately around the axis of Earth due to perturbation with a different period from that of the congested orbit, so that the congested orbital plane can be avoided. Depending on the time available until predicted passage of the failed satellite the congested orbit, the collision avoidance method can be selected from descent before encountering the congested orbit and descent after passing the congested orbit. Therefore, there is an effect that a collision can be avoided with certainty. However, a disadvantage of the method relying on perturbation is that the residence time is long. Thus, a method of actively applying a jet from a propulsion device so as to rotate the orbital plane in an out-of-plane direction may also be considered. In this case, a large amount of propellant is consumed, resulting in an increased scale of the debris removal scheme, including a propulsion tank.

The collection of a satellite by the satellite itself corresponds to the collection of a so-called cooperative target. Thus, it is effective for the debris retrieval satellite to be pre-equipped with an attachment that conforms to the debris removal scheme so as to facilitate capture. Another effective method for the debris retrieval satellite is to send out information to let the position of the satellite itself or the target to be captured be known, so as to facilitate access to or coupling with the satellite itself. However, a case in which the satellite has lost control capability and is rotating or the like is an exception.

Example 2 of the Debris Removal Scheme

The debris removal scheme of Example 2 according to this embodiment is provided with a capture device or an external force applying device and a propulsion device for changing the orbital altitude of an object floating at an altitude between about 100 km to 2000 km while tracing an elliptical orbit before the object passes an orbital plane of a satellite constellation. The propulsion device applies thrust to the object. As to the external force applying device, "external force" may include not only "force" but also "torque" or "change in mass characteristics" due to coupling. The external force applying device is also referred to as a disturbance applying device.

Obstacle removal is a problem in STM. If the orbital plane of an object flying in an elliptical orbit coincides with an orbital plane in which a large number of satellites are flying in approximate circular orbit at a specific orbital altitude, resulting in the object and the satellites flying in the same plane, there is a very high risk of collision. According to the debris removal scheme of Example 2 according to this embodiment, there is an effect that an obstacle with a high collision risk can be safely removed.

A specific example of the debris removal scheme is substantially the same as <Example 1 of the debris removal scheme>. In <Example 1 of the debris removal scheme>, since the satellite captures the satellite itself, the satellite can be pre-equipped with an attachment to facilitate capture, as a so-called cooperative target. However, floating objects other than the satellite itself are so-called non-cooperative targets, and are objects that are difficult to capture, such as an object with a complex shape, a rotating object, a heavy object, and an object not having a structure suitable for being captured. For this reason, the capture device to be provided needs to be sophisticated. As specific examples, a method of holding by a robot, a method of covering the target with a device like a capture net, a method of hooking and dragging with a harpoon-shaped rod to which a wire is attached, and the like can be realized.

Embodiment 9

In this embodiment, differences from or additions to Embodiments 1 to 8 will be mainly described. Components that are substantially the same as those in Embodiments 1 to 8 are denoted by the same reference signs, and description thereof may be omitted.

In this embodiment, variations of a satellite constellation construction scheme will be described, in which the debris removal scheme described in Example 1 or Example 2 of the debris removal scheme of Embodiment 8 is applied to a satellite constellation constructed by the satellite constellation forming system described in Embodiments 1 to 7.

Example 1 of the Satellite Constellation Construction Scheme

In Example 1 of the satellite constellation construction scheme according to this embodiment, orbit insertion is made into an orbital plane that is close to and different from the orbital planes of constituent elements constituting the satellite constellation 20 and at an orbital altitude different from orbital altitudes at which satellites in nearby orbital planes are flying. Then, in Example 1 of the satellite constellation construction scheme, a constituent satellite is added by changing the orbital altitude and the angle of revolution of the orbital plane around the axis of Earth by acceleration or deceleration.

When satellites are launched sequentially to construct a predetermined satellite constellation, there is a high risk of collision in the process of inserting an additional satellite into an orbital plane into which a large number of satellites have been inserted. In Example 1 of the satellite constellation construction scheme according to this embodiment, collision risks at launch can be significantly reduced by inserting a satellite into orbit with an orbital angle slightly shifted from orbital planes into which satellites have been inserted. Furthermore, by approaching a desired orbit gradually from satellite altitudes that do not coincide with altitudes at which satellites have been inserted, collision risks in the transition stage can be reduced.

Example 2 of the Satellite Constellation Construction Scheme

Example 2 of the satellite constellation construction scheme according to this embodiment is provided with a database in which information on orbits, orbital altitudes, the number of satellites, and so on adopted by systems of other countries or similar systems has been collected in advance. In Example 2 of the satellite constellation construction scheme according to this embodiment, orbit insertion is made into an orbital plane that is different from orbital planes in which existing satellites are flying and is close to and different from the orbital planes of constituent elements, and at an orbital altitude different from those at which satellites in nearby orbital planes are flying. In Example 2 of the satellite constellation construction scheme according to this embodiment, a constituent satellite is added by changing the orbital altitude and the angle of revolution of the orbital plane around the axis of Earth by acceleration or deceleration.

According to Example 2 of the satellite constellation construction scheme of this embodiment, there is an effect that a satellite constellation can be constructed without collision risks in an environment in which the entire outer space is congested.

In Example 1 of the satellite constellation construction scheme, a device to process data on the orbit and position of the own satellite is provided on the ground.

In Example 2 of the satellite constellation construction scheme, a device to process data on the orbit and position of a flying object in outer space is provided on the ground.

Embodiment 10

In this embodiment, additions to Embodiments 1 to 9 will be mainly described. Components that are substantially the same as those in Embodiments 1 to 9 are denoted by the same reference signs, and description thereof may be omitted.

In this embodiment, variations of a ground facility 500 to transmit an orbit control command 51 to a satellite 30 that is included in a satellite constellation 20 and has reached the end of design life will be described. The orbit control command 51 is a command that causes the satellite 30 to deorbit by operating a propulsion device provided in the satellite 30.

Example 1 of the Ground Facility 500

Figure 23:
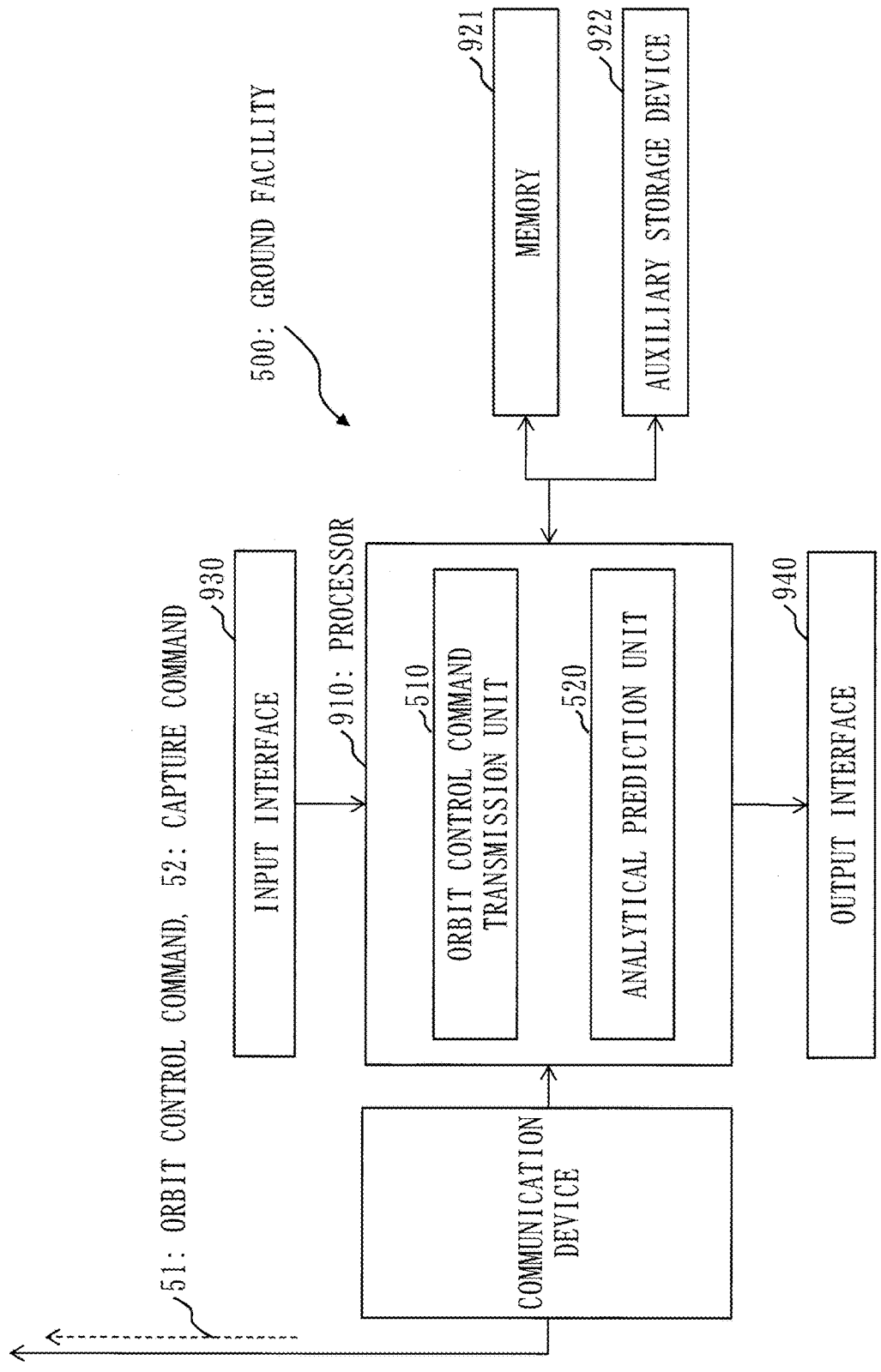
FIG. 23 is a diagram illustrating a configuration of a ground facility according to Embodiment 10.

FIG. 23 is a diagram illustrating a configuration of Example 1 of the ground facility 500 according to this embodiment.

The configuration of Example 1 of the ground facility 500 is substantially the same as that in Embodiment 10.

A communication device 950 transmits and receives signals for tracking and controlling a satellite 30 included in the satellite constellation 20.

An orbit control command transmission unit 510 transmits the orbit control command 51 to the satellite 30 to be deorbited because it has reached the end of design life or for another reason.

An analytical prediction unit 520 analytically predicts an orbit where the satellite 30 after receiving a deorbit command will pass.

As a specific example, a case in which the analytical prediction unit 520 has determined that the satellite 30 will pass an orbital plane of about LST 10:30 in a congested orbit in sun-synchronous orbit at an orbital altitude of between 500 km and 800 km will be described. In this case, the orbit control command transmission unit 510 transmits to the satellite 30 the orbit control command 51 to perform an active deorbit operation to avoid a collision risk by shifting the congested orbit passage timing or the orbital plane. Upon receiving the orbit control command 51, the satellite 30 raises or lowers the orbital altitude by accelerating or decelerating the satellite speed by an orbit control device provided in the satellite 30. Alternatively, the satellite 30 changes the orbital inclination by applying acceleration in the out-of-plane direction of the orbital plane by a jet from a propulsor in a direction approximately perpendicular to the satellite traveling direction. In this way, the satellite 30 performs the active deorbit operation to avoid a collision risk by shifting the congested orbit passage timing or the orbital plane.

In the construction of a mega-constellation, as a measure to prevent the total amount of debris in outer space from increasing without any restriction, the need to make post-mission disposal (PMD) mandatory so as to deorbit 99% or more of satellites has been discussed. In addition, as the probability that a satellite will remain operational at end of life should be considered, the need for active debris removal (ADR) to deorbit a satellite that cannot autonomously deorbit as a result of losing functionality at end of life or due to a failure has also been debated.

However, PMD or ADR addresses only the need for a method for burning up in the atmosphere by free fall, and provides no countermeasure for passing a congested orbit during fall. In geostationary orbit satellites, there is a case in which when a debris collision risk is foreseen, predicted debris orbit information is published together with a collision alert, and a potential collision-victim satellite takes a collision avoidance action. However, with low-Earth orbiting satellites, if another satellite constellation is constructed, there is a high risk that the avoidance action of a potential collision-victim satellite may cause a secondary collision. That is, the risk is that of a collision with a preceding or following satellite among satellites arranged in file, a collision with a satellite group at a different altitude in the same plane, or the like.

If there is a high possibility that a large number of potential collision-victim satellites pass the area in a short period of time and a plurality of satellites concurrently take the avoidance action, it will be difficult to predict the behavior of nearby satellites and a derivative collision risk will occur.

There is also a risk that as a result of the avoidance action, not only the orbital altitude and the phase in the orbital plane but also LST may shift due to revolution of the orbital plane, making recovery difficult or hindering continuation of the intended service of the satellite.

Furthermore, there may be a case in which a large number of satellites such as CubeSat, which is an experimental satellite without an avoidance function, are flying.

There may also be a case in which if a free fall involves a low orbit prediction accuracy, the area and time period in which a collision alert needs to be issued is widened and collision alerts are issued frequently to potential collision-victim satellites, making it impossible to respond.

According to Example 1 of the ground facility 500 of this embodiment, orbit control during a fall is possible even during altitude descent due to deorbit, so that there is an effect that passing a congested orbits can be avoided and a collision can be avoided. There is also an effect that a collision can be avoided without any avoidance action by a potential collision-victim satellite.

Example 2 of the Ground Facility 500

In Example 2 of the ground facility 500 of this embodiment, a capture command 52 and an orbit control command 51 to cause a debris retrieval satellite 31 to deorbit a failed satellite that has lost the orbit control function are transmitted to the debris retrieval satellite 31. The debris retrieval satellite 31 is a satellite provided with a device to collect a satellite that has lost the orbit control function due to a failure, for example. The debris retrieval satellite 31 includes a capture device to capture a failed satellite and a propulsion device.

Example 2 of the ground facility 500 transmits to the debris retrieval satellite 31 the capture command 52 and the orbit control command 51 to cause a failed satellite to deorbit by operating the capture device and the propulsion device provided in the debris retrieval satellite.

The communication device 950 transmits and receives signals for tracking and controlling the debris retrieval satellite.

The orbit control command transmission unit 510 transmits the orbit control command 51 or the capture command 52.

The analytical prediction unit 520 analytically predicts an orbit where the debris retrieval satellite that has captured a failed satellite will pass.

As a specific example, a case in which the analytical prediction unit 520 has determined that the debris retrieval satellite 31 will pass an orbital plane of about LST 10:30 in a congested orbit in sun-synchronous orbit at an orbital altitude of between 500 km to 800 km will be described. In this case, the orbit control command transmission unit 510 transmits to the debris retrieval satellite 31 the orbit control command 51 to perform the active deorbit operation to avoid a collision risk by shifting the congested orbit passage timing or the orbital plane. Upon receiving the orbit control command 51, the debris retrieval satellite 31 raises or lowers the orbital altitude by accelerating or decelerating the satellite by an orbit control device provided in the satellite 30. Alternatively, the satellite 30 changes the orbital inclination by applying acceleration in the out-of-phase direction of the orbital plane by a jet from a propulsor in a direction approximately perpendicular to the satellite traveling direction. The debris retrieval satellite 31 performs the active deorbit operation to avoid a collision risk by shifting the congested orbit passage timing or the orbital plane, as described above.

According to Example 2 of the ground facility 500 of this embodiment, a constituent satellite of a satellite constellation is pre-equipped with a device such as a capture attachment of the debris retrieval satellite. Therefore, Example 2 of the ground facility 500 according to this embodiment is effective for collecting a constituent element of a satellite constellation.

Example 3 of the Ground Facility 500

In Example 3 of the ground facility 500 according to this embodiment, the communication device 950 transmits and receives signals for tracking and controlling a debris retrieval satellite equipped with a device to collect rocket debris flying above a congested orbit at an orbital altitude of 800 km or more.

The orbit control command transmission unit 510 transmits to the debris retrieval satellite a capture command and an orbit control command to deorbit rocket debris by operating a capture device and a propulsion device provided in the debris retrieval satellite.

The analytical prediction unit 520 analytically predicts an orbit where the debris retrieval satellite that has captured a failed satellite will pass.

As a specific example, a case in which the analytical prediction unit 520 has determined that the debris retrieval satellite will pass an orbital plane of about LST 10:30 of a congested orbit in sun-synchronous orbit at an orbital altitude of between 500 km and 800 km will be described.

In Example 3 of the ground facility 500 according to this embodiment, the orbital inclination is changed by raising or lowering the orbital altitude by accelerating or decelerating the satellite by the orbit control device provided in the satellite, or by applying acceleration in the out-of-orbit direction of the orbital plane by a jet from a propulsor in a direction approximately perpendicular to the satellite traveling direction. In Example 3 of the ground facility 500 according to this embodiment, the active deorbit operation to avoid a collision risk by shifting the congested orbit passage timing or the orbital plane is performed.

Rocket debris is not normally equipped with a capture attachment of the debris retrieval satellite and is difficult to capture as it may spin in the orbit, so that the technical difficulty is higher than in Example 2 of the ground facility 500. In Example 3 of the ground facility 500 according to this embodiment, the capture device may use a method of wrapping with a net-like object like net casting, a method of hooking and dragging with a harpoon-shaped rod to which a wire is attached, or a method of adhering tightly to the outer surface of the target to be captured with an adhesive substance or an adhesive. Even in deorbit of a constituent satellite of a satellite constellation equipped with a capture attachment, if the satellite is made to fall freely without attitude control, the attitude will become unstable, so it is highly likely that the debris retrieval satellite cannot easily access the capture attachment. In such a case, the capture device of Example 3 of the ground facility 500 according to this embodiment is effective.

Example 4 of the Ground Facility 500

A case in which, as described in Examples 1 and 3 of the ground facility 500, during descent in deorbit of a satellite or deorbit due to debris retrieval, the analytical prediction unit 520 has determined that the satellite will pass a congested region in the polar region of another satellite constellation constructed at a low altitude will be described.

In Example 4 of the ground facility 500, the orbital inclination is changed by applying acceleration in the out-of-plane direction of the orbital plane by a jet from a propulsor in a direction approximately perpendicular to the satellite traveling direction, so as to make the orbital inclination different from that of the other satellite constellation. In this way, Example 4 of the ground facility 500 performs the active deorbit operation to avoid a collision risk by changing the inclination of the orbital plane to be different from that of a congested orbit or shifting the passage timing.

In Examples 1 to 3 of the ground facility 500, it is possible to avoid not only a collision in a congested orbit of about LST 10:30 but also a collision when passing a congested region in the polar region.

Examples 1 to 4 of the ground facility 500 above may be implemented in any combination. For example, the following ground facilities may be implemented.

The ground facility includes a communication device to transmit and receive signals for tracking and controlling a satellite included in a satellite constellation, an orbit control command transmission unit to transmit an orbit control command, and an analytical prediction unit to analytically predict an orbit where the satellite that has received the deorbit command will pass. The ground facility transmits the orbit control command to cause the satellite that has reached the end of design life to deorbit by operating a propulsion device provided in the satellite.

When it is determined by analytical prediction that during descent in deorbit of the satellite or deorbit due to debris retrieval, the satellite will pass a congested region in the polar region or a congested orbital plane of another satellite constellation constructed at a low altitude, the ground facility performs the active deorbit operation to avoid a collision risk. Specifically, the ground facility performs the active deorbit operation to avoid a collision risk by changing the inclination of the orbital plane to be different from that of a congested orbit or shifting the passage timing by applying acceleration in the out-of-plane direction of the orbital plane by a jet from a propulsor in a direction approximately perpendicular to the satellite traveling direction so that the orbital inclination becomes different from that of the other satellite constellation.

The ground facility includes a communication device to transmit and receive signals to track and control a debris retrieval satellite provided with a device to collect a satellite that has failed and lost an orbit control function, an orbit control command transmission unit, and an analytical prediction unit to analytically predict an orbit where the debris retrieval satellite that has captured the failed satellite will pass. The ground facility transmits to the debris retrieval satellite a capture command and an orbit control command to cause the failed satellite to deorbit by operating a capture device and a propulsion device provided in the debris retrieval satellite.

When it has been determined by analytical prediction that during descent in deorbit of a satellite or deorbit due to debris retrieval, the satellite will pass a congested region in the polar region or a congested orbital plane of another constellation constructed at a low altitude, the ground facility performs the active deorbit operation to avoid a collision risk. Specifically, the ground facility performs the active deorbit operation to avoid a collision risk by changing the inclination of the orbital plane to be different from that of a congested orbit or shifting the passage timing by changing the orbital inclination by applying acceleration in the out-of-phase direction of the orbital plane by a jet from a propulsor in a direction approximately perpendicular to the satellite traveling direction so that the orbital inclination becomes different from that of the other satellite constellation.

The ground facility includes a communication device to transmit and receive signals for tracking and controlling a debris retrieval satellite provided with a device to collect rocket debris flying above a congested orbit at an orbital altitude of 800 km or higher, an orbit control command transmission unit, and an analytical prediction unit to analytically predict an orbit where the debris retrieval satellite that has captured a failed satellite will pass. The ground facility transmits to the debris retrieval satellite a capture command and an orbit control command to cause the rocket debris to deorbit by operating a capture device and a propulsion device provided in the debris retrieval satellite.

When it has been determined by analytical prediction that during descent in deorbit of a satellite or deorbit due to debris retrieval, the satellite will pass a congested region in the polar region or a congested orbital plane of another satellite constellation constructed at a low altitude, the ground facility performs the active deorbit operation to avoid a collision risk. Specifically, the ground facility performs the active deorbit operation to avoid a collision risk by changing the inclination of the orbital plane to be different from that of a congested orbit or shifting the passage timing by changing the orbital inclination by applying acceleration in the out-of-phase direction of the orbital plane by a jet from a propulsor in a direction approximately perpendicular to the satellite traveling direction so that the orbital inclination becomes different from that of the other satellite constellation.

The effects of this embodiment will be described further.

A commonly-used method for deorbiting a low Earth orbit satellite is to operate a propulsor in a direction opposite to the satellite traveling direction to lower the orbital altitude and cause the satellite to burn up upon entry into the atmosphere. However, a mega satellite constellation being planned in recent years has an orbital altitude of 1000 km or more which is higher than a low Earth orbiting satellite, so that there is a risk of collision with a satellite flying at a lower orbital altitude during deorbit at end of life or due to a failure.

In a mega satellite constellation, orbital planes are arranged in various ways and a large number of satellites fly in file in each orbital plane, so that there are a wide variety of orbital routes where a deorbiting satellite passes. In particular, the probability of collision is high when there is a possibility of passing a region congested with low Earth orbit satellites, such as the vicinity of sun-synchronous orbit of LST 10:30 or the polar region.

If deorbit depends on free fall, the orbital plane will rotate as the altitude is gradually lowered, so that a satellite deorbiting from any orbital plane may pass an orbit congested with sun-synchronous satellites.

If a satellite in a satellite constellation composed of orbital planes with an orbital inclination of approximately 90 degrees passing the vicinity of the polar regions is to be deorbited, the orbital inclination remains approximately the same even when the orbital altitude is lowered, so that the probability of collision with a polar orbit satellite at a lower altitude is high.

In this embodiment, in order to avoid passing a congested orbital plane, the revolution of the orbital plane is used to fall earlier before passing the congested orbit could happen or, contrarily, to fall through a non-congested orbital plane after the congested orbital plane has passed by, so as to avoid a collision. As a method for changing the timing of passing the congested orbital plane, accelerating the satellite to be deorbited raises the orbital altitude, so that the timing of fall can be delayed. Decelerating the satellite to be deorbited lowers the orbital altitude, so that the timing of fall can be advanced. The orbital plane rotates due to perturbation depending on the residence time at the orbital altitude, so that it is possible to wait until the congested orbit passes by. The orbital inclination can be changed by operating the propulsor in a direction perpendicular to the traveling direction when the satellite to be deorbited passes the ascending node or the descending node, so that the revolution of the orbital plane can also be accelerated.

In particular, in Example 4 of the ground facility 500, a collision is avoided by changing the orbital plane so as not to pass the polar region at an altitude that is congested in the polar region by intentionally changing the orbital inclination. As a method for changing the orbital inclination, the orbital inclination can be changed effectively by operating the propulsor in a direction perpendicular to the traveling direction when the satellite to be deorbited passes the ascending node or the descending node.

The effects of Embodiments 1 to 10 will be described further.

In recent years, plans for a large-scale satellite constellation of thousands of satellites have been announced, but satellites flying at the same altitude have a risk of colliding with each other at two points where the satellite altitudes meet on a line of intersection between the orbital planes. In a large-scale constellation, the probability of collision is very high especially in the polar regions where all orbital planes meet with high probability.

As an example of a large number of satellites flying in the same orbital plane, geostationary orbit satellites flying above the equator at an orbital altitude of about 36000 km are famous, and about 300 satellites are flying in the same orbital plane. Since these satellites are in synchronization with the revolution of Earth, they seem to be stationary when seen from the ground, but they are flying in an approximately circular orbit at the same altitude. Thus, the geostationary orbit satellites continue to operate without colliding with each other. Two satellites in orbit are sufficiently spaced apart, although the angles are only about 1 or 2 degrees apart when seen from Earth and seem to be in close proximity.

In contrast, in low-Earth orbiting satellite constellations which are increasing in number in recent years, a single constellation has several thousand satellites and a plan with multiple satellite constellations has a total of nearly one million satellites. The orbital altitude is as low as $\frac{1}{20}$ to $\frac{1}{100}$ of that of geostationary satellites and the spacing between two satellites is also very small, so that the risk of collision is high in comparison with geostationary orbits.

Unlike geostationary orbits, different orbital planes are used simultaneously, so that there is a possibility of collision at intersection lines between two planes. In a satellite constellation with an orbital inclination of about 90 degrees, a plurality of orbital planes intersect near the axis of revolution of Earth and all satellites pass over the South and North Poles, so that there is a high possibility of collision if the orbital altitudes match.

Sun-synchronous orbits of LST 10:00 to 11:00, which are often used by Earth observation satellites, have many orbital planes congested with satellites, so that there is a high risk of collision if an object whose orbital altitude changes gradually intrudes into the same orbital plane.

In a completed satellite constellation, no collision occurs between any two satellites unless the position coordinates and time points match simultaneously, (x1, y1, z1, t1)=(x2, y2, z2, t2). Therefore, a collision can be avoided by artificially manipulating the orbital altitude, timing, phase in the orbital plane, or the like. However, in the transitional stage of constructing a satellite constellation, there is a high risk of collision in the process of adding a new satellite to the constellation.

In a case in which a satellite flying at a higher altitude than many satellite constellations falls freely due to an uncontrollable failure, if the satellite passes a congested orbital plane while changing the altitude, the satellite may encounter satellite groups at a plurality of orbital altitudes in the same orbital plane, so that there is a high risk of collision.

Even if the collision probability as an absolute value is still sufficiently small because outer space is vast, once a collision occurs, large-scale destruction may occur and a large number of scattered remains, as so-called debris, may collide again with a satellite flying in the vicinity, causing secondary damage. In the worst case, there is a concern that the entirety of a nearby orbit may be violated due to a chain reaction of collisions and destruction.

If the entirety of a nearby orbit is violated, causing a large number of pieces of debris to float, there is a risk that any satellite cannot be operated for a long period of time, adversely affecting various aspects of social life, which is increasingly dependent on space infrastructure.

The cost of a satellite itself is high, and the total costs for launch by a rocket and operation are huge, so that an occurrence of a collision will lead to a huge amount of economic loss.

Since a purpose such as a communication service, for example, is realized by cooperation of a plurality of satellites, a loss of a satellite due to a collision will lead to suspension or quality degradation in the intended service.

Embodiments 1 to 10 above provide techniques such as combining orbital planes having different altitudes, a scheme for artificially shifting intersection passage time points, a scheme for removing a failed satellite, and a scheme for launching a new satellite into orbit, so that a collision in a satellite constellation can be avoided.

Embodiment 11

In this embodiment, additions to Embodiments 1 to 10 will be mainly described. Components that are substantially the same as those in Embodiments 1 to 10 are denoted by the same reference signs, and description thereof may be omitted.

As described in Embodiment 1, the satellite constellation forming system 100 forms a satellite constellation 20 that is composed of a satellite group 300 and provides a service through cooperation of the satellite group 300. The satellite constellation forming system 100 forms a satellite constellation 20 having a plurality of orbital planes in which a plurality of satellites fly at the same orbital altitude in each orbital plane 21.

The satellite constellation forming unit 110 according to this embodiment forms a satellite constellation 20 in which the orbital planes of the orbital planes 21 are mutually different, and each orbital plane has an orbital inclination such that the orbital periods of the orbital planes 21 are equal to each other. For example, each of the orbital planes is a sun-synchronous orbit as illustrated in FIG. 11.

In the satellite constellation forming system 100, parameters are set so that the orbital altitudes of the orbital planes 21 of the satellite constellation 20 are mutually different, and each orbital plan has an orbital inclination such that the orbital periods of the orbital planes 21 are equal to each other.

Using the set parameters, the satellite constellation forming unit 110 forms the satellite constellation 20 in which the orbital altitudes of the orbital planes 21 are mutually different, and each orbital plane has an orbital inclination such that the orbital periods of the orbital planes 21 are equal to each other.

Figure 25:
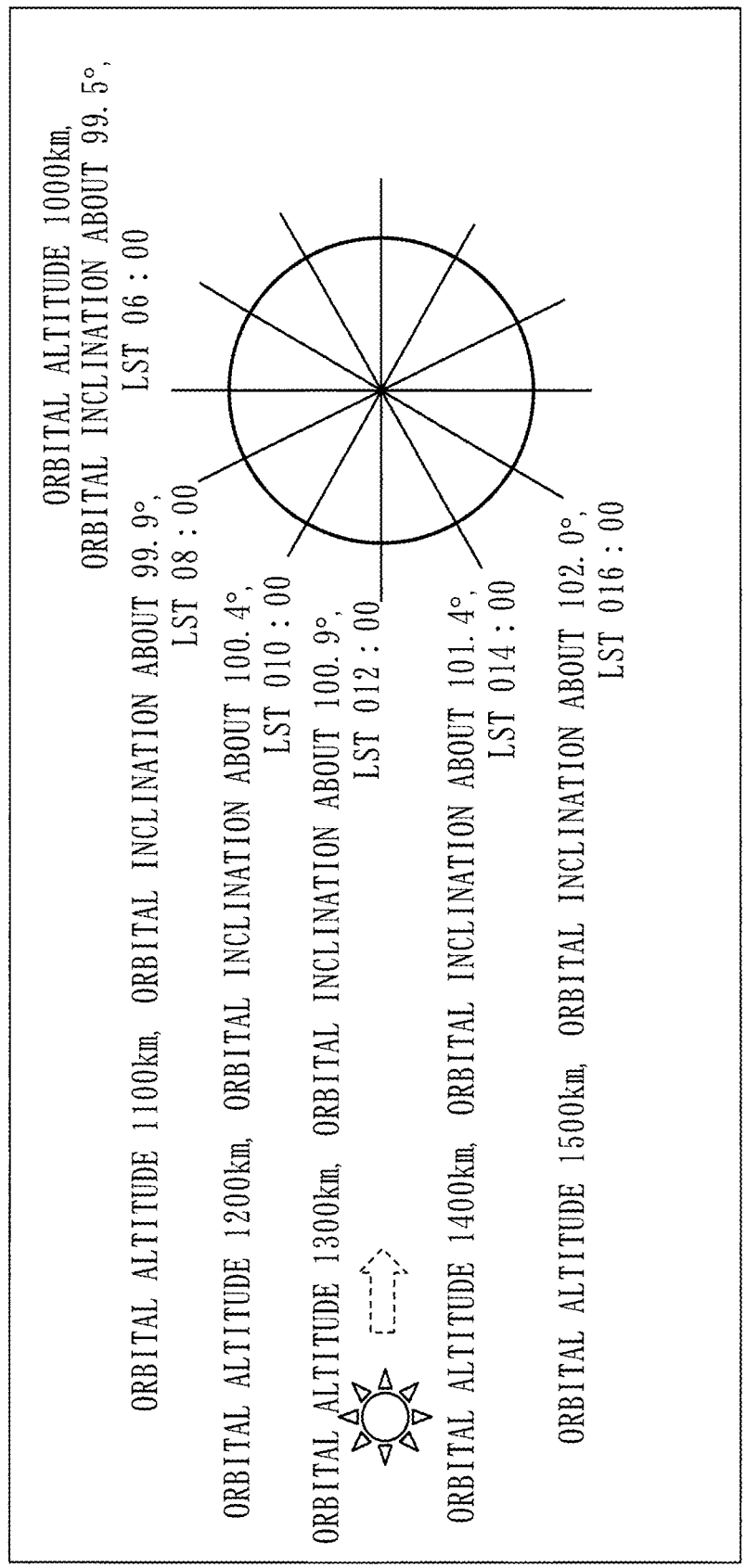
FIG. 25 is a schematic diagram illustrating a specific example of a satellite constellation 20 according to Embodiment 11.

FIG. 25 is a schematic diagram illustrating a specific example of the satellite constellation 20 according to this embodiment.

Sun-synchronous orbital planes have equal orbital periods even when their orbital altitudes are different. An example of orbital planes that have different orbital altitudes and are sun-synchronous orbits is indicated below. The constraints for sun-synchronization are generally determined by the correlation between the orbital altitude and the orbital inclination, so that a sun-synchronous orbit can be formed by appropriately setting the orbital inclination depending on the orbital altitude.

Orbital altitude 1000 km: orbital inclination about 99.5°
Orbital altitude 1100 km: orbital inclination about 99.9°
Orbital altitude 1200 km: orbital inclination about 100.4°
Orbital altitude 1300 km: orbital inclination about 100.9°
Orbital altitude 1400 km: orbital inclination about 101.4°
Orbital altitude 1500 km: orbital inclination about 102.0°

For example, by setting orbital planes of the above six types of orbital altitudes with LSTs as indicated below, a group of orbital planes having angles mutually different by approximately 30 degrees each is formed, and the relative angles between the orbital planes are always maintained. That is, six orbital planes whose orbital periods are equal are formed.

Sun-synchronous orbital plane at orbital altitude 1000 km: LST 06:00
Sun-synchronous orbital plane at orbital altitude 1100 km: LST 08:00
Sun-synchronous orbital plane at orbital altitude 1200 km: LST 10:00
Sun-synchronous orbital plane at orbital altitude 1300 km: LST 12:00
Sun-synchronous orbital plane at orbital altitude 1400 km: LST 14:00
Sun-synchronous orbital plane at orbital altitude 1500 km: LST 16:00

Sun-synchronous orbits are presented here as a typical example of achieving equal orbital periods. However, a plurality of orbital altitudes with equal orbital periods can also be similarly selected from orbits that are not sun-synchronous.

The satellite constellation forming unit 110 may form a satellite constellation 20 in which the orbital altitudes of orbital planes 21 are mutually different, and each orbital plane has an orbital inclination such that the revolutions of the orbital planes 21 are in synchronization with each other.

Next, the ground facility 500 that tracks and controls the satellite constellation 20 constructed by the satellite constellation forming system 100 according to this embodiment will be described.

The ground facility 500 according to this embodiment generates commands to adjust the altitude of each satellite so as to maintain the relative phases of a plurality of satellites in each orbital plane of a plurality of orbital planes, and to adjust the orbital altitude and orbital inclination of each orbital plane so as to maintain the relative angles between the plurality of orbital planes, and transmits the commands to each satellite in a satellite group.

Example 5 of the Ground Facility 500

FIG. 23 is a diagram illustrating a configuration of Example 5 of the ground facility 500, which is the ground facility 500 according to this embodiment.

The configuration of Example 5 of the ground facility 500 is substantially the same as that of Example 1 of the ground facility 500 of Embodiment 10.

The communication device 950 transmits and receives signals for tracking and controlling a satellite 30 included in the satellite constellation 20.

The orbit control command transmission unit 510 transmits to the satellites 30 the orbit control command 51 to adjust the altitude of each satellite so as to maintain the relative phases of a plurality of satellites in each orbital plane of a plurality of orbital planes and adjusting the orbital altitude and orbital inclination of each orbital plane so as to maintain the relative angles between the orbital planes.

Description of Effects of this Embodiment

The orbital periods of orbital planes having different orbital altitudes and equal orbital inclinations are different from each other. For this reason, the relative angle between the orbital planes changes during long-term operation. As a result, when a service is implemented by a plurality of satellites in cooperation, the arrangement of the satellites may change, which may hinder the service. When the orbital planes are adjusted using a propulsor separately in order to maintain an appropriate arrangement of orbits, it may not be possible to continue the service while adjustments are being carried out.

With the satellite constellation forming system according to this embodiment, the relative relationship of the orbital planes is maintained, so that a collision risk can be avoided while a service is being provided continuously without any problem.

Embodiment 12

In this embodiment, additions to or differences from Embodiments 1 to 11 will be mainly described. Components that are substantially the same as those in Embodiments 1 to 11 are denoted by the same reference signs, and description thereof may be omitted.

Description of Configuration

Figure 26:
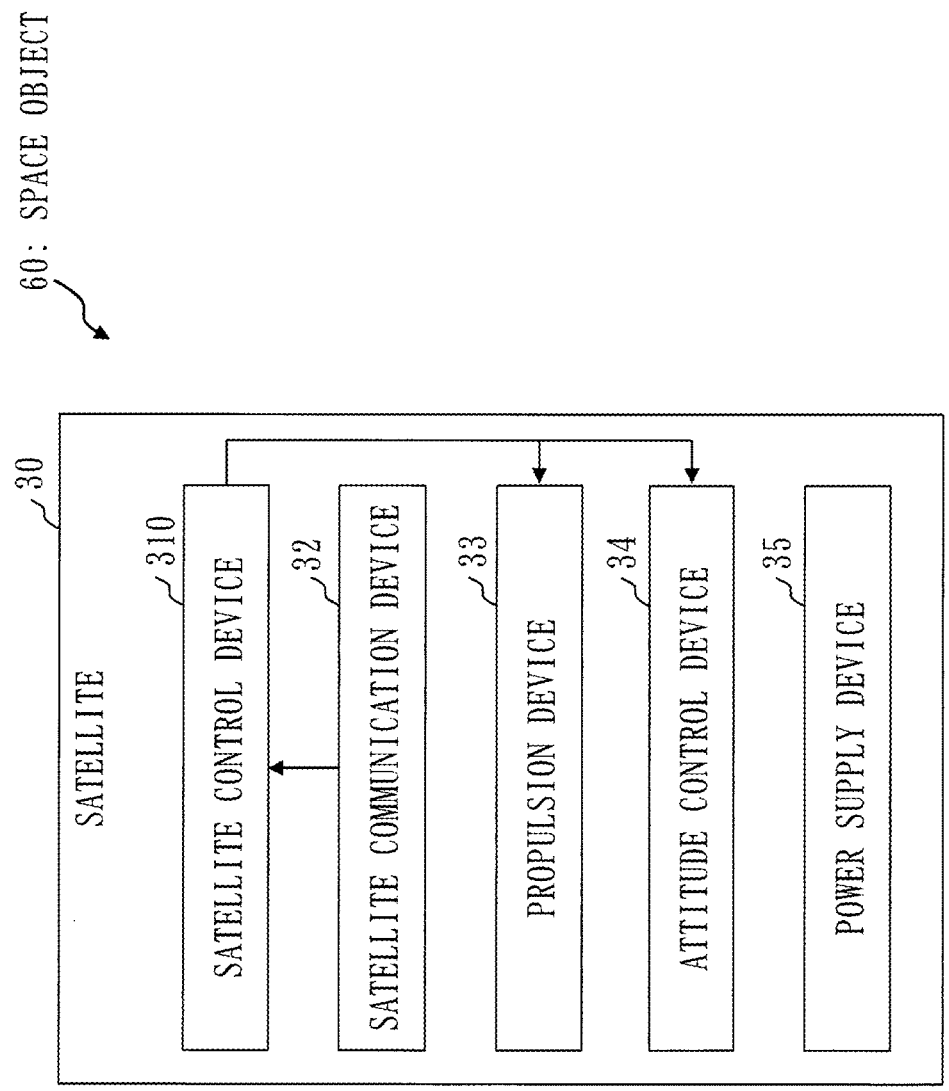
FIG. 26 is an example of a configuration of a satellite of the satellite constellation forming system.

FIG. 26 is an example of a configuration of a satellite 30 of a satellite constellation forming system 600.

The configuration of the satellite 30 that forms the satellite constellation forming system 600 will be described.

The satellite 30 includes a satellite control device 310, a satellite communication device 32, a propulsion device 33, an attitude control device 34, and a power supply device 35. In addition, constituent elements that realize various functions are included. In FIG. 6, the satellite control device 310, the satellite communication device 32, the propulsion device 33, the attitude control device 34, and the power supply device 35 will be described. The satellite 30 is an example of a space object 60.

The satellite control device 310 is a computer that controls the propulsion device 33 and the attitude control device 34, and includes a processing circuit. Specifically, the satellite control device 310 controls the propulsion device 33 and the attitude control device 34 in accordance with various commands transmitted from the ground facility 500.

The satellite communication device 32 is a device that communicates with the ground facility 500. Specifically, the satellite communication device 32 transmits various types of data regarding the satellite itself to the ground facility 500. The satellite communication device 32 receives various commands transmitted from the ground facility 500.

The propulsion device 33 is a device that provides thrust to the satellite 30 and changes the velocity of the satellite 30. Specifically, the propulsion device 33 is an apogee kick motor, a chemical propulsion device, or an electric propulsion device. An apogee kick motor (AKM) is an upper-stage propulsion device used for launching an artificial satellite into an orbit, and is also called an apogee motor (when a solid rocket motor is used) or an apogee engine (when a liquid engine is used).

A chemical propulsion device is a thruster using mono-propellant or bipropellant fuel. An electric propulsion device is an ion engine or a Hall thruster. The term "apogee kick motor" is the name of a device used for obit transfer and may refer to a type of chemical propulsion device.

The attitude control device 34 is a device to control attitude elements such as the attitude of the satellite 30 and the angular velocity and line of sight of the satellite 30. The attitude control device 34 changes the orientation of each attitude element to a desired orientation. Alternatively, the attitude control device 34 maintains each attitude element in a desired orientation. The attitude control device 34 includes an attitude sensor, an actuator, and a controller. The attitude sensor is a device such as a gyroscope, an Earth sensor, a sun sensor, a star tracker, a thruster, or a magnetic sensor. The actuator is a device such as an attitude control thruster, a momentum wheel, a reaction wheel, or a control moment gyroscope. The controller controls the actuator according to measurement data of the attitude sensor or various commands from the ground facility 500.

The power supply device 35 includes equipment such as a solar cell, a battery, and an electric control device, and provides electric power to each device installed in the satellite 30.

The processing circuit included in the satellite control device 310 will be described.

The processing circuit may be dedicated hardware, or may be a processor that executes programs stored in a memory.

In the processing circuit, some functions may be realized by hardware, and the remaining functions may be realized by software or firmware. That is, the processing circuit can be realized by hardware, software, firmware, or a combination of these.

Specifically, the dedicated hardware is a single circuit, a composite circuit, a programmed processor, a parallel-programmed processor, an ASIC, an FPGA, or a combination of these.

ASIC is an abbreviation for Application Specific Integrated Circuit. FPGA is an abbreviation for Field Programmable Gate Array.

Figure 27:
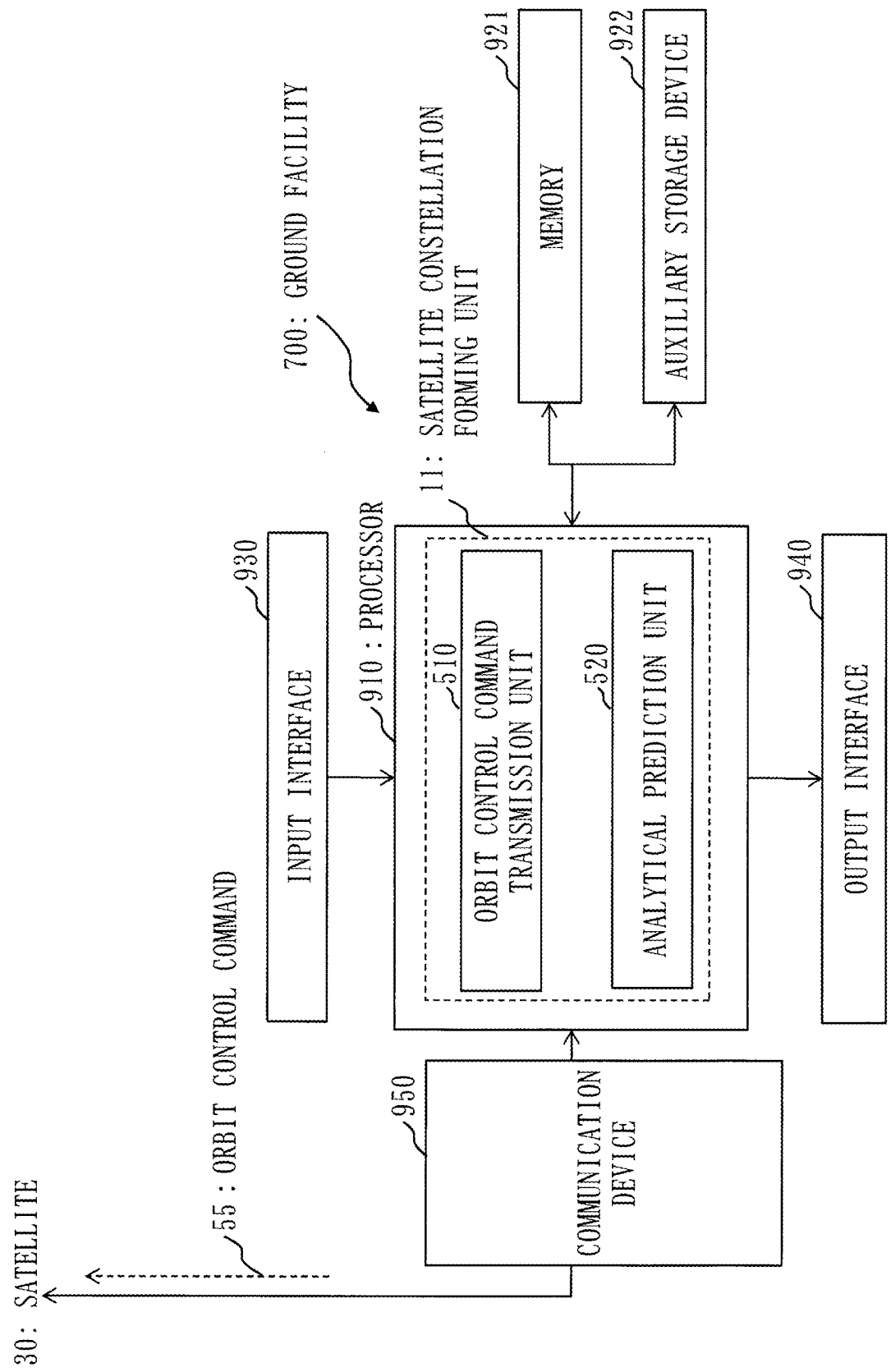
FIG. 27 is an example of a configuration of a ground facility included in the satellite constellation forming system.

FIG. 27 is an example of a configuration of the ground facility 500 included in the satellite constellation forming system 600.

The ground facility 500 controls a large number of satellites in all orbital planes by programs. The ground facility 500 is an example of a ground device. The ground device is composed of a ground station, such as a ground antenna device, a communication device connected to a ground antenna device, or an electronic computer, and a ground facility as a server or terminal connected with the ground station via a network. The ground device may include a communication device installed on a mobile object such as an airplane, a self-driving vehicle, or a mobile terminal.

The ground facility 500 forms a satellite constellation 20 by communicating with each satellite 30. The ground facility 500 is provided in a space traffic management device 200. The ground facility 500 includes a processor 910, and also includes other hardware components such as a memory 921, an auxiliary storage device 922, an input interface 930, an output interface 940, and a communication device 950. The processor 910 is connected with other hardware components via signal lines, and controls the other hardware components. The hardware components of the ground facility 500 are substantially the same as the hardware components of the satellite constellation forming system 100 described in FIG. 6.

The ground facility 500 includes an orbit control command transmission unit 510 and an analytical prediction unit 520 as functional components. The functions of the orbit control command transmission unit 510 and the analytical prediction unit 520 are realized by hardware or software.

The communication device 950 transmits and receives signals for tracking and controlling each satellite 30 in the satellite group 300 constituting the satellite constellation 20. The communication device 950 transmits an orbit control command 55 to each satellite 30.

The analytical prediction unit 520 analytically predicts the orbit of the satellite 30.

The orbit control command transmission unit 510 generates an orbit control command 55 to be transmitted to the satellite 30.

The orbit control command transmission unit 510 and the analytical prediction unit 520 realize the functions of a satellite constellation forming unit 11. That is, the orbit control command transmission unit 510 and the analytical prediction unit 520 are examples of the satellite constellation forming unit 11.

Figure 28:
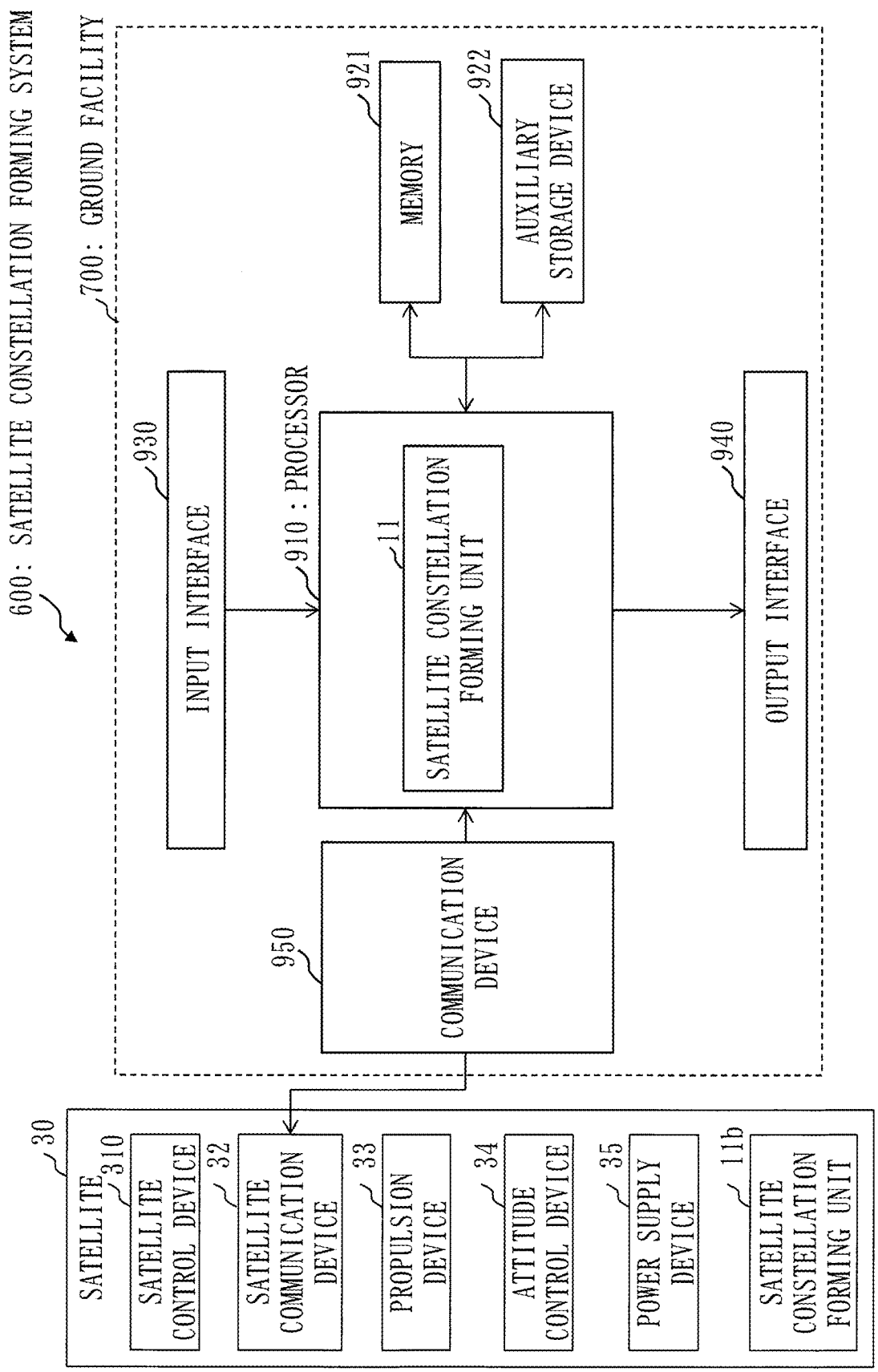
FIG. 28 is an example of a functional configuration of the satellite constellation forming system.

FIG. 28 is a diagram illustrating an example of a functional configuration of the satellite constellation forming system 600.

The satellite 30 further includes a satellite constellation forming unit 11b to form a satellite constellation 20. The satellite constellation forming unit 11b included in each satellite 30 of a plurality of satellites and the satellite constellation forming unit 11 included in each ground facility 500 cooperatively realize the functions of the satellite constellation forming system 600. The satellite constellation forming unit 11b of the satellite 30 may be provided in the satellite control device 310.

Figure 29:
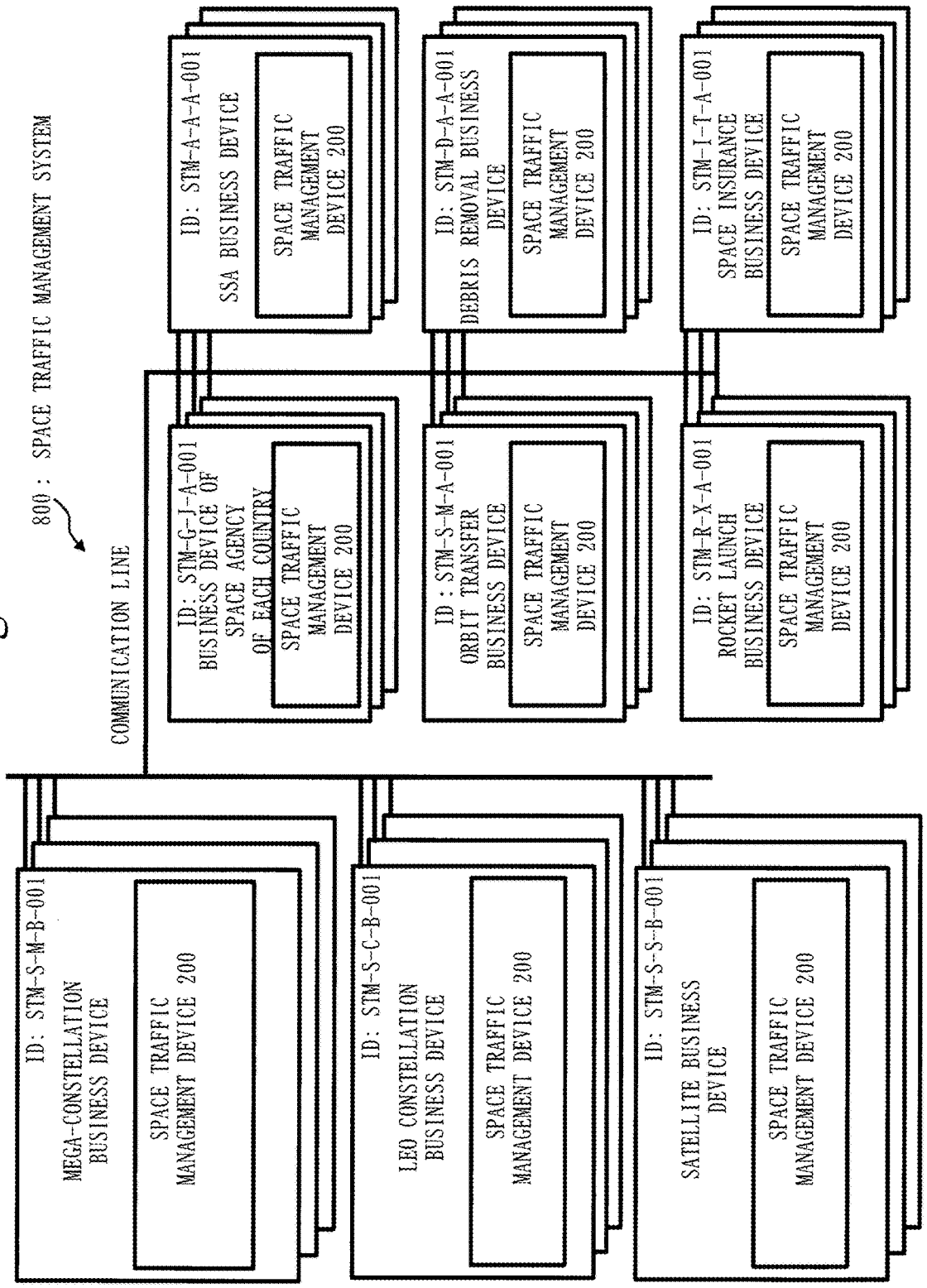
FIG. 29 is an example of an overall configuration of a space traffic management system according to Embodiment 12.

FIG. 29 is an example of an overall configuration of a space traffic management system 800 according to this embodiment.

The space traffic management system 800 includes a plurality of space traffic management devices 200.

Each of the space traffic management devices 200 is installed in each of business devices 40 of business operators that manage space objects 60 flying in the space. The space traffic management devices 200 are connected with one another with communication lines.

Figure 30:
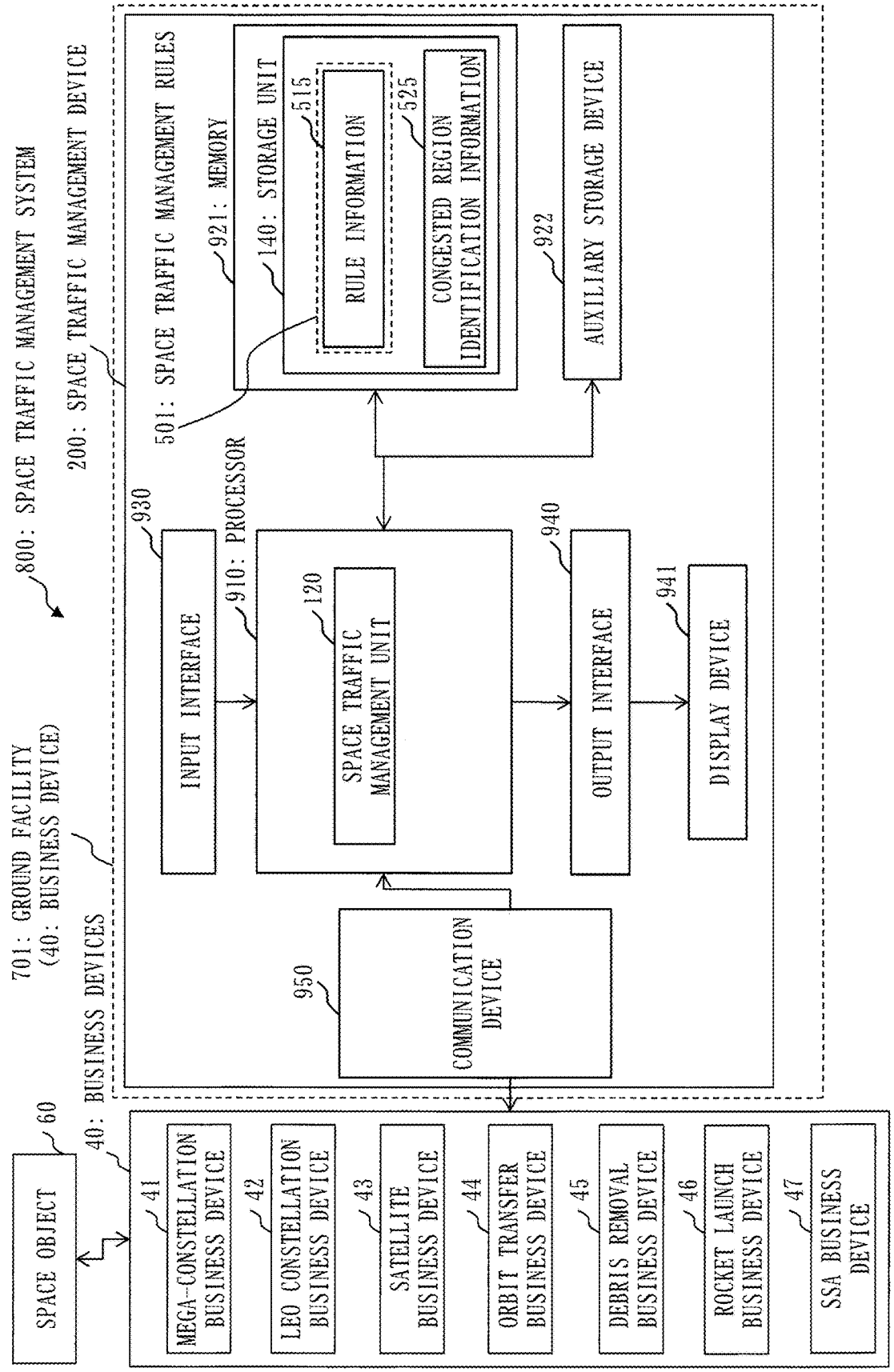
FIG. 30 is an example of a configuration of a space traffic management device according to Embodiment 12.

FIG. 30 is a diagram illustrating an example of a configuration of the space traffic management device 200 according to this embodiment.

The space traffic management device 200 communicates with other business devices 40. The space traffic management device 200 may be installed in a ground facility 701. The space traffic management device 200 may be installed in the satellite constellation forming system 600.

The business devices 40 provide information related to space objects 60 such as artificial satellites or debris. The business devices 40 are computers of business operators that collect information related to space objects 60 such as artificial satellites or debris.

The business devices 40 include devices such as a mega-constellation business device 41, an LEO constellation business device 42, a satellite business device 43, an orbital transfer business device 44, a debris removal business device 45, a rocket launch business device 46, and an SSA business device 47. LEO is an abbreviation for Low Earth Orbit. SSA is an abbreviation for Space Situational Awareness. An SSA business is referred to also as a space situational awareness business or an SSA management business. An SSA business device is referred to also as a space situational awareness business device or an SSA management business device.

The mega-constellation business device 41 is a computer of a mega-constellation business operator that conducts a large-scale satellite constellation, that is, mega-constellation business.

The LEO constellation business device 42 is a computer of an LEO constellation business operator that conducts a low Earth orbit constellation, that is, LEO constellation business.

The satellite business device 43 is a computer of a satellite business operator that handles one to several satellites.

The orbital transfer business device 44 is a computer of an orbital transfer business operator that performs a space object intrusion alert for a satellite.

The debris removal business device 45 is a computer of a debris removal business operator that conducts a debris retrieval business.

The rocket launch business device 46 is a computer of a rocket launch business operator that conducts a rocket launch business.

The SSA business device 47 is a computer of an SSA business operator that conducts an SSA business, that is, a space situational awareness business.

The business devices 40 may be other devices, provided they are devices that collect information on space objects such as artificial satellites or debris and provide the collected information to the space traffic management system 800. When the space traffic management device 200 is installed on a public SSA server, the space traffic management device 200 may be configured to function as the public SSA server.

The space traffic management device 200 includes a processor 910, and also includes other hardware components such as a memory 921, an auxiliary storage device 922, an input interface 930, an output interface 940, and a communication device 950. The processor 910 is connected with other hardware components via signal lines, and controls the other hardware components.

The space traffic management device 200 includes a space traffic management unit 120 and a storage unit 140 as an example of functional elements. The storage unit 140 stores rule information 515 and congested region identification information 525.

The functions of the space traffic management unit 120 are realized by software. The storage unit 140 is provided in the memory 921. Alternatively, the storage unit 140 may be provided in the auxiliary storage device 922. The storage unit 140 may be divided and provided in the memory 921 and the auxiliary storage device 922.

The space traffic management unit 120 manages space objects 60 in accordance with the rule information 515, for example. Alternatively, the space traffic management unit 120 manages space objects 60 in accordance with the rule information 515, using the congested region identification information 525.

The processor 910 is a device that executes a space traffic management program. The space traffic management program is a program that realizes the functions of the constituent elements of the space traffic management device 200 and the space traffic management system 800.

The hardware components of the space traffic management device 200 are substantially the same as the hardware components of the satellite constellation forming system 100 described in FIG. 6.

The space traffic management program is read into the processor 910 and executed by the processor 910. The memory 921 stores not only the space traffic management program but also an operating system (OS). The processor 910 executes the space traffic management program while executing the OS. The space traffic management program and the OS may be stored in the auxiliary storage device 922. The space traffic management program and the OS that are stored in the auxiliary storage device 922 are loaded into the memory 921 and executed by the processor 910. Part or the entirety of the space traffic management program may be embedded in the OS.

The space traffic management device 200 may include a plurality of processors as an alternative to the processor 910. The plurality of processors share execution of programs. Each of the processors is, like the processor 910, a device that executes programs.

"Unit" of each unit of the space traffic management device may be interpreted as "process", "procedure", "means", "phase", or "step". "Process" in a passage determination process, an alert generation process, and an alert notification process may be interpreted as "program", "program product", or "computer readable recording medium recording a program". "Process", "procedure", "means", "phase", and "step" may be interpreted interchangeably.

The space traffic management program causes a computer to execute each process, each procedure, each means, each phase, or each step, where "unit" of each unit of the space traffic management system is interpreted as "process", "procedure", "means", "phase", or "step". A space traffic management method is a method performed by execution of the space traffic management program by the space traffic management device 200.

The space traffic management program may be stored and provided in a computer readable recording medium. Each program may be provided as a program product.

<Functional Overview of the Space Traffic Management System of this Embodiment>

Sun-synchronous orbits are orbits often used in Earth observation, and the following regions are particularly congested.

A region in the vicinity of sun-synchronous orbit LST 10:30 and at orbital altitudes of 500 km to 1000 km A region in the vicinity of sun-synchronous orbit LST 13:30 and at orbital altitudes of 500 km to 1000 km A region in the vicinity of sun-synchronous orbit LST 06:00 an at orbital altitudes of 500 km to 1000 km A region in the vicinity of sun-synchronous orbit LST 18:00 and at orbital altitudes of 500 km to 1000 km Sun-synchronous orbits have an orbital inclination of about 90 degrees, so that for satellites flying at the same orbital altitude, intersection points of orbital planes are concentrated in the polar regions and there is a high risk of collision.

Therefore, if it is stipulated as a rule of space traffic management (STM) that satellites having orbital planes with different normal vectors adopt mutually different orbital altitudes so as to eliminate intersection points of orbits, the probability of collision in steady operation will become zero and collision risks will be eliminated. In reality, a collision risk occurs when non-steady operation, such as orbital insertion or deorbit, is performed. However, if the probability of collision is zero in steady operation, there is an effect that risks are reduced significantly.

There is also means of avoiding a collision by separating the polar region passage timings by artificial control. However, a large number of business operators from a large number of countries are operating satellites in sun-synchronous orbits and collision risks remain if mutual cooperation is not thoroughly established.

Another problem is that there is a high risk of collision if an unexpected accident such as a collision with debris causes a situation in which artificial control is impossible.

Therefore, if the probability of collision is zero in steady operation, there is an effect that a collision accident can be avoided even when artificial control cannot be performed.

Specifically, as illustrated in FIGS. 29 and 30, the space traffic management system 800 according to this embodiment executes a space traffic management process to conduct space traffic management for space objects 60, using information such as the rule information 515 and the congested region identification information 525. That is, in the space traffic management system 800, a plurality of space traffic management devices 200 manage traffic of the space objects 60, using the rule information 515 and the congested region identification information 525 that are common in the plurality of space traffic management devices 200. The rule information 515 is also referred to as a space traffic management rule 501.

Example 1 of the Space Traffic Management Process

The space traffic management unit 120 performs the space traffic management process for the space objects 60 such that satellites with orbital planes having different normal vectors adopt mutually different orbital altitudes.

Specifically, in the rule information 515, information indicating a rule that satellites with orbital planes having different normal vectors adopt mutually different orbital altitudes is set.

The space traffic management unit 120 manages the space objects 60 in accordance with the rule information 515.

According to Example 1 of the space traffic management process, satellites with orbital planes having different normal vectors adopt mutually different orbital altitudes, so that there is an effect that the probability of collision in the polar regions is zero and collision risks in steady operation can be eliminated.

Example 2 of the Space Traffic Management Process

The space traffic management unit 120 performs the space traffic management process for the space objects 60 such that a plurality of satellites with the same normal vector and flying at the same orbital altitude fly while maintaining a relative phase angle that causes the plurality of satellites to be spaced approximately evenly in the orbital plane.

Specifically, in the rule information 515, information indicating a rule that a plurality of satellites with the same normal vector and flying at the same orbital altitude fly while maintaining a relative phase angle that causes the plurality of satellites to be spaced approximately evenly in the orbital plane is set.

The space traffic management unit 120 manages the space objects 60 in accordance with the rule information 515.

Figure 31:
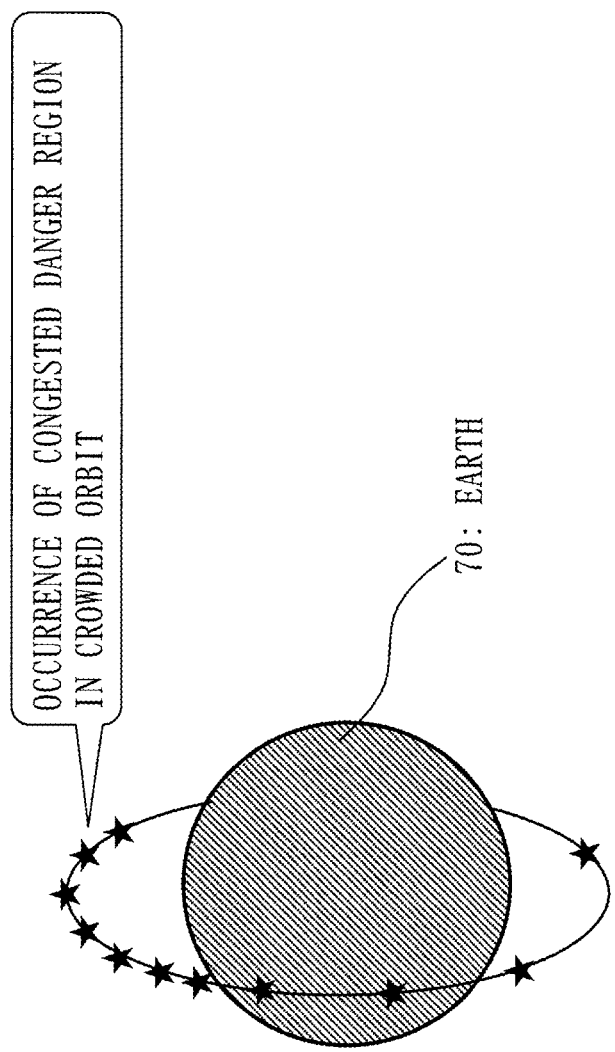
FIG. 31 is a comparison example of Example 2 of a space traffic management process, and is a diagram illustrating an arrangement of satellites in an orbital plane.

FIG. 31 is a diagram representing an arrangement of satellites in an orbital plane in a comparison example of Example 2 of the space traffic management process.

Figure 32:
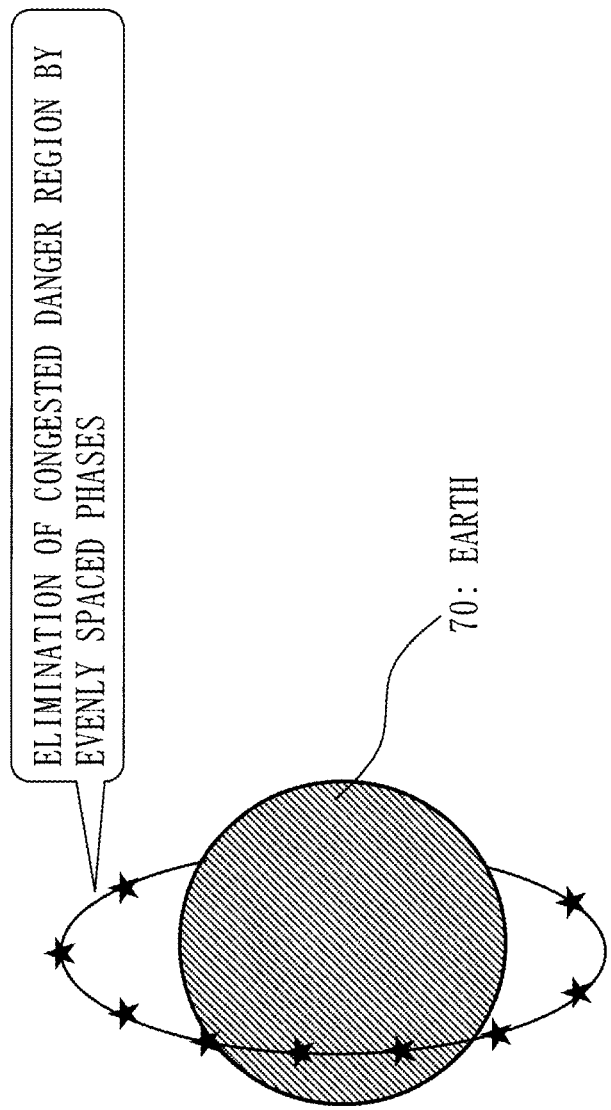
FIG. 32 is a diagram illustrating an arrangement of satellites in an orbital plane in Example 2 of the space traffic management process according to Embodiment 12.

FIG. 32 is a diagram representing an arrangement of satellites in an orbital plane in Example 2 of the space traffic management process according to this embodiment.

Figure 33:
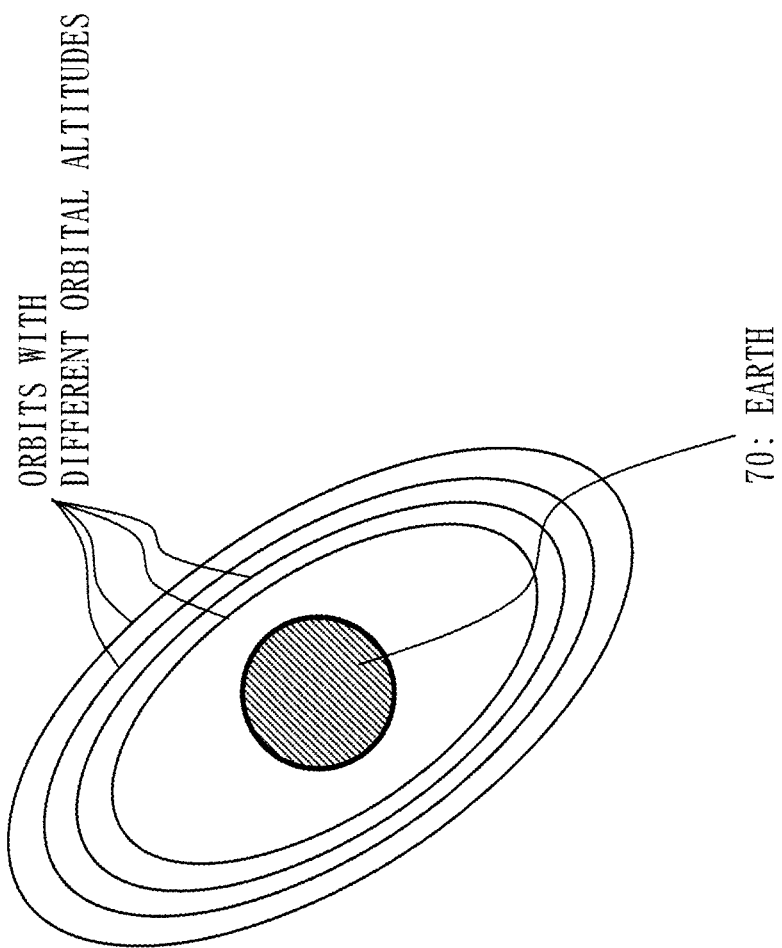
FIG. 33 is a diagram illustrating a plurality of orbital planes with the same normal vector and different orbital altitudes.

FIG. 33 is a diagram illustrating a plurality of orbital planes with the same normal vector and different orbital altitudes.

As indicated in FIGS. 31 and 32, a plurality of satellites flying in the same orbital plane at the same orbital altitude can avoid collisions by flying in synchronization. However, if a plurality of satellites managed by different business operators are made to fly without managing a relative phase angle, there is a risk of collision.

According to Example 2 of the space traffic management process, the space traffic management rule 501 is used to identify a plurality of satellites flying in the same orbital plane and to cause a plurality of satellites flying at the same orbital altitude to fly while maintaining a relative phase angle that causes the plurality of satellites to be spaced approximately evenly in the orbital plane. As a result, there is an effect that collisions can be avoided.

Example 3 of the Space Traffic Management Process

The congested region identification information 525 is information that identifies the following regions as congested regions.

- A region in the vicinity of sun-synchronous orbit LST 10:30 and at orbital altitudes of 500 km to 1000 km
- A region in the vicinity of sun-synchronous orbit LST 13:30 and at orbital altitudes of 500 km to 1000 km
- A region in the vicinity of sun-synchronous orbit LST 06:00 and at orbital altitudes of 500 km to 1000 km
- A region in the vicinity of sun-synchronous orbit LST 18:00 and at orbital altitudes of 500 km to 1000 km
- A region at latitudes of 80 and more degrees north and at orbital altitudes of 500 km to 1000 km
- A region at latitudes of 80 and more degrees south and at orbital altitudes of 500 km to 1000 km The vicinities of LST 10:30 and LST 13:30 are orbits often used by optical satellite groups or various Earth observation satellite groups called A-train. The vicinities of LST 06:00 and LST 18:00 are orbits often used by radar satellite groups equipped with synthetic-aperture radars.

In the rule information 515, the space traffic management rule 501 indicating a rule that business operators that manage satellites flying in a congested region disclose satellite information is set.

Using the congested region identification information 525 and the rule information 515, the space traffic management unit 120 realizes means by which business operators that manage satellites flying in the same orbital plane exchange information on flight safety measures.

In Example 3 of the space traffic management process, the space traffic management device 200 has the congested region identification information 525. The space traffic management device 200 also has the space traffic management rule 501 that business operators that manage satellites flying in a congested region disclose satellite information and the means by which business operators that manage satellites flying in the same orbital plane can exchange information on flight safety measures.

As described above, since it is dangerous to make satellites fly in the orbit by business operators without any rules, a traffic rule that satellite orbit information be disclosed is set so as to create an environment in which measures for securing flight safety can be arranged. Therefore, according to Example 3 of the space traffic management process, there is an effect that collisions can be avoided.

As the means for exchanging information on flight safety measures, a function of allowing chat on the portal of the space traffic management system 800 may be provided, and a message for hosting an arrangement meeting may be issued.

Example 4 of the Space Traffic Management Process

Using the congested region identification information 525, the space traffic management unit 120 captures a space object 60 before intrusion into any congested region while the space object 60 is in the process of deorbiting and entering the atmosphere, so as to realize a collision avoidance operation during orbital descent. A method for realizing a collision avoidance operation during orbital descent is referred to as a method of a collision avoidance operation during orbital descent.

Specific examples of a congested region are substantially the same as those described in Example 3 of the space traffic management process.

Figure 34:
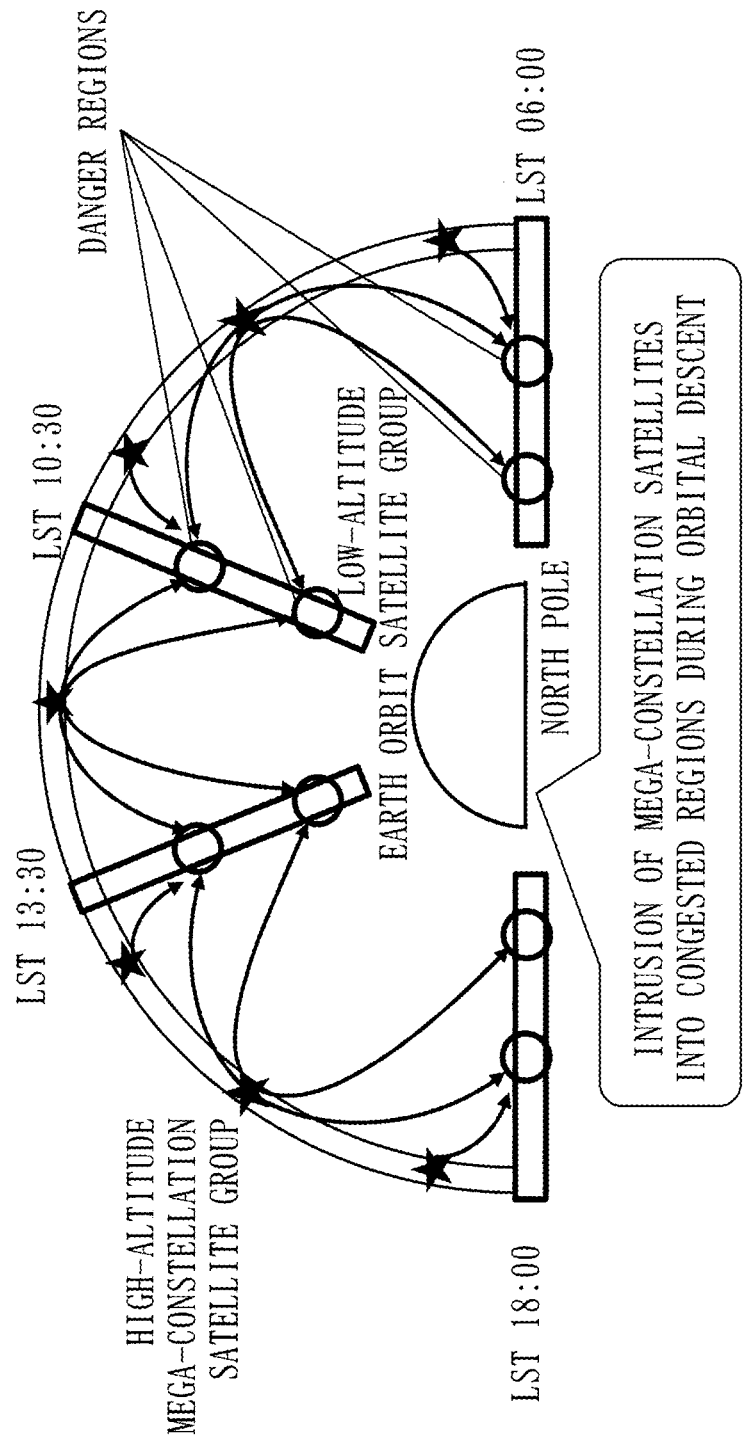
FIG. 34 is a diagram illustrating how satellites in a mega-constellation at a high altitude intrude into congested regions (danger regions) during orbital descent of the satellites.

FIG. 34 is a diagram illustrating how mega-constellation satellites at a high altitude intrude into congested regions (danger regions) while the satellites are descending in orbit.

Figure 35:
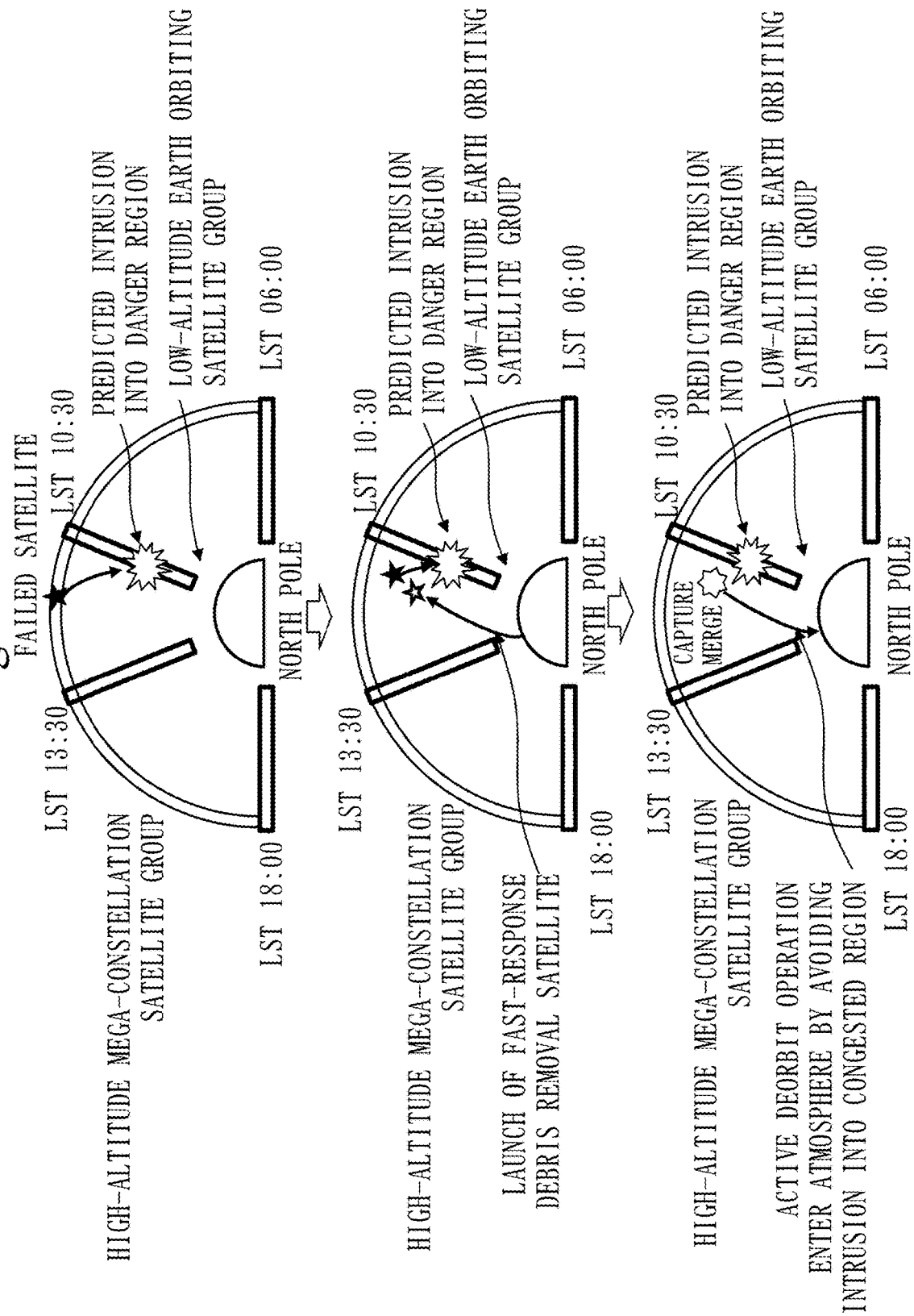
FIG. 35 is a diagram illustrating a space traffic management process for avoiding intrusion into a congested region during orbital descent of a satellite according to Embodiment 12.

FIG. 35 is a diagram illustrating a space traffic management process for avoiding intrusion into a congested region while a satellite is descending in orbit according to this embodiment.

Specifically, in the rule information 515, the space traffic management rule 501 indicating a rule that a space object 60 be captured before intrusion into any congested region while the space object 60 is in the process of deorbiting and entering the atmosphere so as to realize a collision avoidance operation during orbital descent is set. The collision avoidance operation during orbital descent is also referred to as an active deorbit operation.

Using the congested region identification information 525 and the rule information 515, the space traffic management unit 120 captures the space object 60 before intrusion into any congested region while the space object 60 is in the process of deorbiting and entering the atmosphere so as to realize the collision avoidance operation during orbital descent.

With reference to FIG. 35, this will be described specifically.

(1) The space traffic management device 200 of the mega-constellation business device 41 foresees that a mega-constellation satellite at a high altitude that has become a failed satellite will intrude into a congested region (danger region). This intrusion forecast information is shared among all the space traffic management devices 200 in the space traffic management system 800 via a communication line.

(2) Based on the rule information 515, the space traffic management device 200 of the debris removal business device 45 captures the space object 60 before it intrudes into any congested region so as to realize the collision avoidance operation during orbital descent. Specifically, a fast-response debris removal satellite is launched.

(3) The fast-response debris removal satellite captures and unites with the failed satellite, and enters the atmosphere by avoiding congested regions. This realizes the collision avoidance operation during orbital descent.

Figure 61:
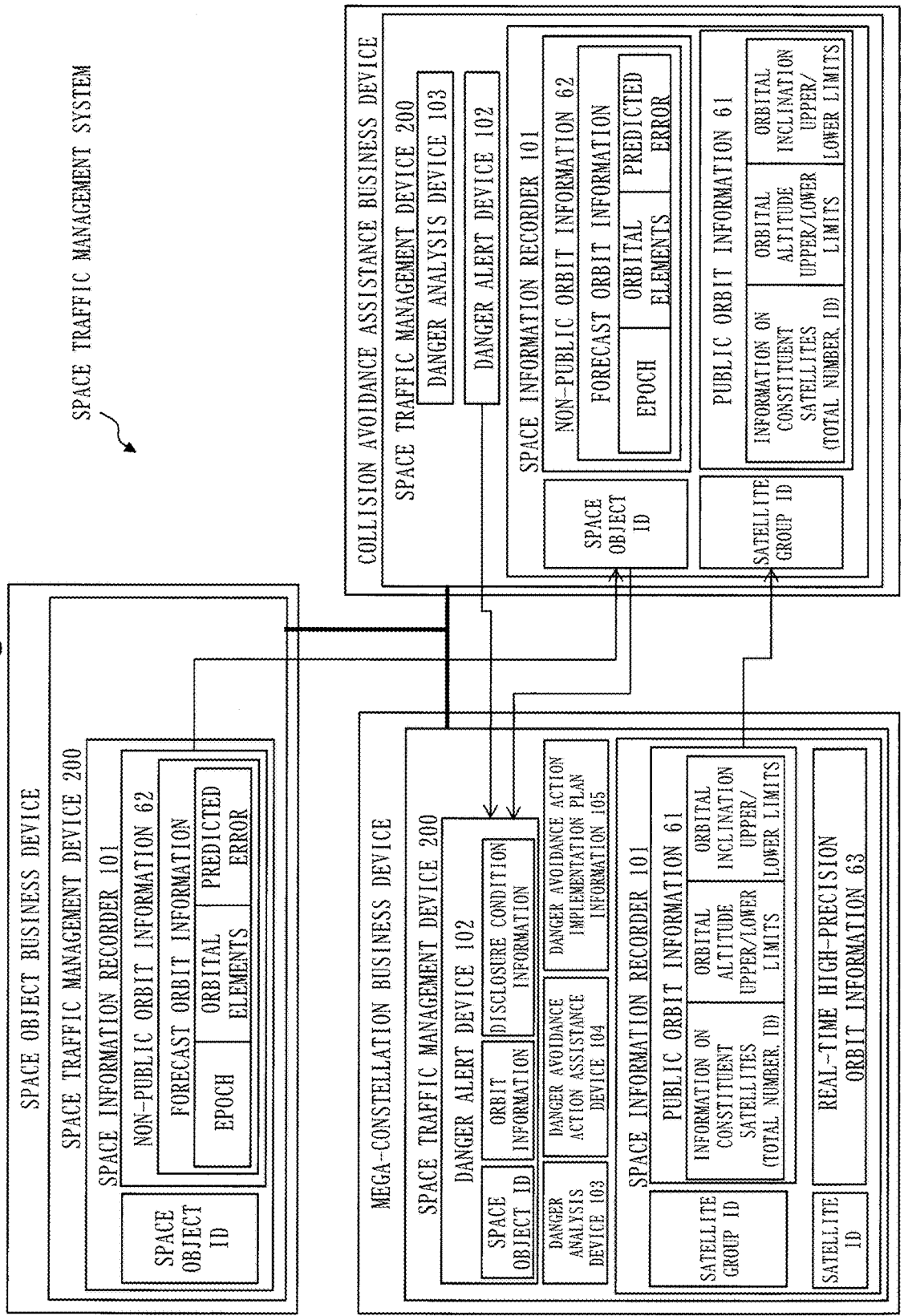
FIG. 61 is an example of a functional configuration of a space traffic management system according to Embodiment 12.

With reference to FIGS. 61 and 62, the space traffic management system according to this embodiment will be described supplementarily.

FIG. 61 is an example of a functional configuration of the space traffic management system according to this embodiment.

FIG. 62 is an example of a space information recorder of a mega-constellation business device according to this embodiment.

The space traffic management devices 200 included in the space traffic management system are mutually connected via a common communication line. The space traffic management devices 200 are provided respectively in a mega-constellation business device, a space object business device, and a collision avoidance assistance business device.
<Mega-Constellation Business Device>

The space traffic management device 200 of the mega-constellation business device includes a space information recorder 101, a danger alert device 102, a danger analysis device 103 to analyze the orbit of a space object, a danger avoidance action assistance device 104, and danger avoidance action implementation plan information 105.

The space information recorder 101 of the mega-constellation business device records orbit information of satellites constituting a mega-constellation. The space information recorder 101 is orbit forecast information.

The space information recorder 101 includes public orbit information 61 associated with a satellite group ID that identifies a satellite group and real-time high-precision orbit information 63 associated with satellite IDs that identify satellites.

The public orbit information 61 is orbit information that can be disclosed to other business devices. In the public orbit information 61, information on constituent satellites, such as the number of satellites constituting the satellite group and satellite IDs, upper and lower limits of the orbital altitude of the satellite group, and upper and lower limits of the orbital inclination of the satellite group are set.

The real-time high-precision orbit information 63 is forecast orbit information and record orbit information of individual satellites constituting the satellite group.

The danger alert device 102 notifies danger of proximity or a collision with a space object. The danger alert device 102 has orbit information associated with a space object ID that identifies a space object, and also has disclosure condition information in which a disclosure condition for the orbit information is set.

The danger analysis device 103 analyzes the orbit of a space object. For example, the danger analysis device 103 is an example of a collision analysis unit that analyzes a collision between a specific space object S and an individual satellite in a mega-constellation satellite group.

The danger avoidance action assistance device 104 plans responsibility assignment for an avoidance action for a space object. For example, the danger avoidance action assistance device 104 is an example of a countermeasure planning unit that plans a collision avoidance countermeasure when a collision between the mega-constellation and the specific space object S is foreseen.

In the danger avoidance action implementation plan information 105, an avoidance action plan created by the danger avoidance action assistance device 104 is set.

FIG. 62 is an example of the space information recorder of the mega-constellation business device according to this embodiment. In FIG. 62, details of the real-time high-precision orbit information 63 are described in particular.

In the real-time high-precision orbit information 63, forecast orbit information and record orbit information are set in association with the satellite IDs. These forecast orbit information and record orbit information are set such that they are real-time and highly precise.

<Space Object Business Device>

The space traffic management device 200 of the space object business device includes a space information recorder 101. The space object business device manages ordinary satellites of a satellite constellation or a satellite whose orbit information is not appropriate for disclosure or whose orbit information is kept secret. Therefore, the space information recorder 101 of the space traffic management device 200 of the space object business device has non-public orbit information 62 associated with a space object ID that is the ID of a specific space object S.

In the non-public orbit information 62, forecast orbit information of the space object S is set. In the forecast orbit information, an epoch, orbital elements, and a predicted error are set.

<Collision Avoidance Assistance Business Device>

The space traffic management device 200 of the collision avoidance assistance business device includes a space information recorder 101, a danger alert device 102, and a danger analysis device 103.

The space information recorder 101 of the collision avoidance assistance business device records the non-public orbit information 62 of the space object S received from the space object business device via the communication line. The non-public orbit information 62 of the space object S is associated with the space object ID that indicates the ID of the space object S.

The space information recorder 101 of the collision avoidance assistance business device records the public orbit information 61 that is received from the mega-constellation business device and is associated with a satellite group ID. In the public orbit information 61, orbit information or flight region information of a mega-constellation is set.

In this way, a database provided in the space traffic management device 200 of the collision avoidance assistance business device records the following information.

Non-public orbit information 62 of the specific space object S received from the space object business device via the communication line.

Orbit information or flight region information of the satellite group of the satellite constellation received from the mega-constellation business device.

The danger analysis device 103 analyzes the orbit of a space object. The danger analysis device 103 is an example of an orbit analysis unit 431 that analyzes the orbit of the specific space object S. For example, the danger analysis device 103 analyzes whether the specific space object S will intrude into an orbital altitude region where the satellite group of the satellite constellation flies.

The danger alert device 102 notifies danger of proximity or a collision with a space object. The danger alert device 102 is an example of a notification unit that notifies a mega-constellation business operator of an intrusion alert and the non-public orbit information 62 of the specific space object S via the communication line when it is foreseen that the specific space object S will intrude into the orbital altitude region where the satellite group of the satellite constellation flies.

The communication line may be kept secret by a cryptographic key.

In the embodiments above, an SSA business device such as the following has been described.

An SSA business device is a business device with which an SSA business operator manages space object information, and includes a space traffic management device that is compatible with space traffic management devices respectively included in business devices that manage space objects, and the SSA business device is connected, through the space traffic management device, to a space traffic management system in which the space traffic management devices respectively included in the business devices are mutually connected with a communication line.

The space traffic management device includes a space information recorder to record orbit information of a space object, a danger analysis device, and a danger alert device to notify abnormal proximity or a collision with a space object or an intrusion into a danger region by a space object, and further includes all or at least one of a danger avoidance action assistance device, danger avoidance action implementation plan information, and security management information.

The SSA business device performs proximity, collision, or intrusion analysis, using the danger analysis device and using pieces of space object information acquired by the space information recorder, and when proximity, a collision, or an intrusion involving danger is foreseen, notifies the danger to a business device of a space object to be a party involved, using the danger alert device.

The SSA business device coordinates a danger avoidance action with a management business operator of a space object to be a party involved to which danger is notified by the danger alert device, using the danger avoidance action assistance device, and discloses danger avoidance action implementation plan information.

The SSA business device notifies a danger alert to a debris removal business device or a mega-constellation business device, and requests a danger avoidance action.

The SSA business device notifies a danger alert to a space insurance business device, and assists a damage compensation measure in case of occurrence of a collision accident.

An SSA business device is a business device with which an SSA business operator manages space object information, and includes a space traffic management device that is compatible with space traffic management devices respectively included in business devices that manage space objects, and the SSA business device is connected, through the space traffic management device, to a space traffic management system in which the space traffic management devices respectively included in the business devices are mutually connected with a communication line, and is connected with a space traffic management device included in a specific business device with a secret line.

With the SSA business device like this, there is an effect that when the user of SSA information is a management business operator of a space object with confidentiality or when information on the space object to be monitored needs to be concealed, information can be provided to and received from only a necessary business device on a need-to-know basis.

An SSA business device is a business device with which an SSA business operator manages space object information, includes a space traffic management device that is compatible with space traffic management devices respectively included in business devices that manage space objects, and is connected, through the space traffic management device, to a space traffic management system in which the space traffic management devices respectively included in the business devices are mutually connected with a communication line.

An SSA business device is a business device with which an SSA business operator manages space object information, and using a danger alert device, notifies a mega-constellation business operator of rocket launch plan orbit information or orbit information of a space object that deorbits and descends in orbit.

In the embodiments above, a space traffic business device such as the following has been described.

A space traffic business device manages space traffic, includes one of a control device of a space plane and a collision avoidance assistance device, and also has a function of the SSA business device.

The space traffic business device includes, for example, a control device installed in a space port of a space plane or the like. It is assumed here that the Federal Aviation Administration (FFA) of the United States is in charge of space traffic management operations. The FFA is an air traffic control organization and does not own space objects, but implements traffic management.

In the embodiments above, a debris removal business device and a ground facility such as the following have been described.

A debris removal business device is the debris removal business device with which a debris removal business operator that removes a space object manages a debris removal satellite, and the debris removal satellite includes a capture device to capture the space object, a propulsion device, an orbit control device, and a communication device, and while the space object is in a process of deorbiting and making an atmospheric entry, captures the space object and performs a collision avoidance operation during orbital descent before the space object intrudes into any one of a region in a vicinity of sun-synchronous orbit LST 10:30 and at orbital altitudes of 500 km to 1000 km, a region in a vicinity of sun-synchronous orbit LST 13:30 and at orbital altitudes of 500 km to 1000 km, a region in a vicinity of sun-synchronous orbit LST 06:00 and at orbital altitudes of 500 km to 1000 km, a region in a vicinity of sun-synchronous orbit LST 18:00 and at orbital altitudes of 500 km to 1000 km, a region at latitudes of 80 and more degrees north and at orbital altitudes of 500 km to 1000 km, and a region at latitudes of 80 and more degrees south and at orbital altitudes of 500 km to 1000 km.

A debris removal business device is the debris removal business device with which a debris removal business operator that removes a space object manages a debris removal satellite, and the debris removal satellite is a ready-to-use satellite that has been prepared for launch and stands ready on the ground, and after it is foreseen that the space object will intrude into a satellite congested region, the debris removal satellite is launched into a predicted orbit of the space object so as to capture the space object and perform a collision avoidance operation during orbital descent.

A ground facility is the ground facility with which a debris removal business operator that removes a space object using a debris removal satellite operates and controls the debris removal satellite, and when it has been found by analytical prediction that in a process of deorbiting and making an atmospheric entry, the space object will pass through any one of a region in a vicinity of sun-synchronous orbit LST 10:30 and at orbital altitudes of 500 km to 1000 km, a region in a vicinity of sun-synchronous orbit LST 13:30 and at orbital altitudes of 500 km to 1000 km, a region in a vicinity of sun-synchronous orbit LST 06:00 and at orbital altitudes of 500 km to 1000 km, a region in a vicinity of sun-synchronous orbit LST 18:00 and at orbital altitudes of 500 km to 1000 km, a region at latitudes of 80 and more degrees north and at orbital altitudes of 500 km to 1000 km, and a region at latitudes of 80 and more degrees south and at orbital altitudes of 500 km to 1000 km, the ground facility transmits a command to an orbit control device included in the debris removal satellite so as to perform a collision avoidance operation during orbital descent to avoid a collision risk by shifting a congested orbit passage timing or an orbital plane by raising or lowering an orbital altitude by increasing or decreasing a satellite speed, or changing an orbital inclination by applying acceleration in an out-of-plane direction of the orbital plane by a jet from a propulsor in a direction approximately orthogonal to a satellite traveling direction.

A ground facility is the ground facility with which a debris removal business operator that removes a space object using a debris removal satellite operates and controls the debris removal satellite, and the debris removal satellite includes a capture device to constrain six degrees of freedom of the space object.

The ground facility includes means for analyzing a position of a center of gravity of the debris removal satellite in a state after capturing the space object, and transmits a command to an orbit control device included in the debris removal satellite so as to operate and control the orbit control device so that a jet vector of a propulsion device passes through the center of gravity in the state after capturing the space object.

A ground facility is the ground facility with which a debris removal business operator that removes a space object using a debris removal satellite operates and controls the debris removal satellite, and the debris removal satellite is a ready-to-use satellite that has been prepared for launch and stands ready on the ground, and after it is foreseen that the space object will intrude into a satellite congested region, the debris removal satellite is launched into a predicted orbit of the space object to capture the space object and perform a collision avoidance operation during orbital descent.

A debris removal business device is the debris removal business device with which a debris removal business operator that removes a space object manages a debris removal satellite, and includes the ground facility.

A debris removal business device is the debris removal business device with which a debris removal business operator that removes a space object manages a debris removal satellite.

The debris removal business device includes a space traffic management device that is compatible with space traffic management devices respectively included in business devices that manage space objects, and is connected, through the space traffic management device, to a space traffic management system in which the space traffic management devices respectively included in the business devices are mutually connected with a communication line.

The debris removal business device in which the space traffic management device includes all or at least one of
- a space information recorder to record orbit information of a space object,
- a danger alert device to notify that a space object will approach a danger region,
- a danger analysis device,
- a danger avoidance action assistance device,
- danger avoidance action implementation plan information, and
- security management information.

The debris removal business device acquires forecast information of proximity or a collision between space objects, using the danger alert device included in the space traffic management device,
- acquires orbit information of a space object approaching and orbit information of a space object being approached, using the space information recorder,
- analyzes a time and an in-orbit location at which danger is foreseen, using the danger analysis device, and
- executes a danger avoidance action, using the debris removal satellite.

The debris removal business device acquires information on intrusion by a space object into a danger region, using the danger alert device included in the space traffic management device,
- acquires orbit information of a space object approaching and orbit information of a space object being approached, using the space information recorder,
- analyzes a time and an in-orbit location at which danger is foreseen, using the danger analysis device, and
- performs coordination between business operators involved in avoiding the danger and creates a danger avoidance action implementation plan, using the danger avoidance action assistance device, and
- executes a danger avoidance action, using the debris removal satellite.

In the embodiments above, a mega-constellation satellite business device, a debris removal business device, a ground facility, and so on such as the following have been described.

A mega-constellation satellite business device that is a business device to manage a satellite constellation of 100 or more satellites, and includes
- a space object management unit to manage a satellite group so as to cause a plurality of satellites with the same normal vector and flying at the same orbital altitude to fly while maintaining a relative phase angle that causes the plurality of satellites to be spaced approximately evenly in an orbital plane.

A mega-constellation satellite business device that is a business device to manage a satellite constellation of 100 or more satellites, and includes
- a space object management unit to manage a satellite group so as to cause satellites in orbital planes with different normal vectors to adopt mutually different orbital altitudes.

A mega-constellation satellite business device that is a business device to manage a satellite constellation of 100 or more satellites, and includes
- a satellite constellation forming unit to continue providing a service while avoiding a collision by control of an orbital altitude and control of a passage timing of a satellite group flying in a region where a plurality of orbital planes intersect,
- in a satellite constellation forming system to form a satellite constellation in which a satellite group cooperatively provides a service and which has a plurality of orbital planes in each of which a plurality of satellites fly at the same nominal orbital altitude.

A mega-constellation satellite business device that is a business device to manage a satellite constellation of 100 or more satellites, and includes
- a satellite constellation forming unit to continue providing a service while avoiding a collision by control of an orbit and control of a passage timing of a satellite group after a collision with a space object during orbital descent, a rocket being launched, a satellite during orbital transfer, or debris is foreseen,
- in a satellite constellation forming system to form a satellite constellation in which a satellite group cooperatively provides a service and which has a plurality of orbital planes in each of which a plurality of satellites fly at the same nominal orbital altitude.

A mega-constellation satellite business device that is a business device to manage a satellite constellation of 100 or more satellites, and includes
- a space object management unit to, in a process of causing a satellite in a mega-constellation satellite group to deorbit and make an atmospheric entry, cause the satellite to perform a collision avoidance operation during orbital descent before the satellite intrudes into any one of
- a region in a vicinity of sun-synchronous orbit LST 10:30 and at orbital altitudes of 500 km to 1000 km,
- a region in a vicinity of sun-synchronous orbit LST 13:30 and at orbital altitudes of 500 km to 1000 km,
- a region in a vicinity of sun-synchronous orbit LST 06:00 and at orbital altitudes of 500 km to 1000 km,
- a region in a vicinity of sun-synchronous orbit LST 18:00 and at orbital altitudes of 500 km to 1000 km,
- a region at latitudes of 80 and more degrees north and at orbital altitudes of 500 km to 1000 km, and
- a region at latitudes of 80 and more degrees south and at orbital altitudes of 500 km to 1000 km.

A mega-constellation satellite business device that is a business device to manage a satellite constellation of 100 or more satellites, and includes
- a ground facility that includes a communication device to transmit and receive signals for tracking and controlling a satellite of the satellite constellation, an orbit control command transmission unit to transmit an orbit control command, and an analytical prediction unit to predict an orbit through which the satellite after receiving a deorbit command will pass, and transmits the orbit control command to cause the satellite that has reached an end of design life to deorbit by operating a propulsion device included in the satellite, wherein when it has been determined by the analytical prediction unit that the satellite will pass through an orbital plane of the satellite constellation, the orbit control command transmission unit transmits the orbit control command to perform a collision avoidance operation during orbital descent to avoid a collision risk by shifting a congested orbit passage timing or an orbital plane by raising or lowering an orbital altitude by increasing or decreasing a satellite velocity by an orbit control device included in the satellite, or changing an orbital inclination by applying acceleration in an out-of-plane direction of the orbital plane by a jet from a propulsor in a direction approximately orthogonal to a satellite traveling direction.

A mega-constellation satellite business device that is a business device to manage a satellite constellation of 100 or more satellites, and includes a space traffic management device that is included in a space traffic management system in which space traffic management devices respectively included in business devices of business operators that manage space objects are connected with a communication line, wherein the space traffic management device includes congested region identification information that identifies, as congested regions, a region in a vicinity of sun-synchronous orbit LST 10:30 and at orbital altitudes of 500 km to 1000 km, a region in a vicinity of sun-synchronous orbit LST 13:30 and at orbital altitudes of 500 km to 1000 km, a region in a vicinity of sun-synchronous orbit LST 06:00 and at orbital altitudes of 500 km to 1000 km, a region in a vicinity of sun-synchronous orbit LST 18:00 and at orbital altitudes of 500 km to 1000 km, a region at latitudes of 80 and more degrees north and at orbital altitudes of 500 km to 1000 km, and a region at latitudes of 80 and more degrees south and at orbital altitudes of 500 km to 1000 km, rule information, which is a space traffic management rule indicating a rule that a business operator that manages a satellite flying in any of the congested regions disclose satellite information, and a space object management unit to realize means for exchanging information on a flight safety measure between business operators that manage satellites flying in the same orbital plane, using the congested region identification information and the rule information.

A mega-constellation satellite business device that is a business device to manage a satellite constellation of 100 or more satellites, and includes a space traffic management device that is included in a space traffic management system in which space traffic management devices respectively included in business devices of business operators that manage space objects are connected with a communication line, wherein the space traffic management device includes a space information recorder to record orbit information of a satellite, and also includes all or at least one of space traffic management rule information, a danger analysis device, a danger alert device, a danger avoidance action assistance device, danger avoidance action implementation plan information, and security management information.

A mega-constellation satellite business device that is a business device to manage a satellite constellation of 100 or more satellites, and includes a space traffic management device that is included in a space traffic management system in which space traffic management devices respectively included in business devices of business operators that manage space objects are connected with a communication line, wherein the space traffic management device includes rule information indicating a rule that a plurality of satellites with the same normal vector and flying at the same orbital altitude fly while maintaining a relative phase angle that causes the plurality of satellites to be spaced approximately evenly in an orbital plane, and rule information that satellites in orbital planes with different normal vectors adopt mutually different orbital altitudes.

A mega-constellation satellite business device that is a business device to manage a satellite constellation of 100 or more satellites, and includes a space traffic management device that is included in a space traffic management system in which space traffic management devices respectively included in business devices of business operators that manage space objects are connected with a communication line, wherein the space traffic management device includes rule information that in a process of causing a satellite in a mega-constellation satellite group to deorbit and make an atmospheric entry, the satellite be caused to perform a collision avoidance operation during orbital descent before the satellite intrudes into any one of a region in a vicinity of sun-synchronous orbit LST 10:30 and at orbital altitudes of 500 km to 1000 km, a region in a vicinity of sun-synchronous orbit LST 13:30 and at orbital altitudes of 500 km to 1000 km, a region in a vicinity of sun-synchronous orbit LST 06:00 and at orbital altitudes of 500 km to 1000 km, a region in a vicinity of sun-synchronous orbit LST 18:00 and at orbital altitudes of 500 km to 1000 km, a region at latitudes of 80 and more degrees north and at orbital altitudes of 500 km to 1000 km, and a region at latitudes of 80 and more degrees south and at orbital altitudes of 500 km to 1000 km.

A satellite constellation forming system to form a satellite constellation which is composed of a satellite group, in which the satellite group cooperatively provides a service, and which has a plurality of orbital planes in each of which a plurality of satellites fly at the same orbital altitude, wherein the satellite constellation forming system includes a satellite constellation forming unit to form the satellite constellation in which orbital altitudes of the plurality of orbital planes are mutually different.

A satellite constellation forming method of a satellite constellation forming system to form a satellite constellation which is composed of a satellite group, in which the satellite group cooperatively provides a service, and which has a plurality of orbital planes in each of which a plurality of satellites fly at the same orbital altitude, wherein a satellite constellation forming unit forms the satellite constellation in which orbital altitudes of the plurality of orbital planes are the same, the plurality of orbital planes exist on mutually different planes, a satellite passage time point at which each satellite flying in each of the orbital planes passes an intersection point of orbital planes of the plurality of orbital planes is a multiple of a time point shifting value obtained by dividing a wait time until arrival of a next satellite by the number of orbital planes of the plurality of orbital planes, in the same orbital plane, and no coincidence of the satellite passage time point occurs at any intersection point of any two orbital planes of the plurality of orbital planes.

A debris removal scheme including a capture device or an external force applying device and a propulsion device, which are for changing an orbital plane of an object falling from above an orbital plane in which a satellite is flying before the object passes the orbital plane.

A satellite constellation construction scheme in which the debris removal scheme described is applied to the satellite constellation constructed by the satellite constellation forming system, wherein
 a constituent satellite is added by orbital insertion into an orbital plane close to and different from an orbital plane of a constituent element, and at an orbital altitude different from an orbital altitude of a nearby orbital plane in which a satellite is flying, and then changing the orbital altitude and an angle of revolution of the orbital plane around the axis of Earth by acceleration or deceleration.

A ground facility that includes a communication device to transmit and receive signals for tracking, controlling, and operating a satellite in a satellite constellation, an orbit control command transmission unit to transmit an orbit control command, and an analytical prediction unit to perform analytical prediction on an orbit through which the satellite after receiving a deorbit command will pass, and transmits the orbit control command to deorbit the satellite by operating a propulsion device included in the satellite, wherein
 when it has been determined by the analytical prediction unit that the satellite will pass through an orbital plane of the satellite constellation, the orbit control command transmission unit transmits the orbit control command to perform an active deorbit operation to avoid a collision risk by shifting a congested orbit passage timing or an orbital plane by raising or lowering an orbital altitude by increasing or decreasing a satellite velocity by an orbit control device included in the satellite, or changing an orbital inclination by applying acceleration in an out-of-plane direction of the orbital plane by a jet from a propulsor in a direction approximately orthogonal to a satellite traveling direction.

A ground facility that includes a communication device to transmit and receive signals for tracking, controlling, and operating a debris retrieval satellite including a device to retrieve a satellite that has failed and lost an orbit control function, an orbit control command transmission unit, and an analytical prediction unit to perform analytical prediction on an orbit in which the debris retrieval satellite in a state after capturing the failed satellite will pass, and transmits, to the debris retrieval satellite, a capture command and an orbit control command to cause the failed satellite to deorbit by operating the capture device and a propulsion device included in the debris retrieval satellite, wherein
 when passage through an orbital plane in the vicinity of LST 10:30 of a congested orbit in a sun-synchronous orbit at orbital altitudes of 500 km to 800 km has been found by analytical prediction, the ground facility performs an active deorbit operation to avoid a collision risk by shifting a congested orbit passage timing or an orbital plane by raising or lowering an orbital altitude by increasing or decreasing a satellite velocity by an orbit control device included in the satellite, or changing an orbital inclination by applying acceleration in an out-of-plane direction of the orbital plane by a jet from a propulsor in a direction approximately orthogonal to a satellite traveling direction.

A space traffic management system in which space traffic management devices respectively included in business devices of business operators that each manage a space object are connected with a communication line, wherein
 each of the space traffic management devices includes
 rule information indicating a rule that satellites in orbital planes with different normal vectors adopt mutually different orbital altitudes, and
 a space object management unit to manage the space object in accordance with the rule information.

A space traffic management system in which space traffic management devices respectively included in business devices of business operators that each manage a space object are connected with a communication line, wherein
 each of the space traffic management devices includes
 rule information indicating a rule that a plurality of satellites with the same normal vector and flying at the same orbital altitude fly while maintaining a relative phase angle that causes the plurality of satellites to be spaced approximately evenly in an orbital plane, and
 a space object management unit to manage the space object in accordance with the rule information.

A space traffic management system in which space traffic management devices respectively included in business devices of business operators that manage space objects are connected with a communication line, wherein
 each of the space traffic management devices includes
 a space object management unit to, in a process in which a space object deorbits and makes an atmospheric entry, capture the space object and perform a collision avoidance operation during orbital descent before the space object intrudes into any one of
 a region in a vicinity of sun-synchronous orbit LST 10:30 and at orbital altitudes of 500 km to 1000 km,
 a region in a vicinity of sun-synchronous orbit LST 13:30 and at orbital altitudes of 500 km to 1000 km,
 a region in a vicinity of sun-synchronous orbit LST 06:00 and at orbital altitudes of 500 km to 1000 km,
 a region in a vicinity of sun-synchronous orbit LST 18:00 and at orbital altitudes of 500 km to 1000 km,
 a region at latitudes of 80 and more degrees north and at orbital altitudes of 500 km to 1000 km, and
 a region at latitudes of 80 and more degrees south and at orbital altitudes of 500 km to 1000 km.

A space object management unit that is included in a business device that manages a space object, and in a process in which a space object deorbits and makes an atmospheric entry, captures the space object and performs a collision avoidance operation during orbital descent before the space object intrudes into any one of
 a region in a vicinity of sun-synchronous orbit LST 10:30 and at orbital altitudes of 500 km to 1000 km,
 a region in a vicinity of sun-synchronous orbit LST 13:30 and at orbital altitudes of 500 km to 1000 km,
 a region in a vicinity of sun-synchronous orbit LST 06:00 and at orbital altitudes of 500 km to 1000 km,
 a region in a vicinity of sun-synchronous orbit LST 18:00 and at orbital altitudes of 500 km to 1000 km,
 a region at latitudes of 80 and more degrees north and at orbital altitudes of 500 km to 1000 km, and
 a region at latitudes of 80 and more degrees south and at orbital altitudes of 500 km to 1000 km.

A method of a collision avoidance operation during orbital descent of a space traffic management system in which space traffic management devices respectively included in business devices of business operators that manage space objects are connected with a communication line, wherein
in a process in which a space object deorbits and makes an atmospheric entry, a space object management unit of each of the space traffic management devices captures the space object and performs a collision avoidance operation during orbital descent before the space object intrudes into any one of
a region in a vicinity of sun-synchronous orbit LST 10:30 and at orbital altitudes of 500 km to 1000 km,
a region in a vicinity of sun-synchronous orbit LST 13:30 and at orbital altitudes of 500 km to 1000 km,
a region in a vicinity of sun-synchronous orbit LST 06:00 and at orbital altitudes of 500 km to 1000 km,
a region in a vicinity of sun-synchronous orbit LST 18:00 and at orbital altitudes of 500 km to 1000 km,
a region at latitudes of 80 and more degrees north and at orbital altitudes of 500 km to 1000 km, and
a region at latitudes of 80 and more degrees south and at orbital altitudes of 500 km to 1000 km.

A mega-constellation satellite business device that is a business device that manages a satellite constellation of 100 or more satellites, and manages the satellite constellation forming system.

A mega-constellation satellite business device that is a business device that manages a satellite constellation of 100 or more satellites, and executes the satellite constellation forming method.

A mega-constellation satellite business device that is a business device that manages a satellite constellation of 100 or more satellites, and adopts the satellite constellation construction scheme.

A mega-constellation satellite business device that is a business device that manages a satellite constellation of 100 or more satellites, and includes the ground facility.

A mega-constellation satellite business device that is a business device that manages a satellite constellation of 100 or more satellites, and includes a space traffic management device that is included in the space traffic management system.

A constellation satellite business device that is a business device that manages a satellite constellation of 10 or more satellites, and includes the ground facility.

A constellation satellite business device that is a business device that manages a satellite constellation of 10 or more satellites, and includes a space traffic management device that is included in the space traffic management system.

A satellite business device that is a business device that manages less than 10 satellites, and includes the ground facility.

A satellite business device that is a business device that manages less than 10 satellites, and includes a space traffic management device that is included in the space traffic management system.

A satellite business device that is
a mega-constellation satellite business device that is a business device that manages a satellite constellation of 100 or more satellites,
a constellation satellite business device that is a business device that manages a satellite constellation of 10 or more satellites, or
a satellite business device that is a business device that manages a satellite constellation of less than 10 satellites, and
adopts the method of the collision avoidance operation during orbital descent.

A debris removal business device that is a business device of a debris removal satellite including means for capturing a space object, and adopts the debris removal scheme.

A debris removal business device that is a business device of a debris removal satellite including means for capturing a space object, and includes the ground facility.

A debris removal business device that is a business device of a debris removal satellite including means for capturing a space object, and includes a space traffic management device that is included in the space traffic management system.

A debris removal business device that is a business device of a debris removal satellite including means for capturing a space object, and includes the space object management unit.

A debris removal business device that is a business device of a debris removal satellite including means for capturing a space object, and adopts the method of the collision avoidance operation during orbital descent.

An SSA business device that is a business device with which an SSA business operator manages space object information, and includes a space traffic management device that is included in the space traffic management system.

A space object business device that is a business device that manages information on a space object excluding a satellite or a rocket and including a space station, a space transport vehicle, or a spacecraft, and adopts the method of the collision avoidance operation during orbital descent.

A space traffic business device that manages space traffic, includes a control device of a space plane or a collision avoidance assistance device, and includes a space traffic management device that is included in the space traffic management system.

Embodiment 13

In this embodiment, additions to or differences from Embodiments 1 to 12 will be mainly described. Components that are substantially the same as those in Embodiments 1 to 12 are denoted by the same reference signs, and description thereof may be omitted.

Based on FIGS. 36 to 47, an arrangement for observing a space object 110 will be described.

Description of Configurations

Based on FIG. 36, a configuration of an observation system 100 will be described.

The observation system 100 is a system for observing the space object 110.

"Observation" includes concepts such as "monitoring" and "capturing images".

The space object 110 is an object that is present in space. A specific example of the space object 110 is space debris.

The space object 110 flies in a geostationary orbit 103 and orbits Earth 101.

The observation system 100 includes an observation satellite 200.

The observation satellite 200 is an artificial satellite that orbits the Earth 101.

The observation satellite 200 flies in the geostationary orbit 103 or the vicinity of the geostationary orbit 103 and orbits the Earth 101.

The observation satellite 200 optically captures images of the space object 110 from an altitude different from the altitude at which the space object 110 is located.

The altitude of the geostationary orbit 103 is about 36000 kilometers.

An artificial satellite called a geostationary satellite orbits in the geostationary orbit 103 in synchronization with the rotation of the Earth 101. That is, the geostationary satellite makes one orbit in the geostationary orbit 103 per day. In other words, the geostationary satellite makes one orbit in the geostationary orbit 103 in 24 hours.

The space object 110 makes one orbit in the geostationary orbit 103 per day, like the geostationary satellite.

The observation satellite 200 makes one orbit in the geostationary orbit 103 or the vicinity of the geostationary orbit 103 per day.

The orbiting direction of each of the space object 110 and the observation satellite 200 is the same as the orbiting direction of the geostationary satellite.

The light from the sun 102 will be referred to as sunlight.

A side of the Earth 101 that is exposed to the sunlight will be referred to as a front side of the Earth 101.

A side of the Earth 101 that is not exposed to the sunlight will be referred to as a back side of the Earth 101.

Figure 36:
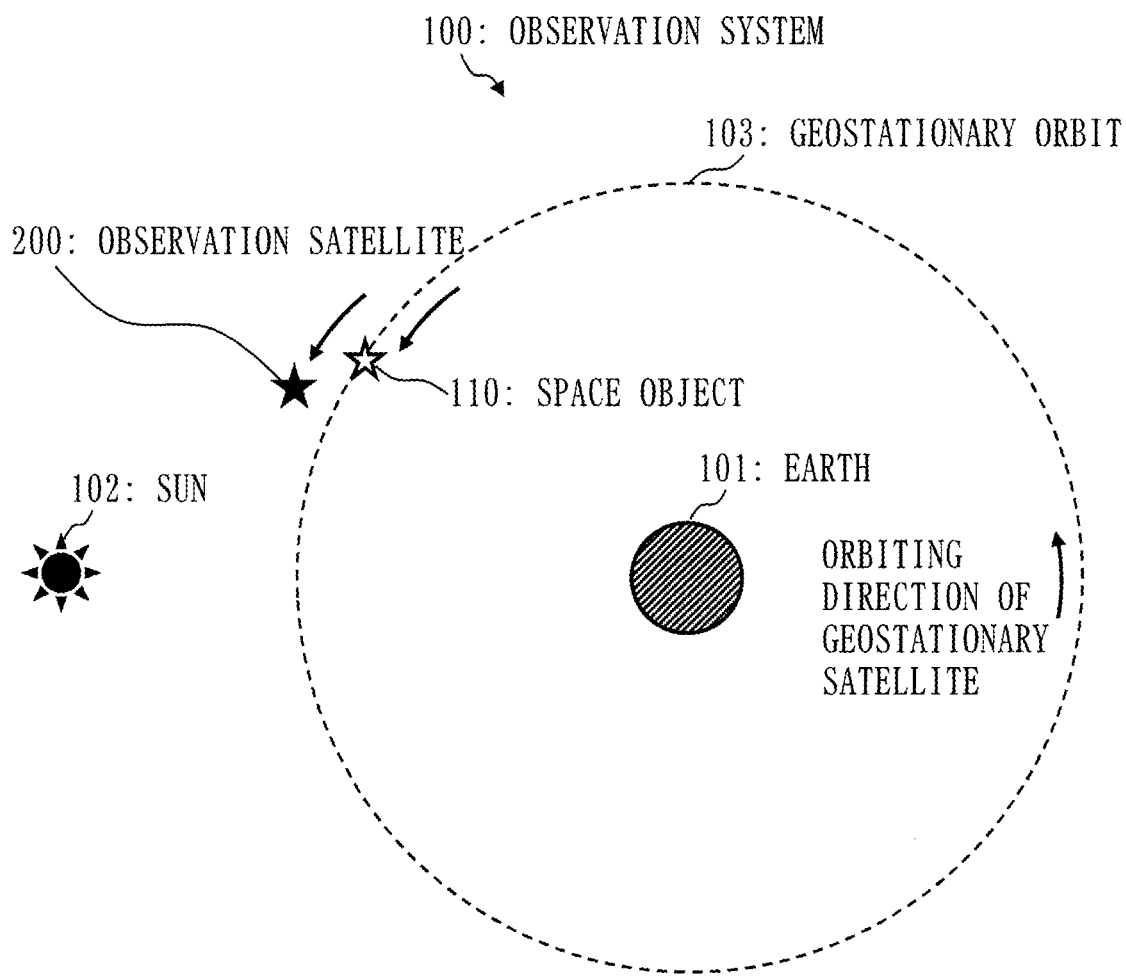
FIG. 36 is a diagram illustrating a configuration of an observation system 100 in Embodiment 13.

In FIG. 36, each of the space object 110 and the observation satellite 200 is orbiting the front side of the Earth 101.

Figure 37:
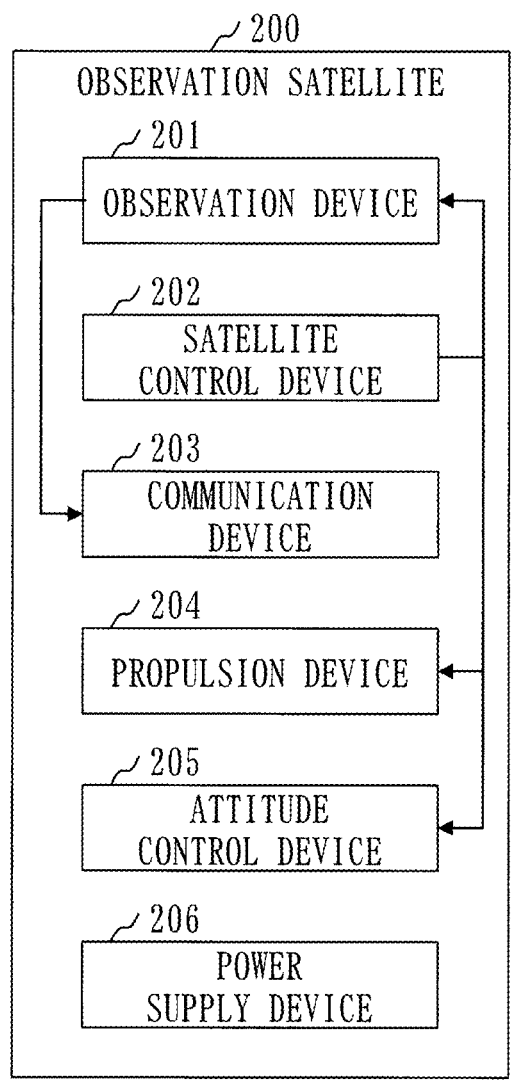
FIG. 37 is a configuration diagram of an observation satellite 200 in Embodiment 13.
Figure 38:
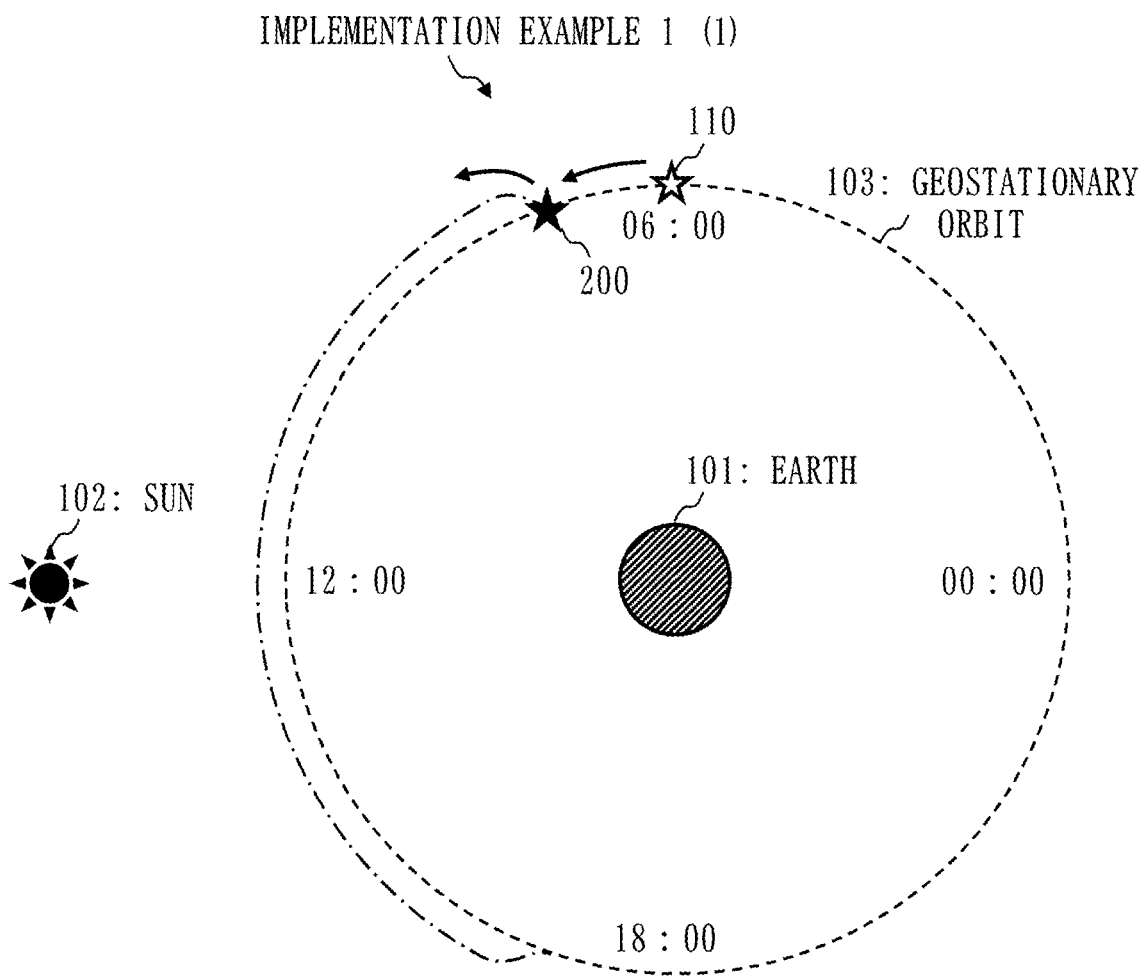
FIG. 38 is a diagram illustrating Implementation Example 1 (1) of an observation method in Embodiment 13.
Figure 39:
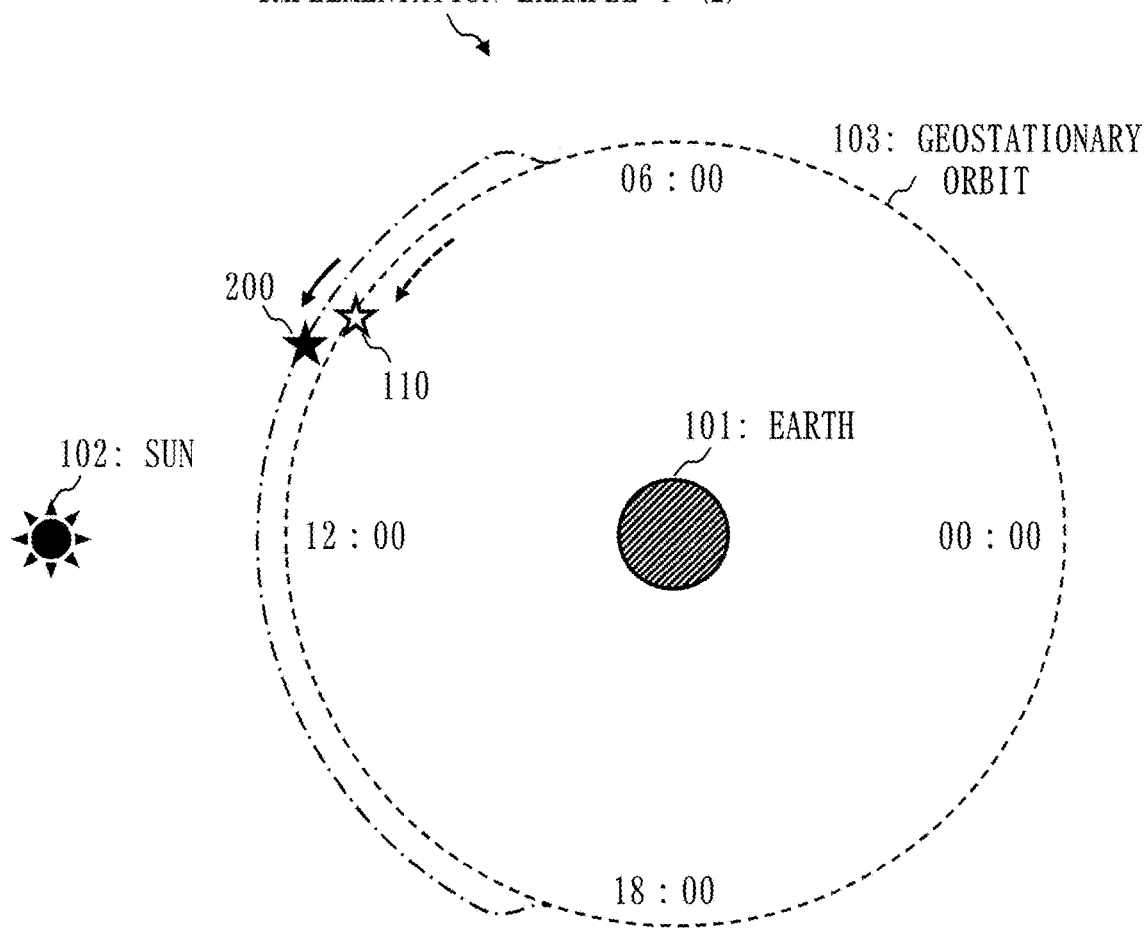
FIG. 39 is a diagram illustrating Implementation Example 1 (2) of the observation method in Embodiment 13.

Based on FIG. 37, a configuration of the observation satellite 200 will be described.

The observation satellite 200 includes an observation device 201, a satellite control device 202, a communication device 203, a propulsion device 204, an attitude control device 205, and a power supply device 206.

The observation device 201 is a device for observing the space object 110.

The observation device 201 optically captures images of the space object 110 flying at an altitude different from the orbital altitude of the observation satellite 200.

Specifically, the observation device 201 is a visible optical sensor.

The observation device 201 generates observation data. The observation data is data obtained by observation performed by the observation device 201. For example, the observation data is equivalent to data representing an image in which the space object 110 is captured.

The satellite control device 202 is a computer that controls the observation satellite 200.

The satellite control device 202 controls the observation device 201, the propulsion device 204, and the attitude control device 205 in accordance with a prescribed procedure or various commands transmitted from a ground facility.

The communication device 203 is a device that communicates with the ground facility.

The communication device 203 transmits the observation data to the ground facility. The communication device 203 receives various commands transmitted from the ground facility.

The propulsion device 204 is a device that provides thrust to the observation satellite 200 and changes the velocity of the observation satellite 200.

Specifically, the propulsion device 204 is an electric propulsion device. For example, the propulsion device 204 is an ion engine or a Hall thruster.

The attitude control device 205 is a device to control attitude elements of the observation satellite 200.

The attitude control device 205 changes the attitude elements of the observation satellite 200 in a desired orientation. Alternatively, the attitude control device 205 maintains the attitude elements of the observation satellite 200 in a desired orientation.

Specifically, the attitude elements of the observation satellite 200 are the attitude of the observation satellite 200, the angular velocity of the observation satellite 200, and the line of sight of the observation device 201.

The attitude control device 205 includes an attitude sensor, an actuator, and a controller. The attitude sensor is a gyroscope, an Earth sensor, a sun sensor, a star tracker, a thruster, a magnetic sensor, or the like. The actuator is an attitude control thruster, a momentum wheel, a reaction wheel, a control moment gyroscope, or the like. The controller controls the actuator by executing a control program based on measurement data obtained by the attitude sensor or in accordance with a control command from the ground facility.

The power supply device 206 includes a solar cell, a battery, an electric control device, and the like and provides electric power to each device of the observation satellite 200.

The satellite control device 202 will be described supplementarily.

The satellite control device 202 includes a processing circuit.

The processing circuit may be dedicated hardware, or may be a processor that executes programs stored in a memory. The processing circuit functions as an observation control unit that controls the propulsion device 204.

In the processing circuit, some functions may be realized by hardware, and the remaining functions may be realized by software or firmware. That is, the processing circuit can be realized by hardware, software, firmware, or a combination of these.

The dedicated hardware is, for example, a single circuit, a composite circuit, a programmed processor, a parallel-programmed processor, an ASIC, an FPGA, or a combination of these.

ASIC is an abbreviation for Application Specific Integrated Circuit.

FPGA is an abbreviation for Field Programmable Gate Array.

A pointing function of the observation satellite 200 will be described supplementarily.

The observation satellite 200 has the pointing function to direct an observation direction to the space object 110.

For example, the observation satellite 200 includes a reaction wheel. The reaction wheel is a device to control the attitude of the observation satellite 200. The attitude of the observation satellite 200 is controlled by the reaction wheel and body pointing is realized.

For example, the observation device 201 includes a pointing mechanism. The pointing mechanism is a mechanism to change the line of sight of the observation device 201. For example, a drive mirror or the like is used for the pointing mechanism.

An observation function of the observation device 201 will be described supplementarily.

The observation device 201 has a variable resolution function and an autofocus function.

The variable resolution function is a function of changing the resolution during observation.

The autofocus function is a function of focusing on the space object 110.

Description of Operation

Operation of the observation system 100, in particular, operation of the observation satellite 200 is equivalent to an observation method.

An outline of the observation method will be described.

The propulsion device 204 changes the flight speed of the observation satellite 200 after the observation satellite 200 starts to orbit one side of the front side of the Earth 101 and the back side of the Earth 101. This changes the orbital altitude of the observation satellite 200 from the altitude of the geostationary orbit 103.

The propulsion device 204 changes the flight speed of the observation satellite 200 before the observation satellite 200 starts to orbit the other side of the front side of the Earth 101 and the back side of the Earth 101. This restores the orbital altitude of the observation satellite 200 to the altitude of the geostationary orbit 103.

The observation device 201 optically captures images of the space object 110 flying at an altitude different from the orbital altitude of the observation satellite 200.

Based on FIGS. 38 to 47, the observation method will be described.

Four time points "00:00", "06:00", "12:00", and "18:00" indicated in the geostationary orbit 103 indicate time points in a specific region (for example, Japan) of the Earth 101.

The observation satellite 200 orbits the front side of the Earth 101 during daytime hours (06:00 to 18:00) in the specific region. That is, the observation satellite 200 starts orbiting the front side of the Earth 101 around 6:00 and finishes orbiting the front side of the Earth 101 around 18:00.

The observation satellite 200 orbits the back side of the Earth 101 during night-time hours (18:00 to 06:00) in the specific region. That is, the observation satellite 200 starts orbiting the back side of the Earth 101 around 18:00 and finishes orbiting the back side of the Earth 101 around 06:00.

Implementation Example 1

Based on FIGS. 38 to 42, Implementation Example 1 will be described.

Implementation Example 1 is an implementation example in which the observation satellite 200 orbits the front side of the Earth 101.

After the observation satellite 200 has started orbiting the front side of the Earth 101, the propulsion device 204 increases the flight speed of the observation satellite 200.

Specifically, the satellite control device 202 determines whether the observation satellite 200 has started orbiting the front side of the Earth 101. For example, the satellite control device 202 makes a determination by referring to the time point. If the observation satellite 200 has started orbiting the front side of the Earth 101, the satellite control device 202 instructs the propulsion device 204 to accelerate. Then, the propulsion device 204 increases the flight speed of the observation satellite 200.

As a result, the orbital altitude of the observation satellite 200 rises from the altitude of the geostationary orbit 103.

As the orbital altitude of the observation satellite 200 rises from the altitude of the geostationary orbit 103, the ground speed of the observation satellite 200 decreases.

That is, the ground speed of the observation satellite 200 becomes slower than the ground speed of the space object 110.

Figure 40:
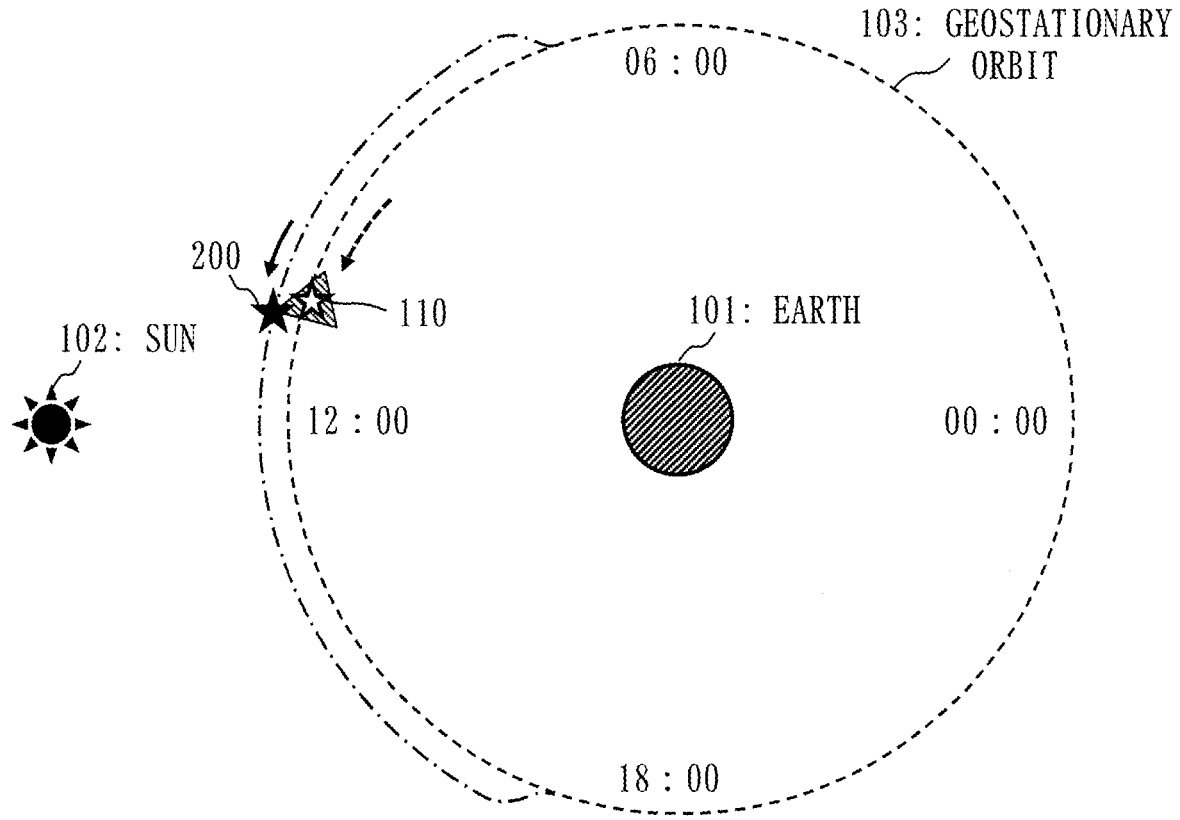
FIG. 40 is a diagram illustrating Implementation Example 1 (3) of the observation method in Embodiment 13.

FIG. 40 illustrates a situation where the space object 110 that has caught up with the observation satellite 200 is imaged from the observation satellite 200.

Figure 41:
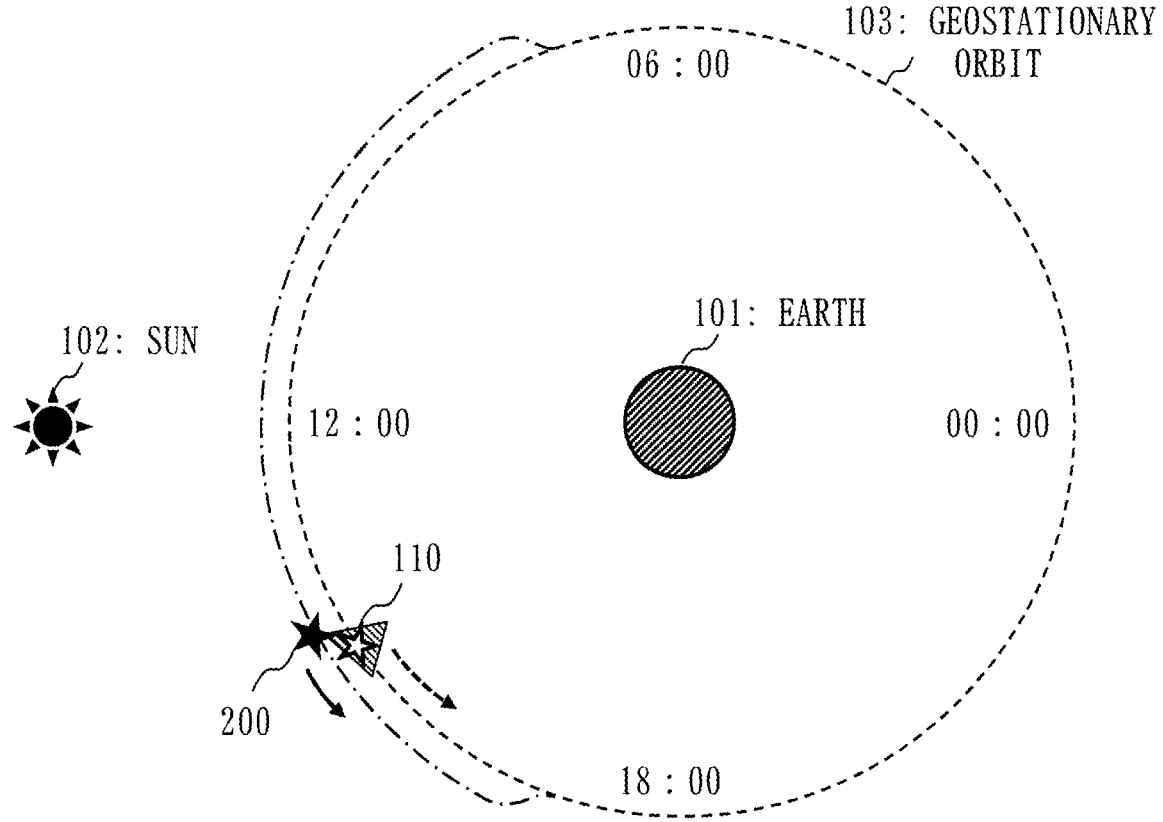
FIG. 41 is a diagram illustrating Implementation Example 1 (4) of the observation method in Embodiment 13.
Figure 42:
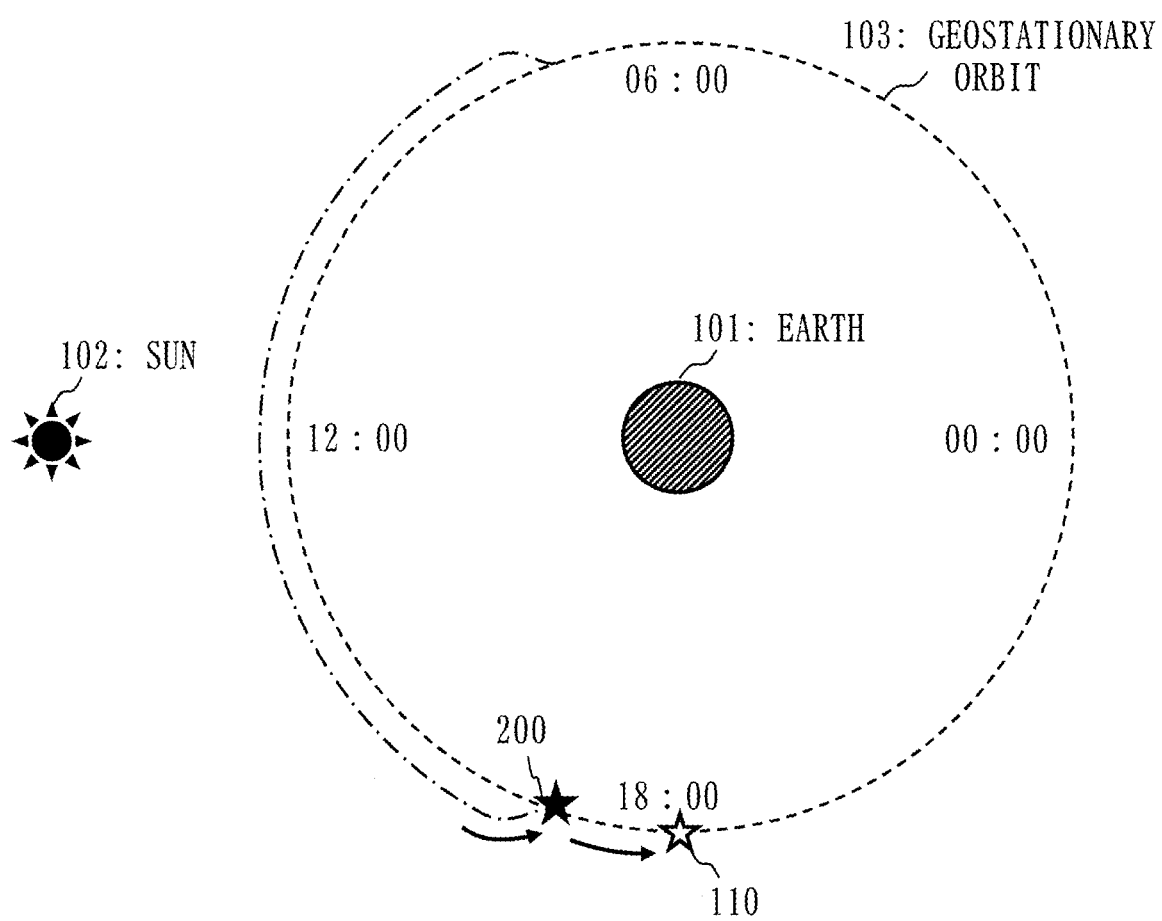
FIG. 42 is a diagram illustrating Implementation Example 1 (5) of the observation method in Embodiment 13.
Figure 43:
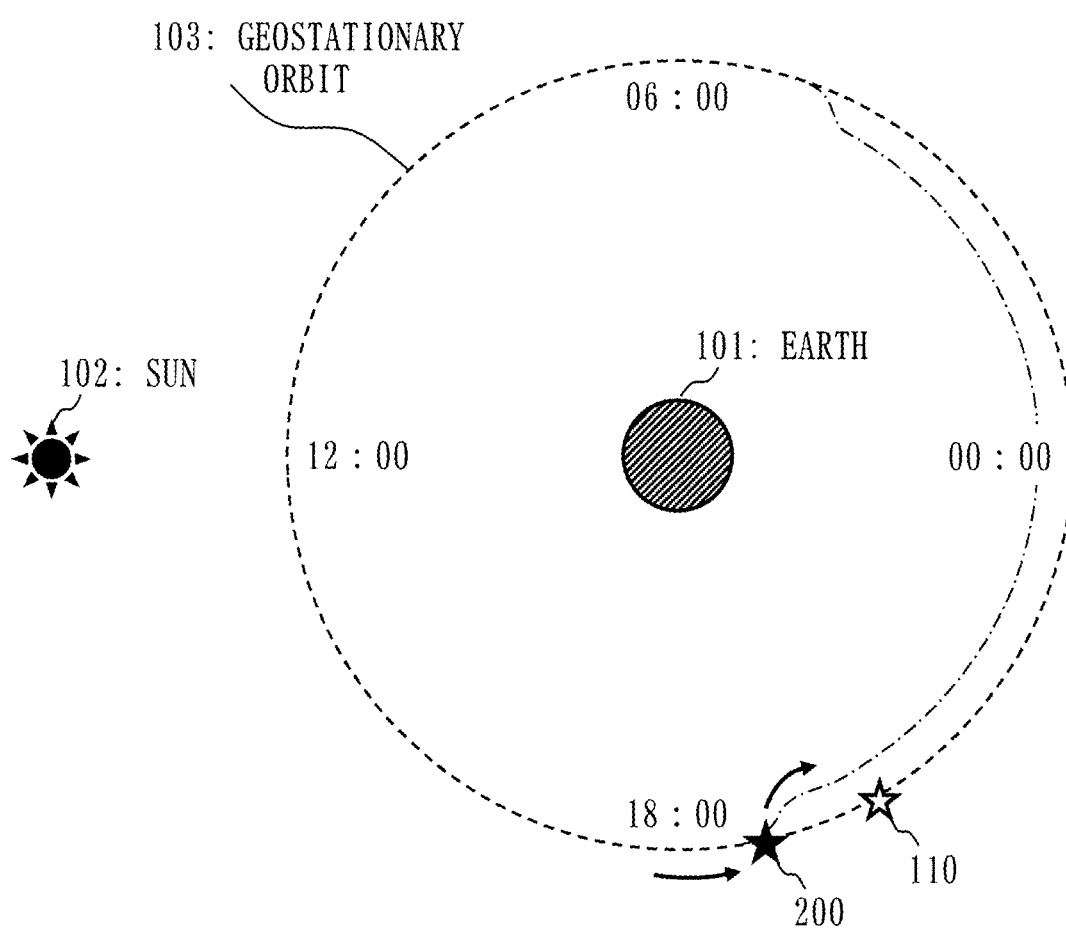
FIG. 43 is a diagram illustrating Implementation Example 2 (1) of the observation method in Embodiment 13.
Figure 44:
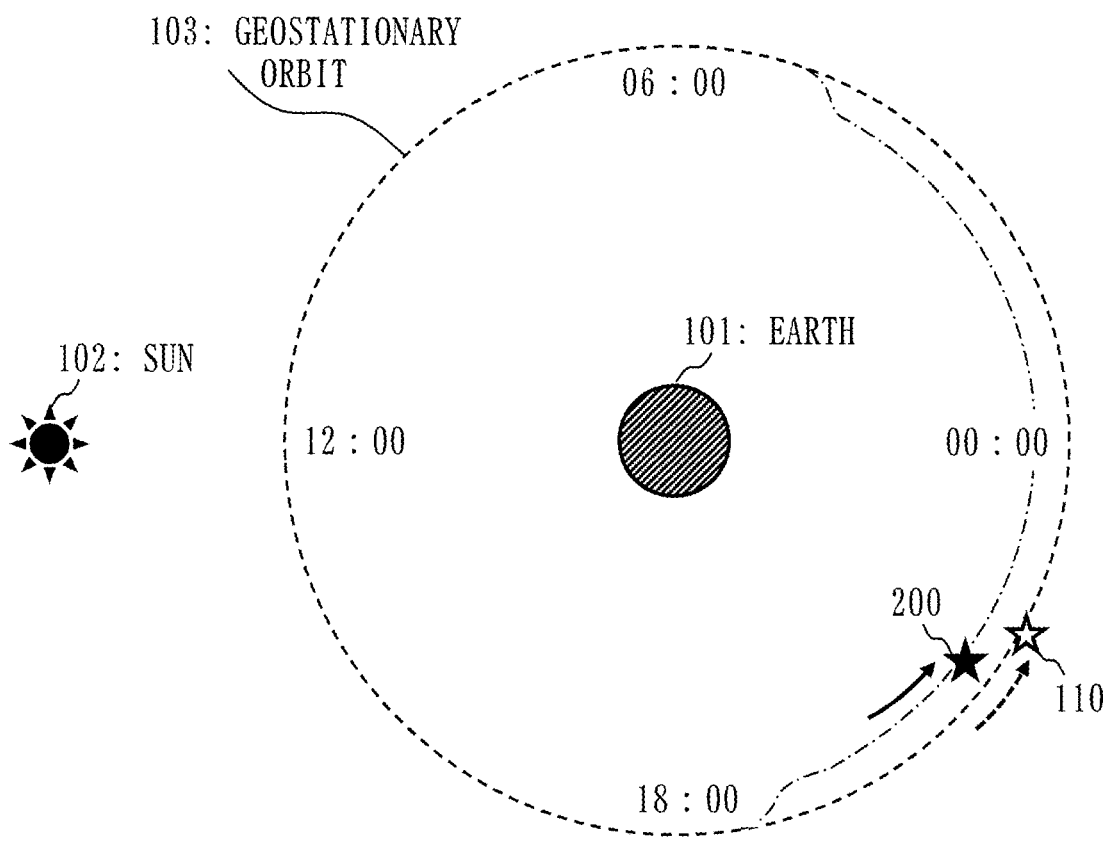
FIG. 44 is a diagram illustrating Implementation Example 2 (2) of the observation method in Embodiment 13.

FIG. 41 illustrates a situation where the space object 110 that has overtaken the observation satellite 200 is imaged from the observation satellite 200.

While the observation satellite 200 is orbiting the front side of the Earth 101, the observation device 201 captures images of the space object 110 flying at an altitude lower than the orbital altitude of the observation satellite 200. With this arrangement, the observation device 201 captures images of the space object 110 in front light.

Specifically, while the observation satellite 200 is orbiting the front side of the Earth 101, the observation device 201 captures images in a direction toward the Earth 101. With this arrangement, the observation device 201 captures images of the space object 110 that overtakes the observation satellite 200 while flying in the geostationary orbit 103.

Before the observation satellite 200 starts orbiting the back side of the Earth 101, the propulsion device 204 decreases the flight speed of the observation satellite 200.

Specifically, the satellite control device 202 determines whether the observation satellite 200 is going to start orbiting the back side of the Earth 101. For example, the satellite control device 202 makes a determination by referring to the time point. The satellite control device 202 instructs the propulsion device 204 to decelerate before the observation satellite 200 starts orbiting the back side of the Earth 101. Then, the propulsion device 204 decreases the flight speed of the observation satellite 200.

As a result, the orbital altitude of the observation satellite 200 drops to the altitude of the geostationary orbit 103.

Implementation Example 2

Based on FIGS. 43 to 47, Implementation Example 2 will be described.

Implementation Example 2 is an implementation example in which the observation satellite 200 orbits the back side of the Earth 101.

The propulsion device 204 decreases the flight speed of the observation satellite 200 after the observation satellite 200 has started orbiting the back side of the Earth 101.

Specifically, the satellite control device 202 determines whether the observation satellite 200 has started orbiting the back side of the Earth 101. For example, the satellite control device 202 makes a determination by referring to the time point. If the observation satellite 200 has started orbiting the back side of the Earth 101, the satellite control device 202 instructs the propulsion device 204 to decelerate. Then, the propulsion device 204 decreases the flight speed of the observation satellite 200.

As a result, the orbital altitude of the observation satellite 200 drops from the altitude of the geostationary orbit 103.

As the orbital altitude of the observation satellite 200 drops from the altitude of the geostationary orbit 103, the ground speed of the observation satellite 200 increases.

That is, the ground speed of the observation satellite 200 becomes faster than the ground speed of the space object 110.

Figure 45:
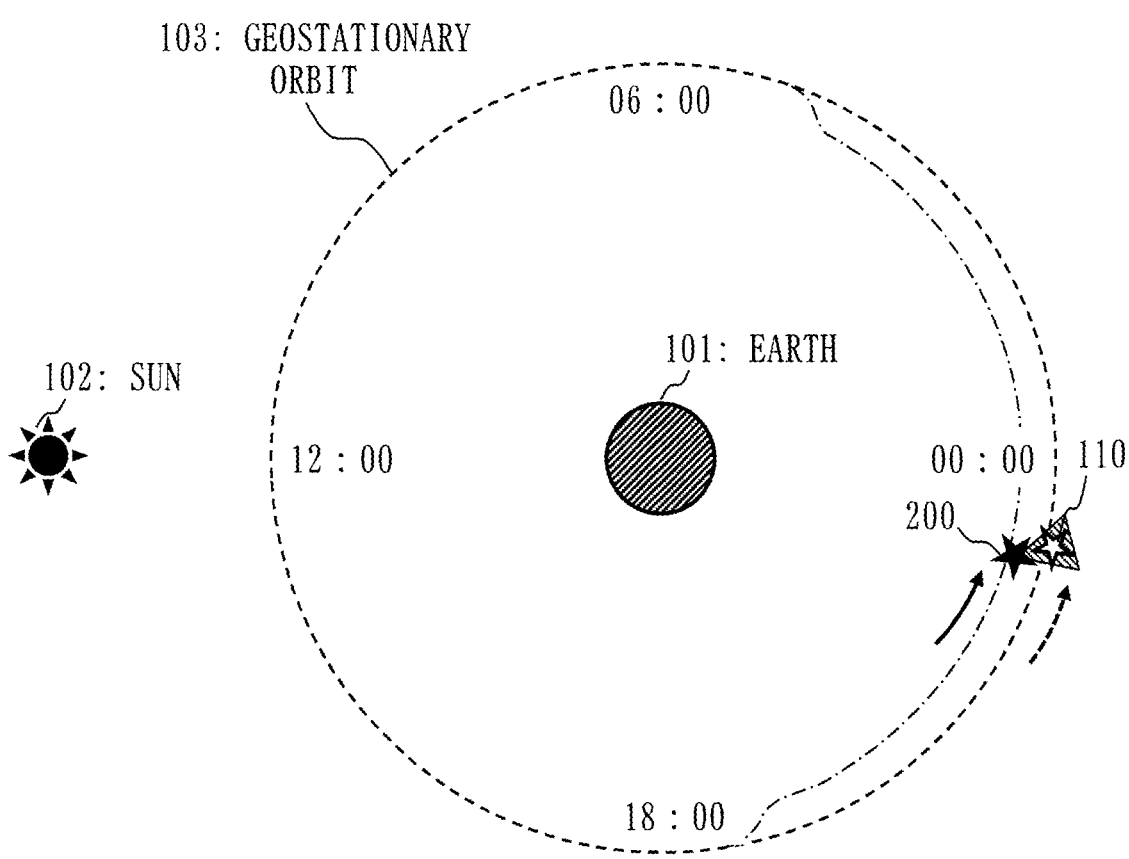
FIG. 45 is a diagram illustrating Implementation Example 2 (3) of the observation method in Embodiment 13.

FIG. 45 illustrates a situation where the space object 110 that has been caught up by the observation satellite 200 is imaged from the observation satellite 200.

Figure 46:
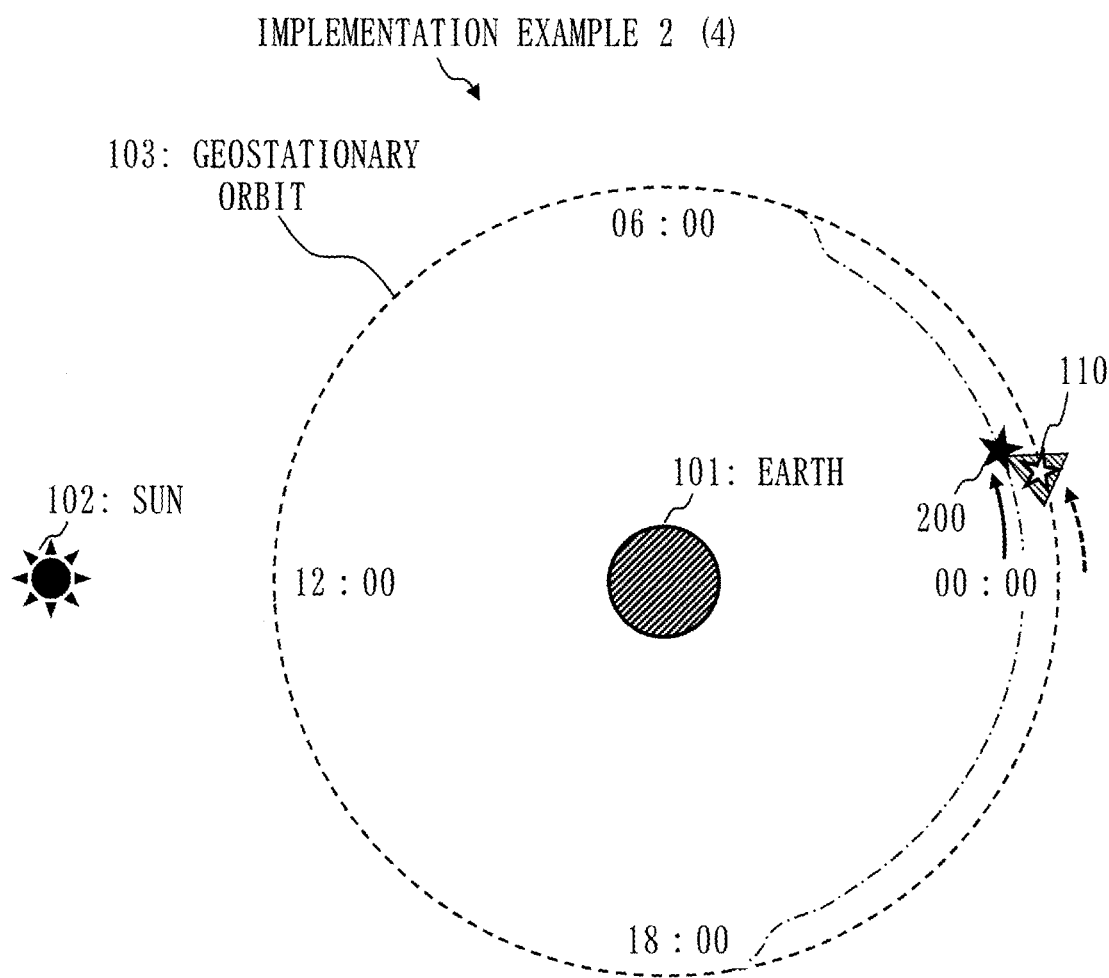
FIG. 46 is a diagram illustrating Implementation Example 2 (4) of the observation method in Embodiment 13.
Figure 47:
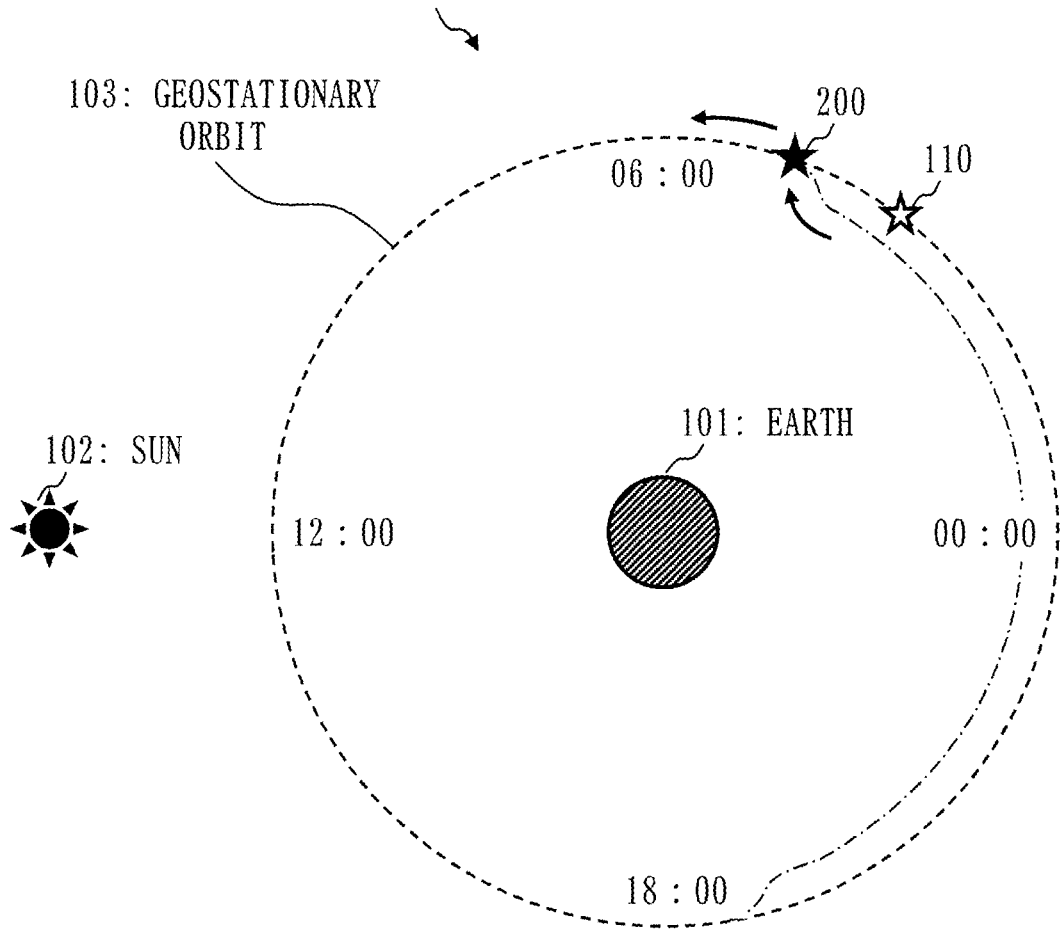
FIG. 47 is a diagram illustrating Implementation Example 2 (5) of the observation method in Embodiment 13.

FIG. 46 illustrates a situation where the space object 110 that has been overtaken by the observation satellite 200 is imaged from the observation satellite 200.

While the observation satellite 200 is orbiting the back side of the Earth 101, the observation device 201 captures images of the space object 110 flying at an altitude higher than the orbital altitude of the observation satellite 200. With this arrangement, the observation device 201 captures images of the space object 110 in front light.

Specifically, while the observation satellite 200 is orbiting the back side of the Earth 101, the observation device 201 captures images of the side opposite to the side facing the Earth 101. With this arrangement, the observation device 201 captures images of the space object 110 that is overtaken by the observation satellite 200 while flying in the geostationary orbit 103.

The propulsion device 204 increases the flight speed of the observation satellite 200 before the observation satellite 200 starts orbiting the front side of the Earth 101.

Specifically, the satellite control device 202 determines whether the observation satellite 200 is going to start orbiting the front side of the Earth 101. For example, the satellite control device 202 makes a determination by referring to the time point. The satellite control device 202 instructs the propulsion device 204 to accelerate before the observation satellite 200 starts orbiting the front side of the Earth 101. Then, the propulsion device 204 increases the flight speed of the observation satellite 200.

As a result, the orbital altitude of the observation satellite 200 rises to the altitude of the geostationary orbit 103.

Effects of Embodiment

The observation satellite 200 flies in the geostationary orbit 103 or the vicinity of the geostationary orbit 103.

The observation satellite 200 accelerates to raise the orbital altitude after 06:00. Then, the observation satellite 200 captures images of the space object 110 that flies in the geostationary orbit 103 and overtakes the observation satellite 200. The observation satellite 200 decelerates to lower the orbital altitude before 18:00.

When the observation satellite 200 accelerates, the orbital altitude of the observation satellite 200 rises. When the orbital altitude of the observation satellite 200 rises, the ground speed of the observation satellite 200 decreases. Therefore, the observation satellite 200 is overtaken by the space object 110 flying in the geostationary orbit 103.

The observation satellite 200 flies at an orbital altitude higher than the altitude of the geostationary orbit 103 after 06:00 and before 18:00. The observation satellite 200 receives reflected sunlight from the space object 110 flying in the geostationary orbit 103. This allows the observation satellite 200 to observe the space object 110 under suitable conditions.

The observation satellite 200 decelerates to lower the orbital altitude after 18:00. The observation satellite 200 captures images of the space object 110 that flies in the geostationary orbit 103 and is overtaken by the observation satellite 200. The observation satellite 200 accelerates to raise the orbital altitude before 06:00 of the following day.

When the observation satellite 200 decelerates, the orbital altitude of the observation satellite 200 drops. When the orbital altitude of the observation satellite 200 becomes lower, the ground speed of the observation satellite 200 increases. Therefore, the observation satellite 200 overtakes the space object 110 flying in the geostationary orbit 103.

The observation satellite 200 flies at an orbital altitude lower than the altitude of the geostationary orbit 103 after 18:00 and before 06:00 of the following day. The observation satellite 200 receives reflected sunlight from the space object 110 flying in the geostationary orbit 103. This allows the observation satellite 200 to observe the space object 110 under suitable conditions.

Supplement to Embodiment

The observation satellite 200 may fly in an orbit or the vicinity of an orbit other than the geostationary orbit 103.

The space object 110 may fly in an orbit other than the geostationary orbit 103. The space object 110 may fly in an orbit other than a geocentric orbit.

Based on Embodiments 1 to 13 above, SSA business devices such as the following can be realized.

An SSA business device that is a business device with which an SSA business operator that acquires space object information using a monitoring device manages the space object information, and includes
 a monitoring device that flies in a vicinity of a geostationary orbit, wherein
 while the monitoring device moves eastward with respect to a space object, the monitoring device is operated in the sky on a back side of Earth, which is a side not exposed to sunlight, during a period from local sun time (LST) 18:00 to LST 06:00 of following morning.

An SSA business device that is a business device with which an SSA business operator that acquires space object information using a monitoring device manages the space object information, and includes
 a monitoring device that flies in a vicinity of a geostationary orbit, wherein
 while the monitoring device moves westward with respect to a space object, the monitoring device is operated in the sky on a front side of Earth, which is a side exposed to sunlight, during a period from local sun time (LST) 06:00 to LST 18:00.

An SSA business device that is a business device with which an SSA business operator that acquires space object information using a monitoring device manages the space object information, and includes
 a monitoring device that flies in a vicinity of a geostationary orbit, and
 a ground facility that performs orbit control and monitoring control of the monitoring device, wherein
 the monitoring device is operated, while moving eastward with respect to a space object, in the sky on a back side of Earth, which is a side not exposed to sunlight, during a period from local sun time (LST) 18:00 to LST 06:00 of following morning,
 the monitoring device is operated, while moving westward with respect to the space object, in the sky on a front side of Earth, which is a side exposed to sunlight, during a period from local sun time (LST) 06:00 to LST 18:00, and
 an average orbit period of the monitoring device is adjusted.

An SSA business device that is a business device with which an SSA business operator that acquires space object information using a monitoring device manages the space object information, and includes
 a monitoring device that flies in a vicinity of a geostationary orbit, and
 a ground facility that performs orbit control and monitoring control of the monitoring device, wherein the monitoring device is operated, while moving eastward with respect to a space object, in the sky on a back side of Earth, which is a side not exposed to sunlight, during a period from local sun time (LST) 18:00 to LST 06:00 of following morning, the monitoring device is operated, while moving westward with respect to the space object, in the sky on a front side of Earth, which is a side exposed to sunlight, during a period from local sun time (LST) 06:00 to LST 18:00, and an average relative position with respect to the ground facility is maintained.

An SSA business device that is a business device with which an SSA business operator that acquires space object information using a monitoring device manages the space object information, and includes a monitoring device that includes a communication device and flies in a vicinity of a geostationary orbit, a geostationary satellite that includes a communication device, and a ground facility that communicates with the geostationary satellite, wherein the SSA business device transmits, to the monitoring device via the geostationary satellite, a command to perform orbit control and monitoring control of the monitoring device, and the ground facility receives, via the geostationary satellite, monitoring data acquired by the monitoring device.

The SSA business device, wherein an antenna of the communication device included in the geostationary satellite that communicates with the communication device included in the monitoring device is a non-directional antenna or a fixed antenna without a drive mechanism.

The ground facility that is included in the SSA business device, transmits a command to the monitoring device via a communication satellite, and receives, via the communication satellite, monitoring data acquired by the monitoring device.

Embodiment 14

In this embodiment, additions to or differences from Embodiments 1 to 12 will be mainly described. Components that are substantially the same as those in Embodiments 1 to 12 are denoted by the same reference signs, and description thereof may be omitted.

Description of Configuration

Figure 48:
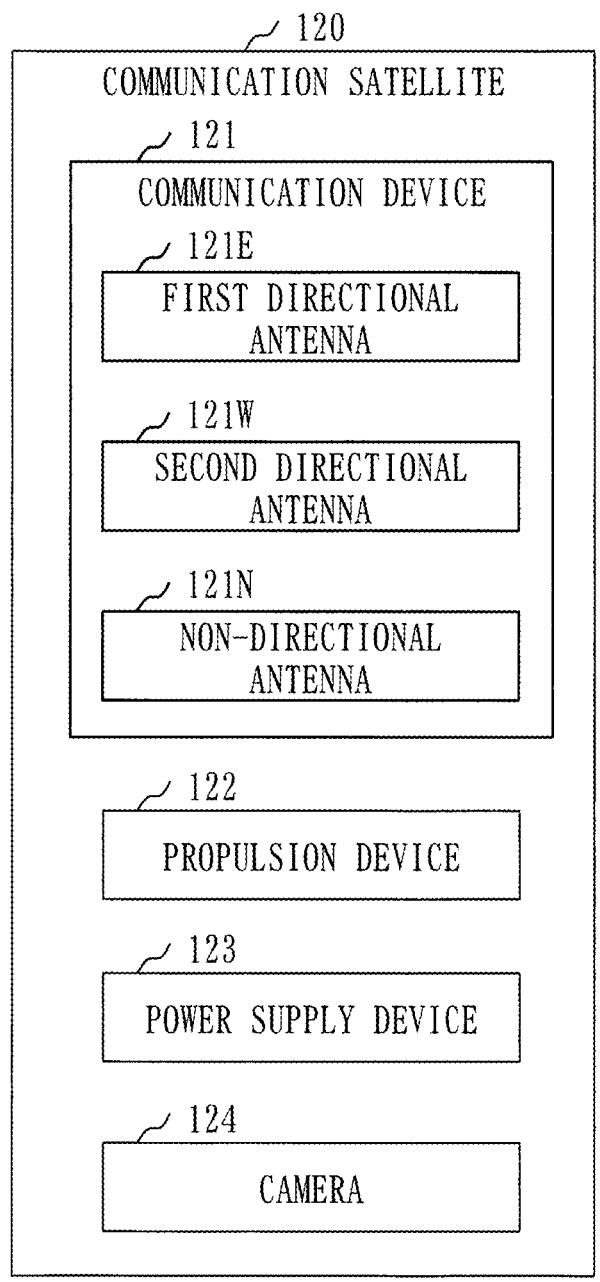
FIG. 48 is a configuration diagram of a communication satellite 120 in Embodiment 14.

Based on FIG. 48, a configuration of a communication satellite 120 will be described.

The communication satellite 120 includes a camera 124.

The camera 124 is a wide-angle camera that is directed in the same direction as the pointing direction of a first directional antenna 121E or a second directional antenna 121W.

The communication satellite 120 can visually recognize an observation satellite 110 and other space objects flying in the geostationary orbit 103 or an orbit in the vicinity of the geostationary orbit 103. Therefore, it is possible to visually confirm that the surroundings of the communication satellite 120 are an environment free from communication interference and noise.

Other space objects are space objects different from a space object 109 that is observed by the observation satellite 110.

The communication satellite 120 includes the camera 124.

Note that the camera 124 is a camera with a fisheye lens. The camera 124 is arranged so that the direction from the communication satellite 120 to the Earth 101 is a line-of-sight vector.

With the camera 124 equipped with the fisheye lens, image information in an elevation direction can be obtained in a line-of-sight direction of 360 degrees around the line-of-sight vector.

By arranging the camera 124 so that the direction from the communication satellite 120 to the Earth 101 is the line-of-sight vector, the observation satellite 110 and other space objects flying in the geostationary orbit 103 or an orbit in the vicinity of the geostationary orbit 103 can be visually recognized. Furthermore, locations of other space objects in the orbit can be estimated. Therefore, it is possible to visually confirm that the surroundings of the communication satellite 120 are an environment free from communication interference and noise.

Figure 49:
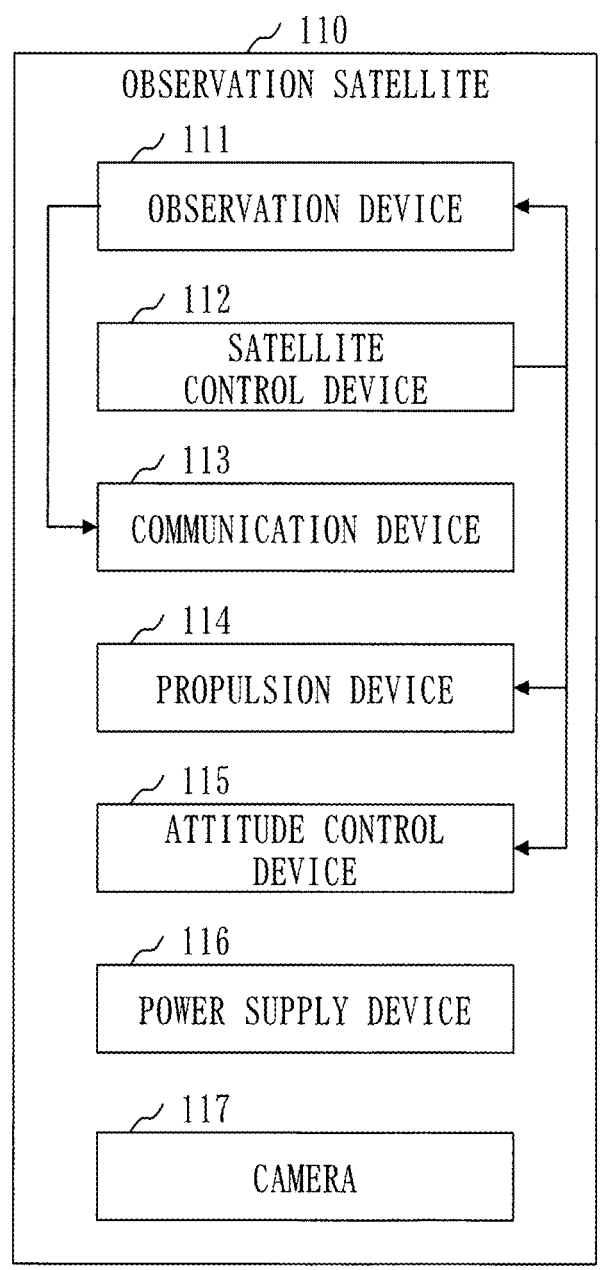
FIG. 49 is a configuration diagram of an observation satellite 110 in Embodiment 14.

Based on FIG. 49, a configuration of the observation satellite 110 will be described.

The observation satellite 110 further includes a camera 117.

The camera 117 is a wide-angle camera that is directed to the communication satellite 120.

The camera 117 can visually recognize the communication satellite 120 and other space objects flying in the geostationary orbit 103 or an orbit in the vicinity of the geostationary orbit 103. Therefore, it is possible to visually confirm that the surroundings of the observation satellite 110 are an environment free from communication interference and noise.

The observation satellite 110 includes the camera 117.

Note that the camera 117 is a camera with a fisheye lens. The camera 117 is arranged so that the direction from the observation satellite 110 to the communication satellite 120 is a line-of-sight vector.

With the camera 117 equipped with the fisheye lens, image information in an elevation direction can be obtained in a line-of-sight direction of 360 degrees around the line-of-sight vector.

By arranging the camera 117 so that the direction from the observation satellite 110 to the communication satellite 120 is the line-of-sight vector, the communication satellite 120 and other space objects flying in the geostationary orbit 103 or an orbit in the vicinity of the geostationary orbit 103 can be visually recognized. Furthermore, locations of other space objects in the orbit can be estimated. Therefore, it is possible to visually confirm that the surroundings of the observation satellite 110 are an environment free from communication interference and noise.

Figure 50:
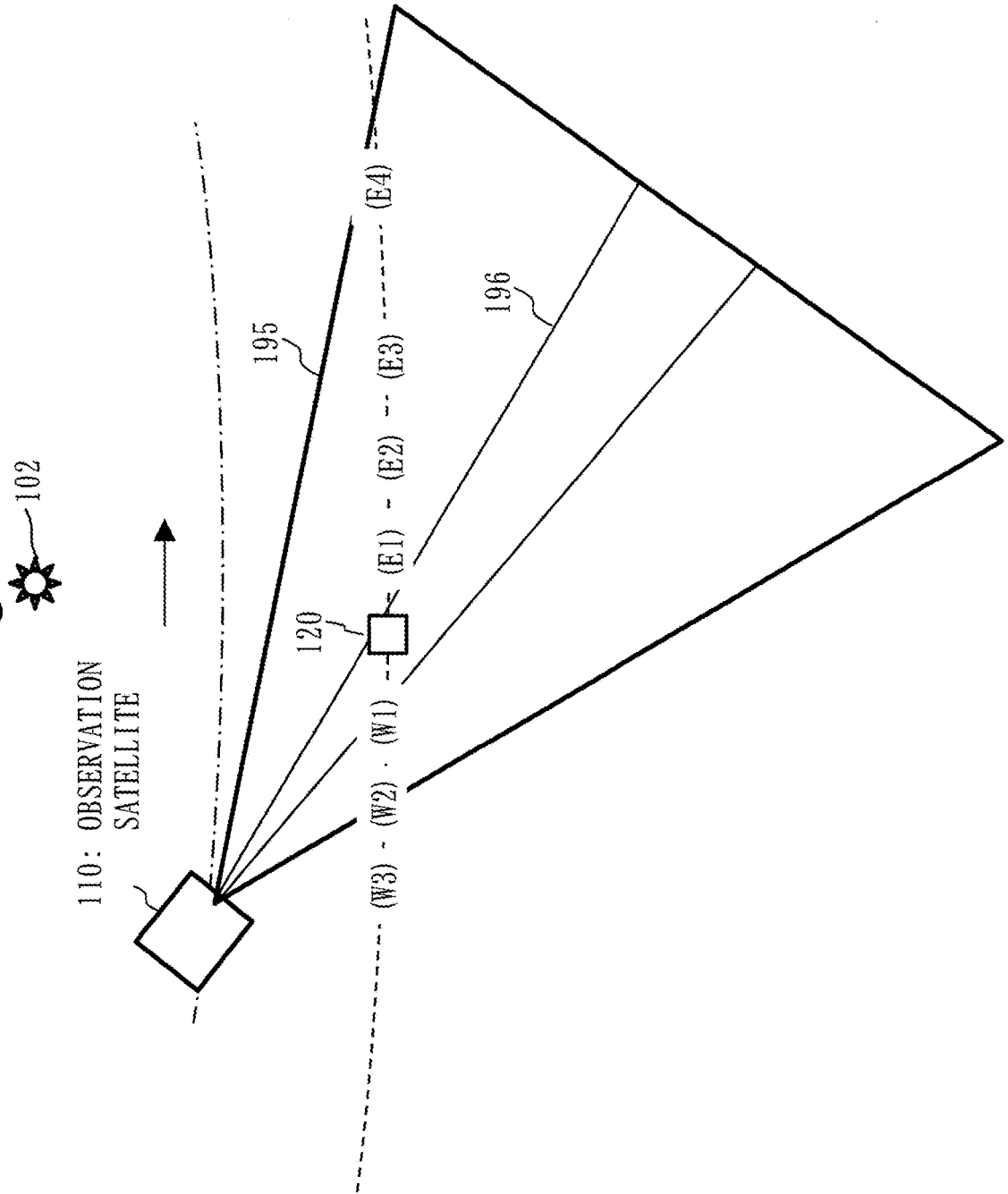
FIG. 50 is a diagram describing data processing of a camera with a fisheye lens in Embodiment 14.

In FIG. 50, the camera 117 that has the fisheye lens will be referred to as the "camera with the fisheye lens".

The meanings of elements in the drawing are as follows.

A broken line represents the geostationary orbit. A dash-dot-dash line represents the orbit of the observation satellite 110.

(Wn) represents a space object that flies in the geostationary orbit in the west of the communication satellite 120. (En) represents a space object that flies in the geostationary orbit in the east of the communication satellite 120. A specific example of a space object is an artificial satellite.

A thick frame centered on the observation satellite 110 represents a field-of-view range 195 of the camera with the fisheye lens.

A frame inside the field-of-view range 195 represents a communication range 196 of a communication device 113 included in the observation satellite 110.

Based on Embodiments 1 to 14 above, observation satellites such as the following can be realized.

Figure 51:
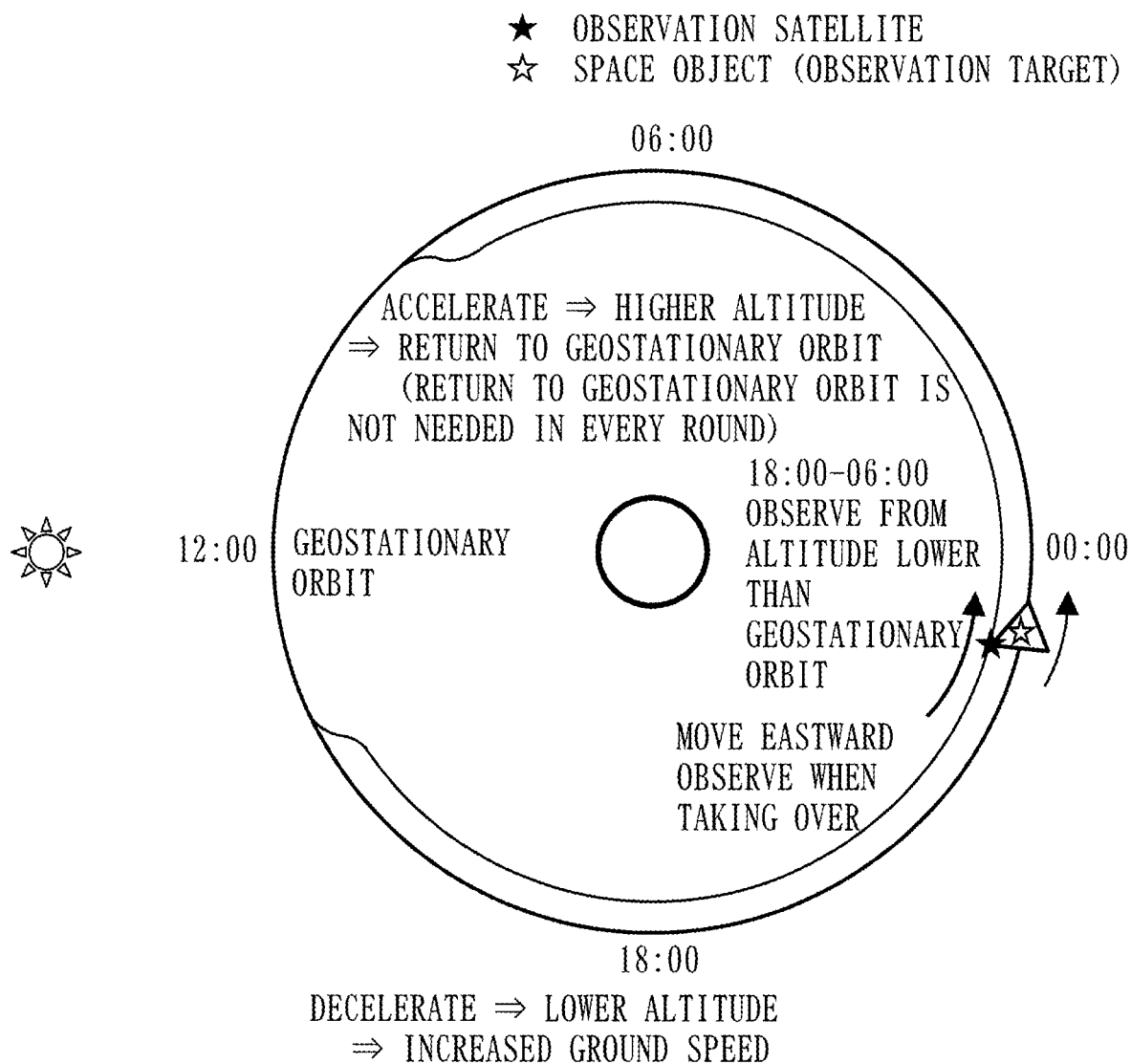
FIG. 51 is a diagram illustrating the following observation satellite according to Embodiment 14.

FIG. 51 is a diagram illustrating the following observation satellite according to this embodiment.

An observation satellite that observes a space object that orbits Earth and flies in a vicinity of a geostationary orbit, and includes an observation device and a propulsion device, wherein
the propulsion device is controlled to decelerate the observation satellite so as to lower an orbital altitude of the observation satellite, and
while the observation satellite moves eastward with respect to the space object as a result of an increased orbiting speed of the observation satellite with respect to a rotation speed of Earth due to lowering of the orbital altitude,
a monitoring device is operated in the sky on a back side of Earth, which is a side not exposed to sunlight, during a period from local sun time (LST) 18:00 to LST 06:00 of following morning.

Figure 52:
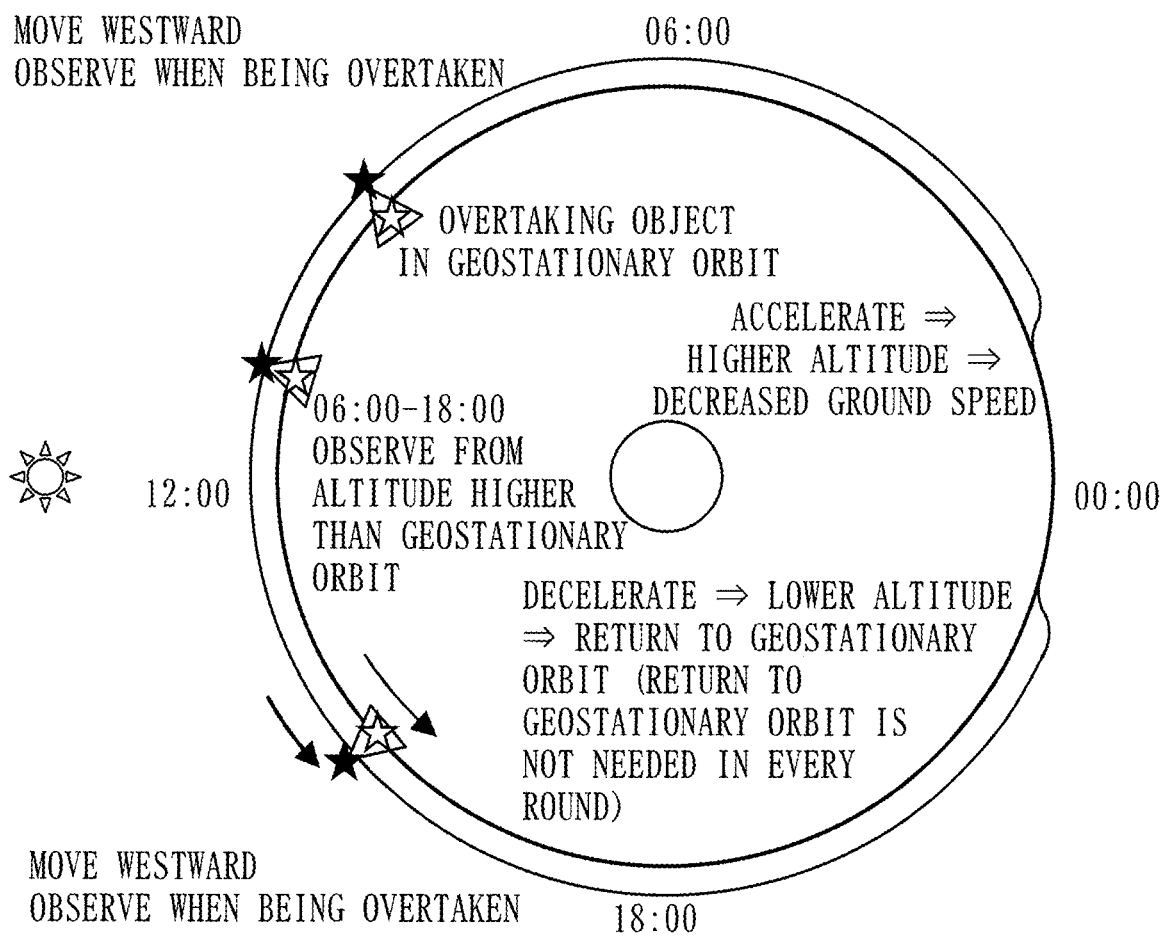
FIG. 52 is a diagram illustrating the following observation satellite according to Embodiment 14.

FIG. 52 is a diagram illustrating the following observation satellite according to this embodiment.

An observation satellite that observes a space object that orbits Earth and flies in a vicinity of a geostationary orbit, and includes an observation device and a propulsion device, wherein
the propulsion device is controlled to accelerate the observation satellite so as to raise an orbital altitude of the observation satellite, and
while the observation satellite move westward with respect to the space object as a result of a decreased orbiting speed of the observation satellite with respect to a rotation speed of Earth due to rising of the orbital altitude,
a monitoring device is operated in the sky on a front side of Earth, which is a side exposed to sunlight, during a period from local sun time (LST) 06:00 to LST 18:00.

An observation satellite that observes a space object that orbits Earth and flies in a vicinity of a geostationary orbit, and includes an observation device and a propulsion device, wherein
the propulsion device is controlled to decelerate the observation satellite so as to lower an orbital altitude of the observation satellite, and the observation satellite moves eastward with respect to the space object as a result of an increased orbiting speed of the observation satellite with respect to a rotation speed of Earth due to lowering of the orbital altitude,
the propulsion device is controlled to increase the observation satellite so as to raise the orbital altitude of the observation satellite, and the observation satellite move eastward with respect to the space object as a result of a decreased orbiting speed of the observation satellite with respect to the rotation speed of Earth due to rising of the orbital altitude, and
a monitoring device is operated at any timing in an eastward movement and a westward movement and an average orbit period is adjusted.

An observation satellite that observes a space object that orbits Earth and flies in a vicinity of a geostationary orbit, and includes an observation device and a propulsion device, wherein
the propulsion device is controlled to decelerate the observation satellite so as to lower an orbital altitude of the observation satellite, and the observation satellite moves eastward with respect to the space object as a result of an increased orbiting speed of the observation satellite with respect to the rotation speed of Earth due to lowering of the orbital altitude,
the propulsion device is controlled to increase the observation satellite so as to raise the orbital altitude of the observation satellite, and the observation satellite moves eastward with respect to the space object as a result of a decreased orbiting speed of the observation satellite with respect to a rotation speed of Earth due to rising of the orbital altitude, and
a monitoring device is operated at any timing in an eastward movement and a westward movement and an average relative position with respect to a monitoring target is maintained.

An observation satellite including a camera with a fisheye lens or a wide-angle camera directed in a forward traveling direction such as the following can be realized.

Figure 53:
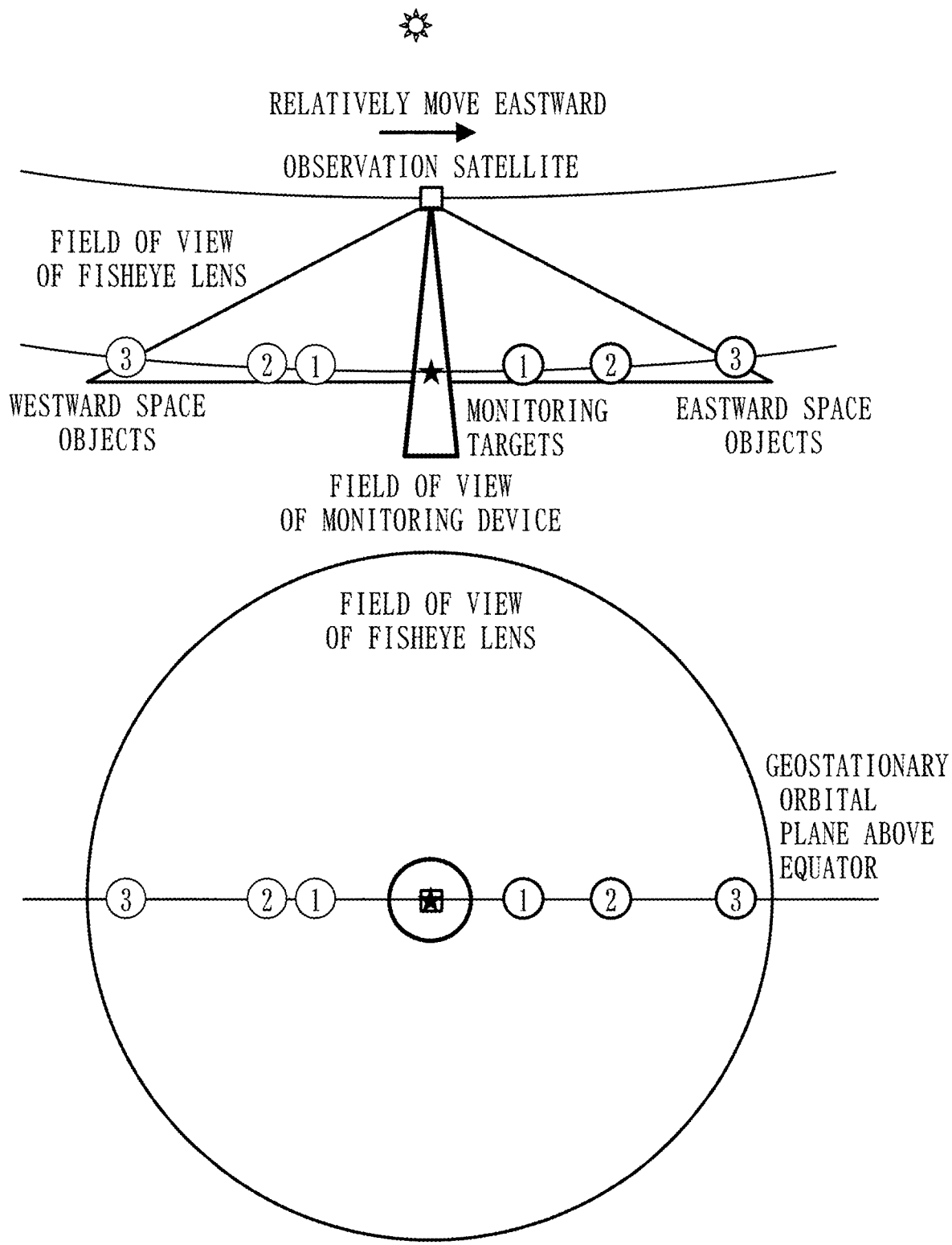
FIG. 53 is a diagram illustrating an example of operation of a camera including a fisheye lens according to Embodiment 14.

FIG. 53 is a diagram illustrating an example of operation of the camera with the fisheye lens according to this embodiment.

With the camera with the fisheye lens included in the observation satellite that monitors space objects in the vicinity of the geostationary orbit while flying at an orbital altitude lower than the geostationary orbit and relatively moving eastward, if all the space objects are flying in the geostationary orbit with an orbital inclination of 0 degrees, the space objects are aligned in line in the field of view of the fisheye lens in a captured image, as indicated in FIG. 53.

Figure 54:
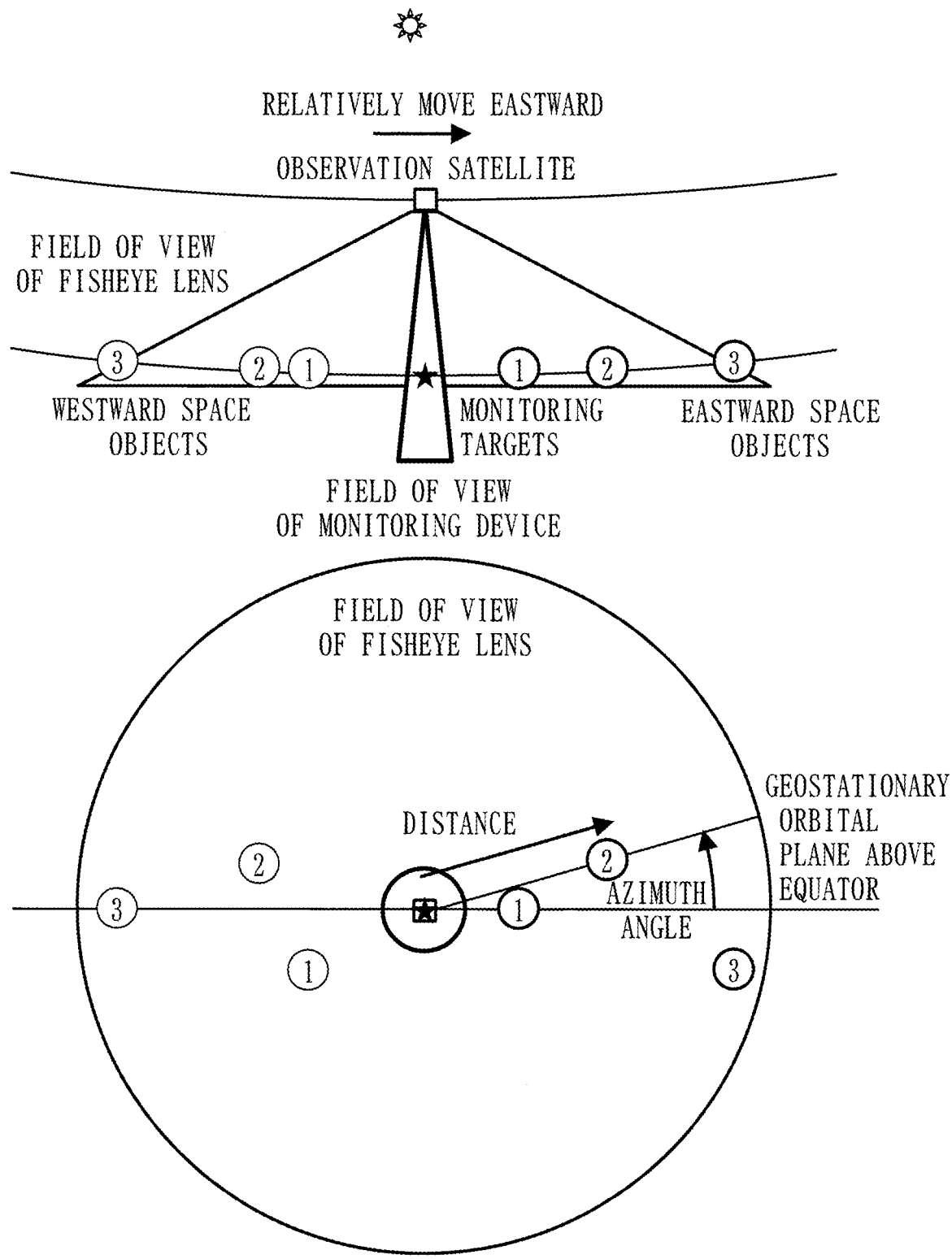
FIG. 54 is a diagram illustrating another example of operation of the camera including the fisheye lens according to Embodiment 14.

FIG. 54 is a diagram illustrating another example of operation of the camera with the fisheye lens according to this embodiment.

If the space objects have an orbital inclination other than 0 degrees, the space objects are not aligned in line in an image acquired with the camera with the fisheye lens and are scattered, as indicated in FIG. 54.

When it is assumed that the center of the field of view of the image captured with the camera with the fisheye lens is the origin and the horizontal axis is a geostationary orbital plane with an orbital inclination of 0 degrees, the angle from the horizontal axis corresponds to the azimuth angle of each space object, and the distance from the center corresponds to the distance between the observation satellite and each space object.

Figure 55:
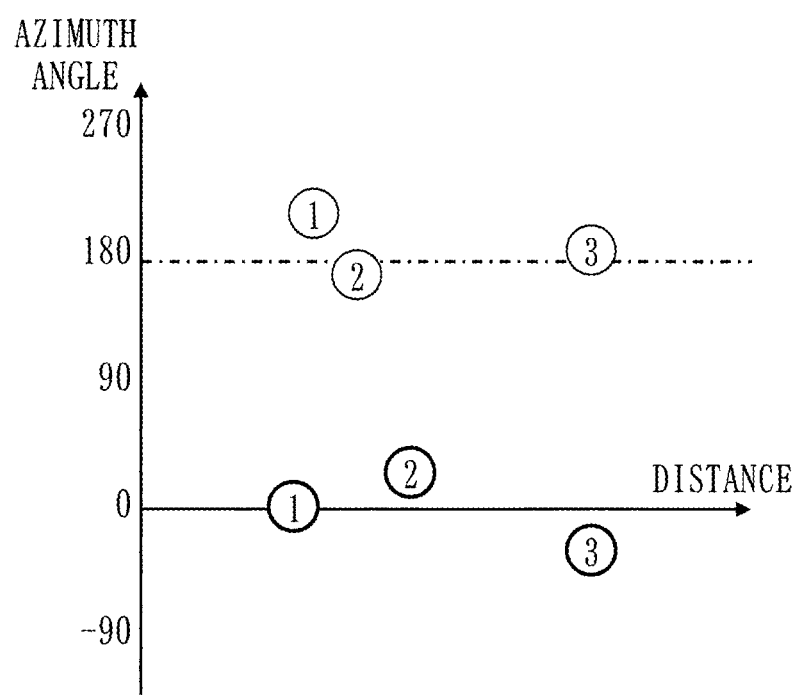
FIG. 55 is a diagram in which information of space objects is plotted in a graph in which the horizontal axis is the distance and the vertical axis is the azimuth angle.
Figure 56:
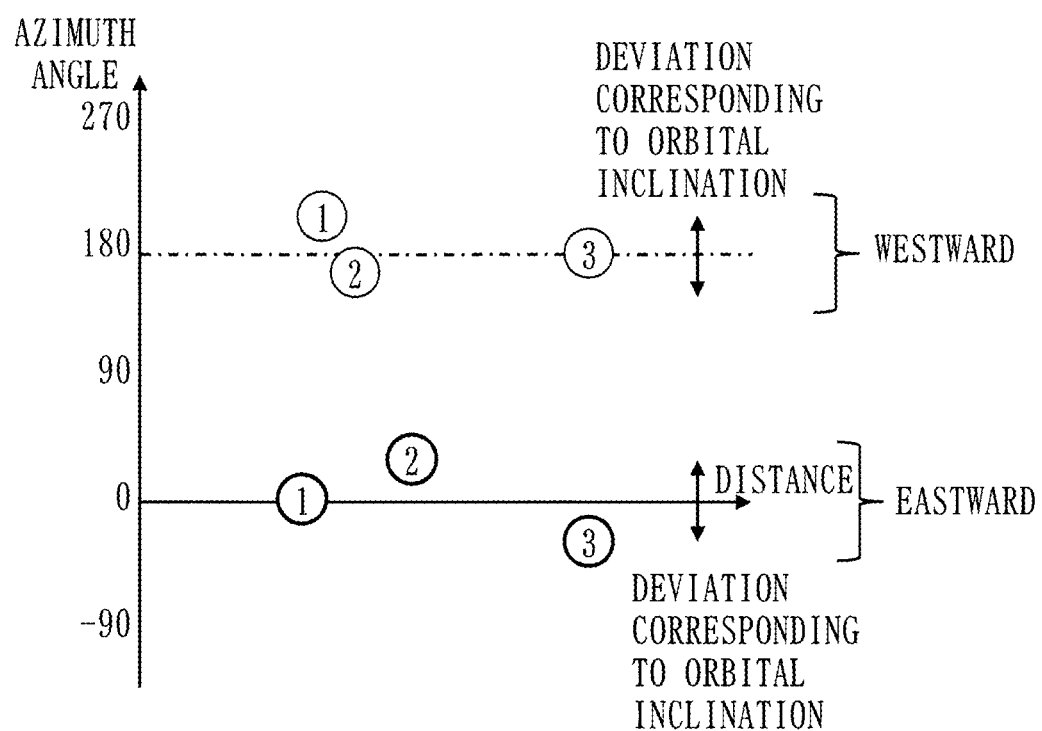
FIG. 56 is a diagram in which information of space objects is plotted in a graph in which the horizontal axis is the distance and the vertical axis is the azimuth angle.

FIGS. 55 and 56 are diagrams in which information of the space objects is plotted in a graph in which the horizontal axis is the distance and the vertical axis is the azimuth angle.

When the information of the space objects is plotted in the graph in which the horizontal axis is the distance and the vertical axis is the azimuth angle, the information is concentrated around an azimuth angle of 0 degrees and around an azimuth angle of 180 degrees, as indicated in FIG. 55.

When this graph is analyzed, it can be seen that the space objects located eastward are around the azimuth angle of 0 degrees, the space objects located westward are around the azimuth angle of 180 degrees, as indicated in FIG. 56, and deviations in the azimuth angle are varied because the orbital inclination is not 0 degrees.

Figure 57:
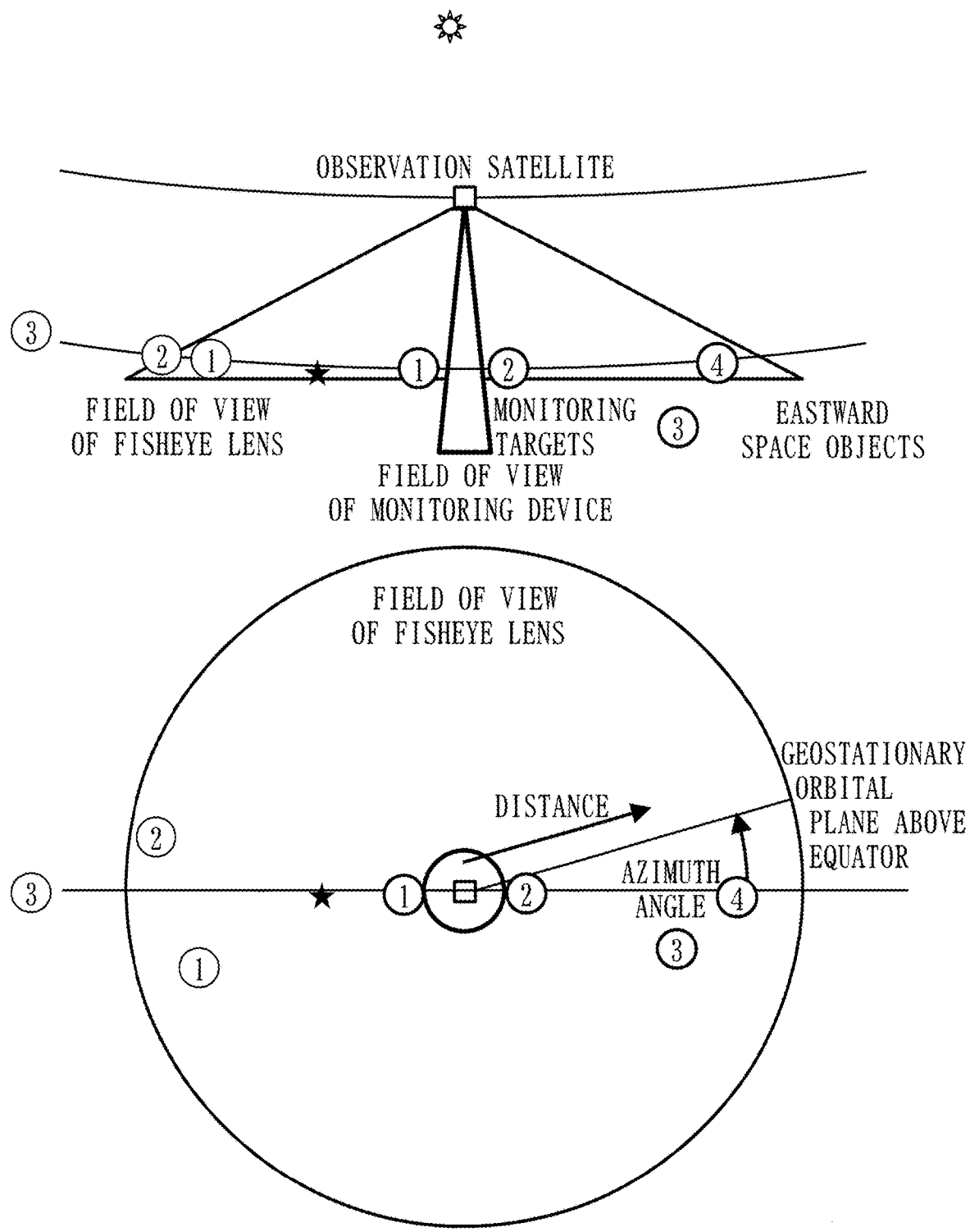
FIG. 57 is an example of operation of the camera including the fisheye lens according to Embodiment 14.
Figure 58:
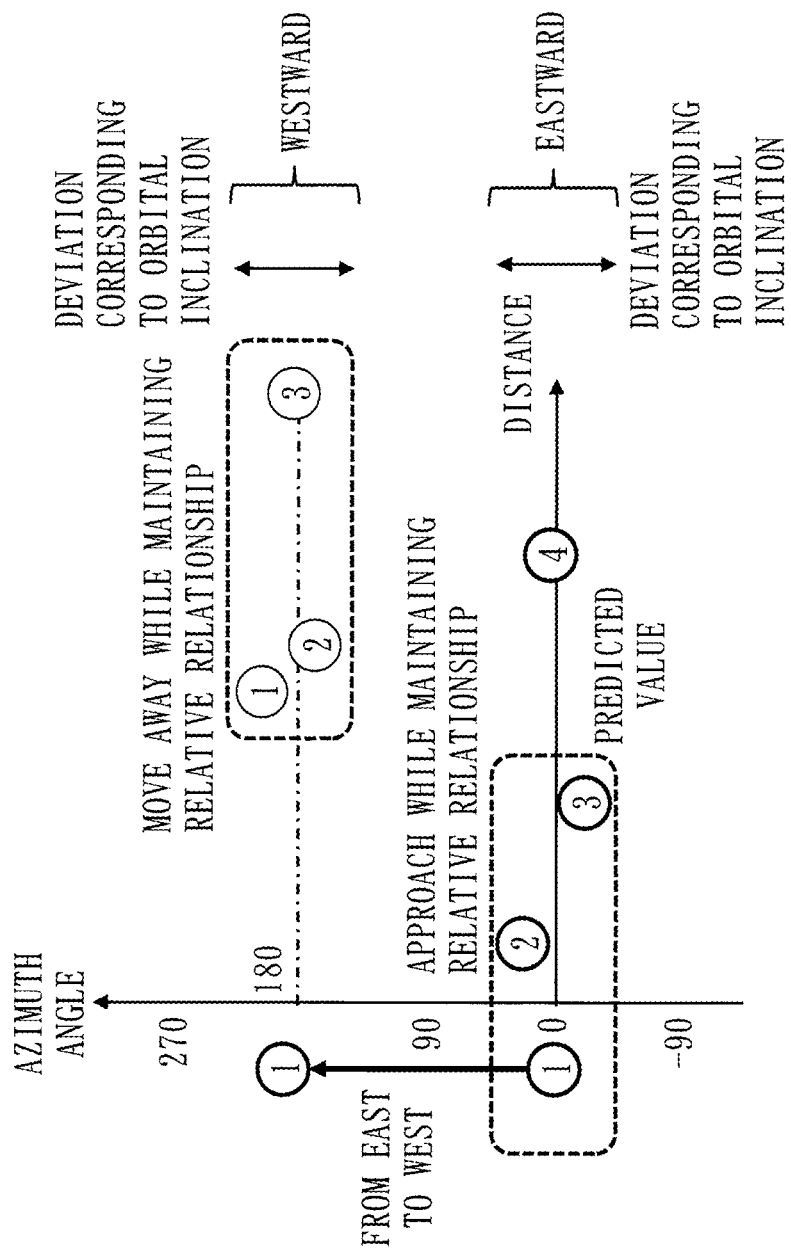
FIG. 58 is a graph corresponding to FIG. 57.

FIG. 57 is an example of operation of the camera with the fisheye lens according to this embodiment. FIG. 58 is a graph corresponding to FIG. 57.

When the observation satellite moves eastward and captures a plurality of images each after a time delay, the distances to the space objects located westward increase while roughly maintaining a relative distribution, and the distances to the space objects located eastward decrease while roughly maintaining a relative distribution and these space objects move to the west after being overtaken by the observation satellite.

Strictly speaking, the azimuth angle of a space object flying in the orbit with an orbital inclination of θ degrees varies by ±θ degrees in one year, but variations when a plurality of images are captured in a short period of time are minute.

Figure 59:
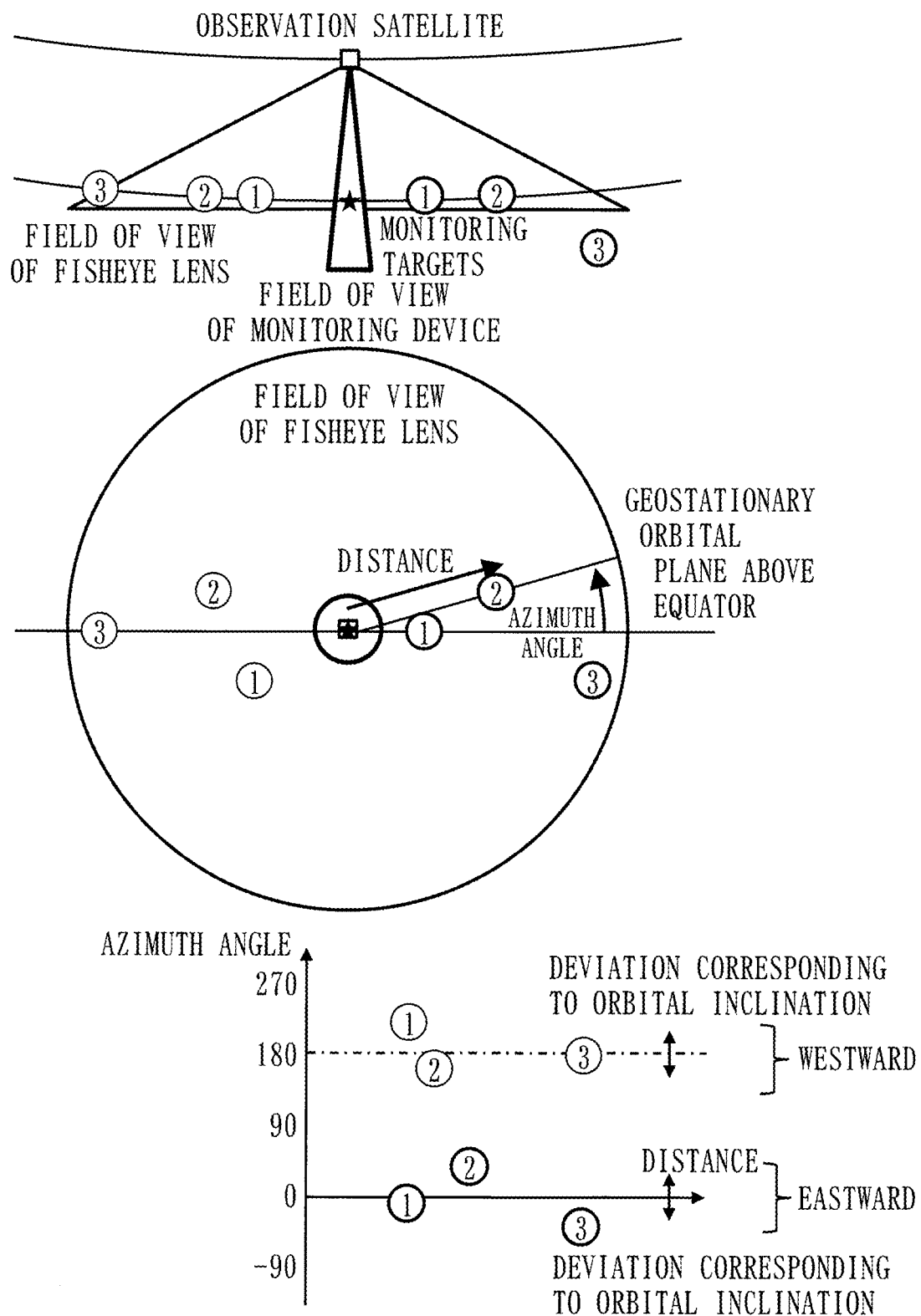
FIG. 59 is an example of operation of the camera including the fisheye lens according to Embodiment 14 and a corresponding graph.

FIG. 59 is an example of operation of the camera with the fisheye lens according to this embodiment and a corresponding graph.

A case in which a space object has moved will be described next.

In a plurality of images each captured with a time difference, the distances to the space objects located eastward are supposed to decrease while roughly maintaining a relative distribution, as described above. However, if the orbital altitude of a space object is different from that of the geostationary orbit or if a space object moves by operating a propulsion device, the space object will deviate from the relative distribution.

Figure 60:
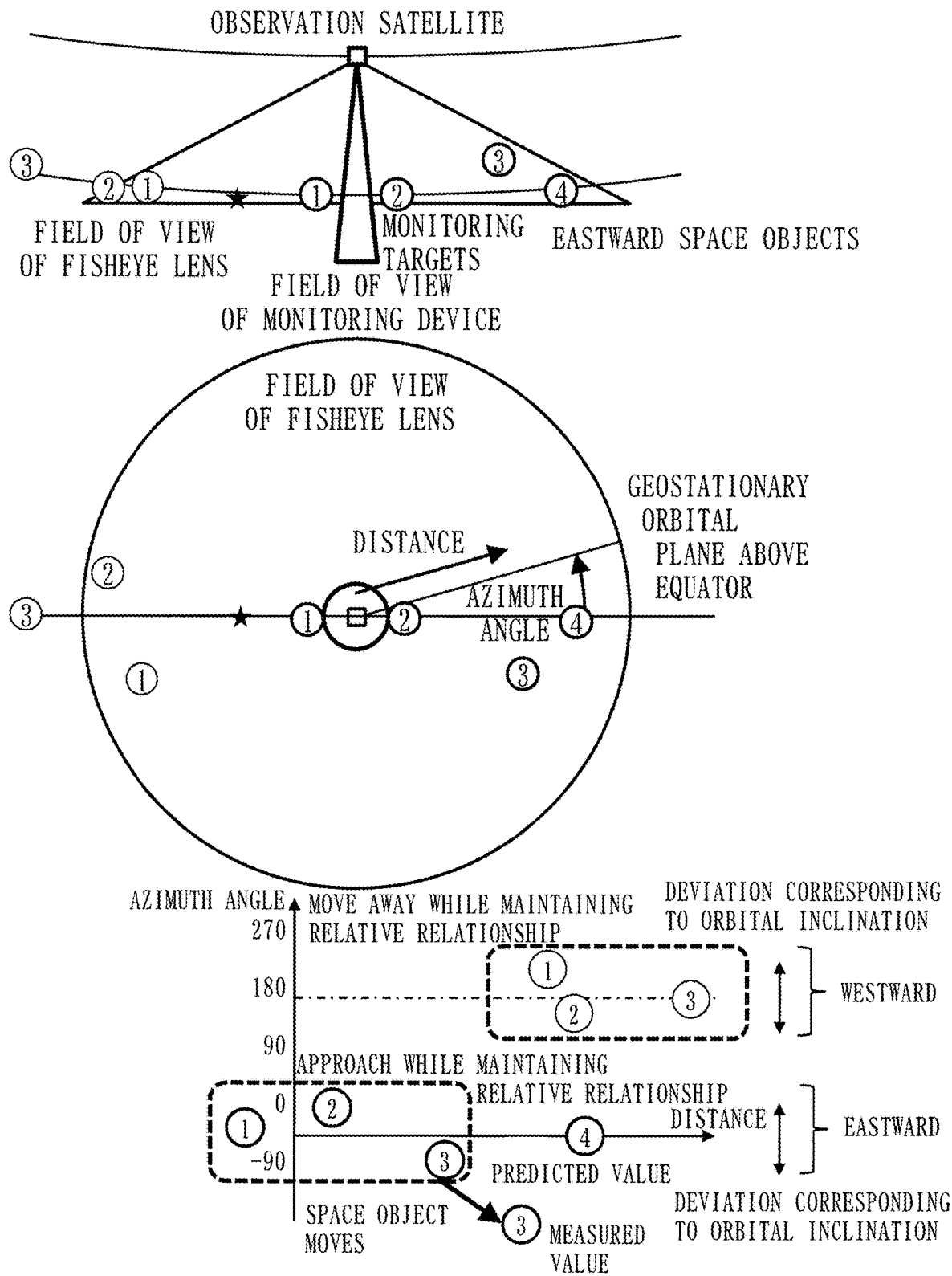
FIG. 60 is an example of operation of the camera including the fisheye lens according to Embodiment 14 and a corresponding graph.

FIG. 60 is an example of operation of the camera with the fisheye lens according to this embodiment and a corresponding graph.

If the relative relationship is maintained, the location of a space object can be predicted in advance. If a measured value deviates from this, it is known that the space object is a moving object.

If an approaching speed is slower than predicted, that is, if the distance is farther than predicted in the east, the orbital altitude of the space object is estimated to be lower than the altitude of the geostationary orbit, and is estimated to be an altitude between the orbital altitude of the observation satellite and the altitude of the geostationary orbit.

If there is a deviation in the direction of the azimuth angle, it can be seen that a movement in an outward direction of the orbital plane is involved. However, it is usually difficult for an artificial satellite to realize a large out-of-phase movement in a short period of time, so that in this case it is presumed that debris with an out-of-phase velocity component has crossed in the vicinity of the geostationary orbit.

It is obvious that similar analysis can be performed even in the case of a wide-angle camera without a fisheye lens.

In Embodiments 1 to 14 above, each unit of each system and each device such as the satellite constellation forming system and the space traffic management system has been described as an independent functional block. However, the configurations of each system and each device may be different from the configurations described in the above embodiments. The functional blocks of each system and each device may be arranged in any configuration, provided that the functions described in the above embodiments can be realized. Each system and each device may be a single device or a system composed of a plurality of devices.

Portions of Embodiments 1 to 14 may be implemented in combination. Alternatively, one portion of these embodiments may be implemented. These embodiments may be implemented as a whole or partially in any combination.

That is, in Embodiments 1 to 14, each embodiment may be freely combined, or any constituent element of each embodiment may be modified. Alternatively, in each embodiment, any constituent element may be omitted.

The embodiments described above are essentially preferable examples and are not intended to limit the scope of the present disclosure, the scope of applications of the present disclosure, and the scope of uses of the present disclosure. The embodiments described above can be modified in various ways as necessary.

REFERENCE SIGNS LIST 11, 11b: satellite constellation forming unit; 20: satellite constellation; 21: orbital plane; 30: satellite; 31: debris retrieval satellite; 32: satellite communication device; 33: propulsion device; 34: attitude control device; 40: business device; 41: mega-constellation business device; 42: LEO constellation business device; 43: satellite business device; 44: orbital transfer business device; 45: debris removal business device; 46: rocket launch business device; 47: SSA business device; 51: orbit control command; 52: capture command; 60: space object; 70: Earth; 100: satellite constellation forming system; 200: space traffic management device; 110: satellite constellation forming unit; 120: space traffic management unit; 140: storage unit; 300: satellite group; 310: satellite control device; 500: ground facility; 501: space traffic management rule; 510: orbit control command transmission unit; 515: rule information; 525: congested region identification information; 520: analytical prediction unit; 600: satellite constellation forming system; 800: space traffic management system; 910: processor; 921: memory; 922: auxiliary storage device; 930: input interface; 940: output interface; 950: communication device; 61: public orbit information; 62: non-public orbit information; 63: real-time high-precision orbit information; 101: space information recorder; 102: danger alert device; 103: danger analysis device; 104: danger avoidance action assistance device; 105: danger avoidance action implementation plan information; 100: observation system; 101: Earth; 102: sun; 103: geostationary orbit; 110: space object; 200: observation satellite; 201: observation device; 202: satellite control device; 203: communication device; 204: propulsion device; 205: attitude control device; 206: power supply device.

The invention claimed is:

1. A space situational awareness business device that is a business device with which a space situational awareness business operator manages space object information, the space situational awareness business device comprising a space traffic management device that is compatible with space traffic management devices respectively included in business devices that manage space objects, the space traffic management device including a processor, wherein the space situational awareness business device is connected, through the space traffic management device, to a space traffic management system in which the space traffic management devices respectively included in the business devices are mutually connected with a communication line, wherein the space situational awareness business device notifies a danger alert to a space insurance business device, and assists a damage compensation measure in case of occurrence of a collision accident.

2. The space situational awareness business device according to claim 1, wherein the space traffic management device includes a space information recorder to record orbit information of a space object, a danger analysis device, and a danger alert device to notify abnormal proximity or a collision with a space object or an intrusion into a danger region by a space object, and further includes all or at least one of a danger avoidance action assistance device, danger avoidance action implementation plan information, and security management information.

3. The space situational awareness business device according to claim 2, wherein
the space situational awareness business device performs proximity, collision, or intrusion analysis, using the danger analysis device and using pieces of space object information acquired by the space information recorder, and
when proximity, a collision, or an intrusion involving danger is foreseen, notifies the danger to a business device of a space object to be a party involved, using the danger alert device.

4. The space situational awareness business device according to claim 2, wherein
the space situational awareness business device coordinates a danger avoidance action with a management business operator of a space object to be a party involved to which danger is notified by the danger alert device, using the danger avoidance action assistance device, and
discloses danger avoidance action implementation plan information.

5. The space situational awareness business device according to claim 2, wherein
the space situational awareness business device notifies a danger alert to a debris removal business device or a mega-constellation business device, and requests a danger avoidance action.

6. A space traffic business device to manage space traffic, the space traffic business device comprising a processor and one of a control device of a space plane and a collision avoidance assistance device, wherein
the space traffic business device also has a function of the space situational awareness business device according to claim 1.

7. A space situational awareness business device that is a business device with which a space situational awareness business operator that acquires space object information using a monitoring device manages the space object information, the space situational awareness business device comprising
the monitoring device that flies in a vicinity of a geostationary orbit, wherein
the monitoring device includes a propulsion device, and while the monitoring device moves eastward with respect to a space object, the monitoring device is operated in the sky on a back side of Earth, which is a side not exposed to sunlight, during a period from local sun time (LST) 18:00 to LST 06:00 of following morning.

8. The space situational awareness business device according to claim 7, further comprising
a space traffic management device that is compatible with space traffic management devices respectively included in business devices that manage space objects, the space traffic management device including a processor, wherein
the space situational awareness business device is connected, through the space traffic management device, to a space traffic management system in which the space traffic management devices respectively included in the business devices are mutually connected with a communication line.

9. A space situational awareness business device that is a business device with which a space situational awareness business operator that acquires space object information using a monitoring device manages the space object information, the space situational awareness business device comprising
the monitoring device that flies in a vicinity of a geostationary orbit, wherein
the monitoring device includes a propulsion device, and while the monitoring device moves westward with respect to a space object, the monitoring device is operated in the sky on a front side of Earth, which is a side exposed to sunlight, during a period from local sun time (LST) 06:00 to LST 18:00.

10. A space situational awareness business device that is a business device with which a space situational awareness business operator that acquires space object information using a monitoring device manages the space object information, the space situational awareness business device comprising:
the monitoring device that flies in a vicinity of a geostationary orbit; and
a ground facility including a processor that performs orbit control and monitoring control of the monitoring device, wherein
the monitoring device includes a propulsion device,
the monitoring device is operated, while moving eastward with respect to a space object, in the sky on a back side of Earth, which is a side not exposed to sunlight, during a period from local sun time (LST) 18:00 to LST 06:00 of following morning,
the monitoring device is operated, while moving westward with respect to the space object, in the sky on a front side of Earth, which is a side exposed to sunlight, during a period from local sun time (LST) 06:00 to LST 18:00, and
an average orbit period of the monitoring device is adjusted.

11. A space situational awareness business device that is a business device with which a space situational awareness business operator that acquires space object information using a monitoring device manages the space object information, the space situational awareness business device comprising:
the monitoring device that flies in a vicinity of a geostationary orbit; and
a ground facility including a processor that performs orbit control and monitoring control of the monitoring device, wherein
the monitoring device includes a propulsion device,
the monitoring device is operated, while moving eastward with respect to a space object, in the sky on a back side of Earth, which is a side not exposed to sunlight, during a period from local sun time (LST) 18:00 to LST 06:00 of following morning,
the monitoring device is operated, while moving westward with respect to the space object, in the sky on a front side of Earth, which is a side exposed to sunlight, during a period from local sun time (LST) 06:00 to LST 18:00, and
an average relative position with respect to the ground facility is maintained.

12. A space situational awareness business device that is a business device with which a space situational awareness business operator manages space object information, the space situational awareness business device comprising
a space traffic management device that is compatible with space traffic management devices respectively included in business devices that manage space objects, the space traffic management device including a processor, wherein
the space situational awareness business device is connected, through the space traffic management device, to a space traffic management system in which the space traffic management devices respectively included in the business devices are mutually connected with a communication line, the space situational awareness business device is connected with a space traffic management device included in a specific business device with a secret line, and the space situational awareness business device notifies a danger alert to a space insurance business device, and assists a damage compensation measure in case of occurrence of a collision accident.

13. A space traffic management system in which space traffic management devices respectively included in business devices of business operators that each manage a space object are connected with a communication line, wherein
 each of the space traffic management devices includes
 rule information indicating a rule that satellites with different normal vectors adopt mutually different orbital altitudes, and
 processing circuitry to manage the space object based on the rule information.

14. A space situational awareness business device that is a business device with which a space situational awareness business operator manages space object information, the space situational awareness business device comprising a space traffic management device that is included in the space traffic management system according to claim 13.

* * * * *